(12) United States Patent
Tomici et al.

(10) Patent No.: US 9,198,021 B2
(45) Date of Patent: Nov. 24, 2015

(54) EXTENDED LOCAL IP ACCESS FOR A CONVERGED GATEWAY IN A HYBRID NETWORK

(75) Inventors: John L. Tomici, Southold, NY (US); Prabhakar R. Chitrapu, Blue Bell, PA (US); John Cartmell, North Massapequa, NY (US); Rocco Di Girolamo, Laval (CA); Jean-Louis Gauvreau, La Prairie (CA); Aravind Kamarajugadda, San Jose, CA (US); Chunxuan Ye, San Diego, CA (US); Kushanava Laha, Gurgaon (IN); Reeteshkumar Varshney, Gurgaon (IN); Nicholas J. Podias, Brooklyn, PA (US); Arty Chandra, Manhasset Hills, NY (US); Alpaslan Y. Demir, East Meadow, NY (US); Martino Freda, Laval (CA); Scott C. Hergenhan, Collegeville, PA (US); Dale N. Seed, Allentown, PA (US); Michael F. Starsinic, Newtown, PA (US); Athmane Touag, Laval (CA); Onkarnath Upadhyay, Maharapur (IN); Paul L. Russell, Pennington, NJ (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 631 days.

(21) Appl. No.: 12/960,160

(22) Filed: Dec. 3, 2010

(65) Prior Publication Data

US 2011/0228750 A1 Sep. 22, 2011

Related U.S. Application Data

(60) Provisional application No. 61/266,726, filed on Dec. 4, 2009, provisional application No. 61/322,245, filed on Apr. 8, 2010, provisional application No. 61/349,531, filed on May 28, 2010, provisional application No. 61/299,738, filed on Jan. 29, 2010.

(51) Int. Cl.
*H04W 4/00* (2009.01)
*H04W 8/08* (2009.01)
(Continued)

(52) U.S. Cl.
CPC ............... *H04W 8/082* (2013.01); *H04L 63/30* (2013.01); *H04W 12/02* (2013.01); *H04W 76/022* (2013.01); *H04W 84/045* (2013.01); *H04W 88/06* (2013.01)

(58) Field of Classification Search
USPC .............. 370/338, 328, 331, 221; 709/24, 207
See application file for complete search history.

(56) References Cited

U.S. PATENT DOCUMENTS 7,539,175 B2  5/2009 White et al.
8,165,086 B2 * 4/2012 Gallagher et al. ............ 370/331
(Continued)

FOREIGN PATENT DOCUMENTS

CN      101123549 A   2/2008
WO  WO 2009/132724 A2  11/2009
WO  WO 2009/132824 A2  11/2009

OTHER PUBLICATIONS

Vodafone Group, Title: "3G HomeNB Architecture Discussion", (Agenda Item:11.1, 3GPP Draft; R3-080775, 3rd Generation Partnership Project (3GPP), Mobile Competence Centre; 650, Route Des Lucioles; F-06921 Sophia-Antipolis Cedex; France, Shenzhen, China, Mar. 31-Apr. 4, 2008).*

(Continued)

*Primary Examiner* — Faruk Hamza
*Assistant Examiner* — Shah R Zaman
(74) *Attorney, Agent, or Firm* — Condo Roccia Koptiw LLP

(57) ABSTRACT

The implementation of Local IP Access (LIPA), "Extended" LIPA (ELIPA), and Selected IP Traffic Offload (SIPTO) for the design of a "Converged Gateway" (CGW) are disclosed. The gateway system may provide various features such as femtocell access to local networks, public Internet, and private service provider networks.

19 Claims, 82 Drawing Sheets

(51) Int. Cl.
| | |
|---|---|
| *H04L 29/06* | (2006.01) |
| *H04W 12/02* | (2009.01) |
| *H04W 76/02* | (2009.01) |
| *H04W 84/04* | (2009.01) |
| *H04W 88/06* | (2009.01) |

(56) References Cited

U.S. PATENT DOCUMENTS

| | | | | |
|---|---|---|---|---|
| 2009/0144442 | A1* | 6/2009 | Zheng et al. | 709/236 |
| 2009/0207757 | A1 | 8/2009 | Andreasen et al. | |
| 2009/0207823 | A1* | 8/2009 | Andreasen et al. | 370/338 |
| 2011/0103310 | A1* | 5/2011 | Stojanovski et al. | 370/328 |
| 2011/0158171 | A1* | 6/2011 | Centonza et al. | 370/328 |

OTHER PUBLICATIONS

"3rd Generation Partnership Project; (Technical Specification Group Services and System Aspects; Local IP Access and Selected IP Traffic Offload; (Release 10)", 3GPP Standard; 3GPP TR 23.829, 3rd Generation Partnership Project (3GPP), Mobile Competence Centre ; 650, Route Des Lucioles ; F-06921 Sophia-Antipolis Valbonne ; France, No. V0.2.1, Oct. 30.*

Vodafone Group, Title: "3G HomeNB Architecture Discussion", (Agenda Item:11.1, 3GPP Draft; R3-080775, 3rd Generation Partnership Project (3GPP), Mobile Competence Centre; 650, Route Des Lucioles; F06921 Sophia-Antipolis Cedex; France, Shenzhen, China, Mar. 31-Apr. 4, 2008).*

"3rd Generation Partnership Project; (Technical Specification Group Services and System Aspects; Local IP Access and Selected IP Traffic Offload; (Release 10)", 3GPP Standard; 3GPP TR 23.829, 3rd Generation Partnership Project (3GPP), Mobile Competence Centre; 650, Route Des Lucioles; F-06921 Sophia-Antipolis Valbonne; France, No. V0.2.1, Oct. 30.*

$3^{rd}$ Generation Partnership Project (3GPP), R3-080775, "3G HomeNB Architecture Discussion", Vodafone Group, 3GPP TSG RAN WG3, Meeting #59bis, Shenzhen, China, Mar. 31-Apr. 4, 2008, 8 pages.

$3^{rd}$ Generation Partnership Project (3GPP), S2-096649, "Open Issues and Solution for LIPA/SIPTO Service", Samsung, 3GPP TSG SA WG2, Meeting #76, San Jose Del Cabo, Mexico, Nov. 16-20, 2009, 8 pages.

$3^{Rd}$ Generation Partnership Project (3GPP), TR 23.829, V0.2.1, "$3^{rd}$ Generation Partnership Project; Technical Specification Group Services and System Aspects; Local IP Access and Selected IP Traffic Offload; (Release 10)", Sep. 2009, 20 pages.

$3^{rd}$ Generation Partnership Project (3GPP), SP-080791, "$3^{rd}$ Generation Partnership Project; Updates on WID on Enhanced Home NodeB / eNodeB (EHNB)", 3GPP, Meeting #42, Dec. 8-11, 2008, 3 pages.

$3^{rd}$ Generation Partnership Project (3GPP), TS 23.060, V9.3.0, "$3^{rd}$ Generation Partnership Project; Technical Specification Group Services and System Aspects; General Packet Radio Service (GPRS); Service Description; Stage 2 (Release 9)", Dec. 2009, 295 pages.

3rd Generation Partnership Project (3GPP), TS 29.060, V3.0.0, "$3^{rd}$ Generation Partnership Project; Technical Specification Group Core Network; General Packet Radio Service (GPRS); GPRS Tunnelling Protocol (GTP) Across the Gn and Gp Interface (3G TS 29.060 Version 3.0.0)", May 1999, 70 pages.

Local IP Access Via Home NodeB, "http://www.ccpu.com/papers/locallPaccess", Mar. 9, 2010, Accessed Mar. 9, 2011, 2 pages.

Macworld, "iphone Data Usage", "http://www.macworld.com/article/145076/2009/12/iphone_data_usage.html?t=104", Dec. 14, 2009, Accessed Mar. 9, 2011, 4 pages.

Schulzrinne et al., "RTP: A Transport Protocol for Real-Time Applications"The Internet Engineering Task Force (IETF), #3550, Jul. 2003, 89 pages.

3rd Generation Partnership Project (3GPP), TD S2-095088, "Key Aspects: P-GW/GGSN Location Principles for LIPA and SIPTO Traffic", Qualcomm Europe, Rel-9 EHNB, 3GPP TSG SA WG2 Meeting #75 Kyoto, Japan, Aug. 28-Sep. 2, 2009, 12 pages.

3rd Generation Partnership Project (3GPP), TD S2-095088, "Key Aspects: P-GW/GSN Location Principles for LIPA and SIPTO Traffic", Qualcomm Europe, Rel-9 EHNB, 3GPP TSG SA WG2 Meeting #75 Kyoto, Japan, Aug. 28-Sep. 2, 2009, 12 pages.

3rd Generation Partnership Project (3GPP), TD S2-095371, "Common Architectural Principles for LIPA", Alcatei-Lucent, LIPA/REL-10, 3GPP TSG SA WG2 Meeting #75 Kyoto, Japan, Aug. 31-Sep. 4, 2009, 3 pages.

3rd Generation Partnership Project (3GPP), TD S2-095802 was TD S2-095371, "Common Architectural Principles for LIPA", Alcatel-Lucent, LIPA/Rel-10, 3GPP TSG SA WG2 Meeting #75 Kyoto, Japan, Aug. 31-Sep. 4, 2009, 3 pages.

3rd Generation Partnership Project (3GPP), TD S2-097242 was S2-096570, "Closing the Remaining Open Issues on LIPA with Local PDN Connection", LG Electronics, LIPA_SIPTO/Rel-10, 3GPP TSG SA WG2 Meeting #76 San Jose Del Cabo, Mexico, Nov. 16-20, 2009, 14 pages.

$3^{rd}$ Generation Partnership Project (3GPP), SP-080791, "$3^{rd}$ Generation Partnership Project; Updates on WID on Enhanced Home NodeB/eNodeB (EHNB)", 3GPP, Meeting #42, Dec. 8-11, 2008, 3 pages.

$3^{rd}$ Generation Partnership Project (3GPP), TR 23.829, V1.0.1, "$3^{rd}$ Generation Partnership Project; Technical Specification Group Services and System Aspects; Local IP Access and Selected IP Traffic Offload (Release 10)", Mar. 2010, 37 pages.

$3^{rd}$ Generation Partnership Project (3GPP), TR 36.902, V9.0.0, "$3^{rd}$ Generation Partnership Project; Technical Specification Group Radio Access Network; Evolved Universal Terrestrial Radio Access Network (E-UTRAN); Self-Configuring and Self-Optimizing Network Use Cases and Solutions (Release 9)", Sep. 2009, 23 pages.

$3^{rd}$ Generation Partnership Project (3GPP), TR-069, V1.1, "$3^{rd}$ Generation Partnership Project; CPE WAN Management Protocol V1.1", Issue 1, Amendment 2, Dec. 2007, 1-138.

$3^{rd}$ Generation Partnership Project (3GPP), TS 22.220, V10.0.0, "$3^{rd}$ Generation Partnership Project; Technical Specification Group Services and Systems Aspects; Service Requirements for Home NodeBs & Home eNodeBs (Release 10)", Sep. 2009, 22 pages.

$3^{rd}$ Generation Partnership Project (3GPP), TS 22.220, V10.2.0, "$3^{rd}$ Generation Partnership Project; Technical Specification Group Services and System Aspects; Service Requirements for Home Node B (HNB) and Home eNode B (HeNB) (Release 10)", Mar. 2010, 24 pages.

$3^{rd}$ Generation Partnership Project (3GPP), TS 24.008, V3.0.0, "$3^{rd}$ Generation Partnership Project; Technical Specification Group; Universal Mobile Telecommunications System; Mobile Radio Interface Layer 3 Specification, Core Network Protocols—Stage 3 (TS 24.008 Version 3.0.0)", Jul. 1999, 377 pages.

$3^{rd}$ Generation Partnership Project (3GPP), TS 25.331, V9.1.0. "$3^{rd}$ Generation Partnership Project; Technical Specification Group Radio Access Network; Radio Resource Control (RRC); Protocol Specification (Release 9)", Dec. 2009, 1759 pages.

$3^{rd}$ Generation Partnership Project (3GPP), TS 23.060, V9.3.0, "3rd Generation Partnership Project; Technical Specification Group Services and System Aspects; General Packet Radio Service (GPRS); Service Description; Stage 2 (Release 9)", Dec. 2009, 295 pages.

$3^{rd}$ Generation Partnership Project (3GPP), TS 25.467, V9.1.0, "$3^{rd}$ Generation Partnership Project; Technical Specification Group Radio Access Network; UTRAN Architecture for 3G Home NodeB; Stage 2 (Release 9)", Dec. 2009, 32 pages.

$3^{rd}$ Generation Partnership Project (3GPP), TR 21.905, V0.1.0, "$3^{rd}$ Generation Partnership Project; Technical Specification Group Services and Systems Aspects Vocabulary for 3GPP Specifications (3G TR 21.905 Version 0.1.0)", Oct. 1999, 23 pages.

$3^{rd}$ Generation Partnership Project (3GPP), TS 25.323, V0.1.0, "$3^{rd}$ Generation Partnership Project; Technical Specification Group (TSG) RAN; Working Group 2 (WG2); Packet Data Convergence Protocol (PDCP) Specification (3G TS 25.323 Version 0.1.0)", Sep. 1999, 9 pages.

$3^{rd}$ Generation Partnership Project (3GPP), TS 25.401, V1.0.0, "$3^{rd}$ Generation Partnership Project; Technical Specification Group (TSG-RAN); UTRAN Overall Description", Apr. 1999, 44 pages.

(56) References Cited

OTHER PUBLICATIONS

3rd Generation Partnership Project (3GPP), TS 25.412, V3.0.0, "3rd Generation Partnership Project; Technical Specification Group (TSG) RAN; UTRAN Iu Interface Signalling Transport", Jun. 1999, 9 pages.

3rd Generation Partnership Project (3GPP), TS 25.413, V1.0.0, "3rd Generation Partnership Project; Technical Specification Group (TSG) RAN RANAP Specification", Apr. 1999, 52 pages.

3rd Generation Partnership Project (3GPP), TS 25.468, V1.0.0, "3rd Generation Partnership Project; Technical Specification Group Radio Access Network; UTRAN Iuh Interface RANAP User Adaption (RUA) Signalling (Release 8)", Nov. 2008, 44 pages.

3rd Generation Partnership Project (3GPP), TS 25.469, V1.0.0, "3rd Generation Partnership Project; Technical Specification Group Radio Access Network; UTRAN Iuh Interface Home Node B Application Part (HNBAP) Signalling (Release 8)", Nov. 2008, 56 pages.

3rd Generation Partnership Project (3GPP), TS 29.060, V3.0.0, "3rd Generation Partnership Project; Technical Specification Group Core Network; General Packet Radio Service (GPRS); GPRS Tunnelling Protocol (GTP) Across the Gn and Gp Interface (3G Ts 29.060 Version 3.0.0)", May 1999, 70 pages.

3rd Generation Partnership Project (3GPP), TS 32.581, V9.2.0, "3rd Generation Partnership Project; Technical Specification Group Services and System Aspects; Telecommunications Management; Home Node B (HNB) Operations, Administration, Maintenance and Provisioning (OAM&P); Concepts and Requirements for Type 1 interface HNB to HNB Management System (HMS) (Release 9)", Mar. 2010, 11 pages.

3rd Generation Partnership Project (3GPP), TS 32.582, V1.0.0, "3rd Generation Partnership Project; Technical Specification Group Services and System Aspects; Telecommunications Management; Home Node B (HNB) Operations, Administration, Maintenance and Provisioning (OAM&P); Information Model for Type 1 Interface HNB to HNB Management System (HMS) (Release 8)", Mar. 2009, 22 pages.

3rd Generation Partnership Project (3GPP), TS 32.583, V9.2.0, "3rd Generation Partnership Project; Technical Specification Group Services and System Aspects; Telecommunications management; Home Node B (HNB) Operations, Administration, Maintenance and Provisioning (OAM&P); Procedure Flows for Type 1 Interface HNB to HNB Management System (HMS) (Release 9)", Dec. 2009, 21 pages.

3rd Generation Partnership Project (3GPP),TS 33.210, V1.0.0, "3rd Generation Partnership Project; Technical Specification Group Services and Systems Aspects; 3G Security; Network Domain Security; IP Network Layer Security (Release 5)", Dec. 2001, 19 pages.

Atkinson, R., "Key Exchange Delegation Record for the DNS", The Internet Engineering Task Force (IETF), #2230, Nov. 1997, 11 pages.

Droma, R., "Dynamic Host Configuration Protocol", The Internet Engineering Task Force (IETF), #2131, Mar. 1997, 45 pages.

European Telecommunications Standards Institute (ETSI), TS 185.005, V3.2.2, "Telecommunications and Internet Converged Services and Protocols for Advanced Networking (TISPAN); Services Requirements and Capabilities for Customer Networks Connected to TISPAN NGN", Jun. 2010, 24 pages.

Harkins and Carrel, "The Internet Key Exchange (IKE)", The Internet Engineering Task Force (IETF), #2409, Nov. 1998, 41 pages.

Home Gateway Initiative, Technical Requirements: Residential Profile, Version 1.0, Apr. 29, 2008, 145 pages.

Kaufman, C., "Internet Key Exchange (IKEv2) Protocol", The Internet Engineering Task Force (IETF), #4306, Dec. 2005, 99 pages.

Local IP Access Via Home NodeB, "http://www.ccpu.com/papers/locallPaccess", Mar. 9, 2010, Accessed Mar. 9, 2011, 2 pages.

Macworld, "iphone Data Usage", "http://www.macworld.com/article/145076/2009/12/iphone data usage.html?t=104", Dec. 14, 2009, Accessed Mar. 9, 2011, 4 pages.

Maughan et al., "Internet Security Association and Key Management Protocol (ISAKMP)", The Internet Engineering Task Force (IETF), #2408, Nov. 1998, 86 pages.

Piper, D., "The Internet IP Security Domain of Interpretation for ISAKMP", The Internet Engineering Task Force (IETF), #2407, Nov. 1998, 32 pages.

Schulzrinne et al., "RTP: A Transport Protocol for Real-Time Applications", The Internet Engineering Task Force (IETF), #3550, Jul. 2003, 89 pages.

\* cited by examiner

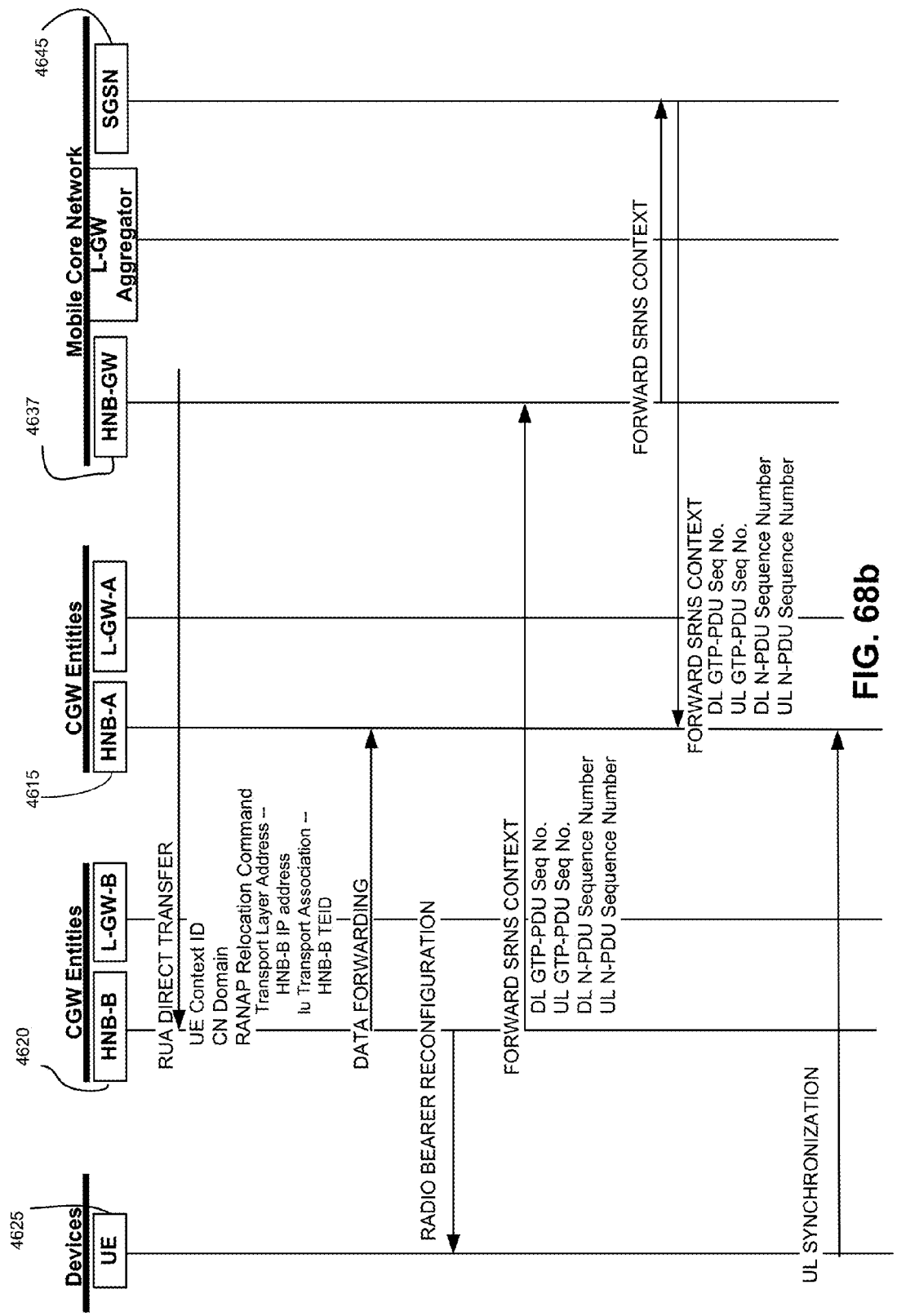

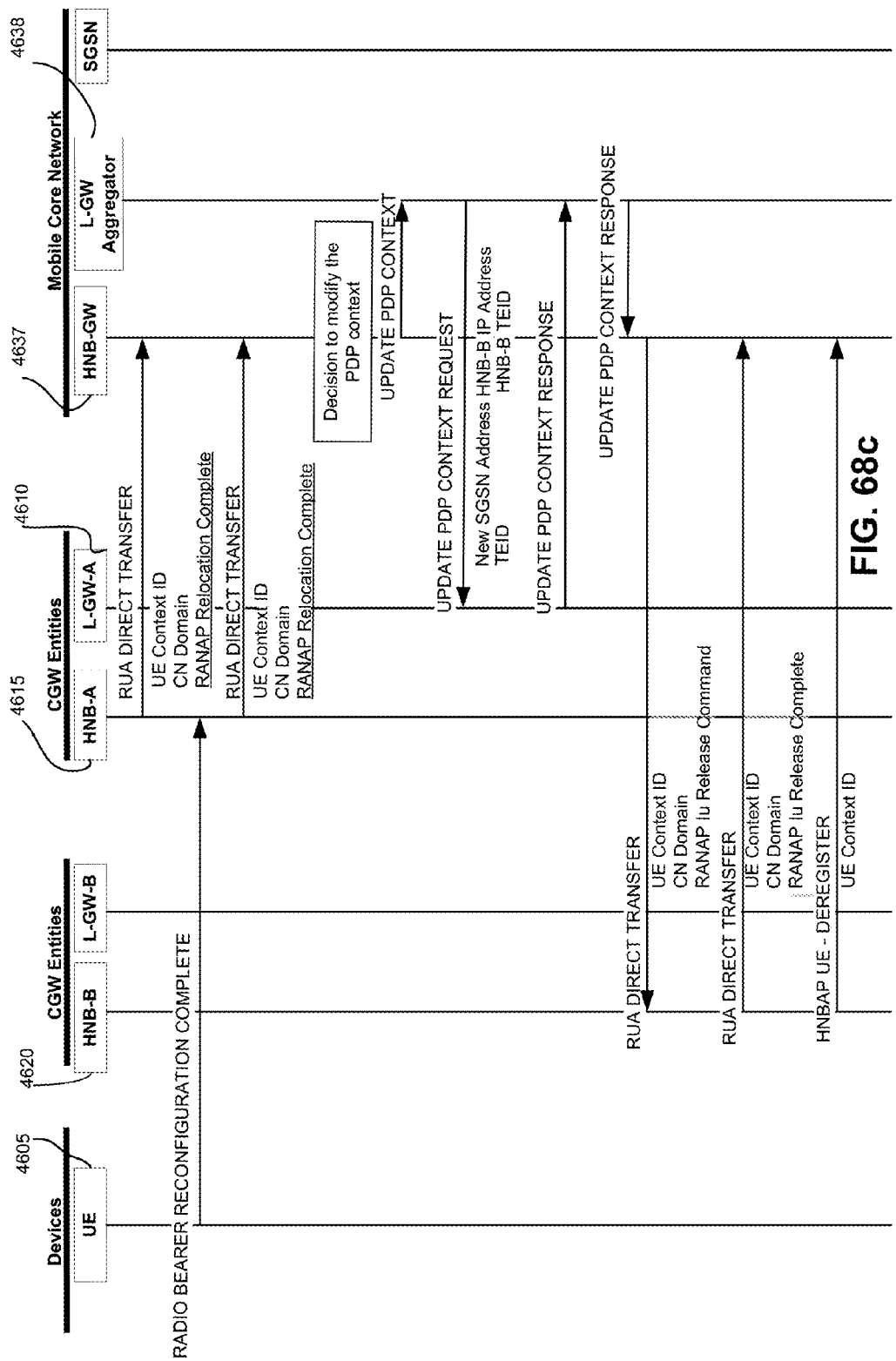

EXTENDED LOCAL IP ACCESS FOR A CONVERGED GATEWAY IN A HYBRID NETWORK

CROSS REFERENCE TO RELATED APPLICATIONS

This application claims the benefit of U.S. Provisional Application No. 61/266,726, titled "Architecture for Hybrid Network Converged Gateway," filed on Dec. 4, 2009; U.S. Provisional Application No. 61/299,738, titled "Inter-base Station Communication," filed on Jan. 29, 2010; U.S. Provisional Application No. 61/322,245, titled "Converged Gateway for M2M and Multimedia Applications in a Hybrid Network," filed on Apr. 8, 2010; and U.S. Provisional Application No. 61/349,531, titled "Solutions for Home (e)Node B based local and remote IP access/offload with routing and mobility optimizations including extensions for converged gateway architectures", filed on May 28, 2010, the contents of which are hereby incorporated by reference herein.

BACKGROUND

Femto cells (e.g., home nodeBs or evolved home nodeBs) may be customer-premise equipment (CPE) that may connect wireless transmit/receive units (WTRUs) over cellular network wireless air interfaces (e.g., UMTS terrestrial radio access (UTRAN), Long Term Evolution (LTE), and code division multiple access (CDMA)) to a cellular operator's network using a broadband IP backhaul. Wired options for the customer's broadband IP backhaul may include two-wire xDSL (e.g., ADSL, ADSL2, VDSL, VDSL2), coaxial cable (e.g., via DOCSIS 1.1, 2.0, 3.0), optical fiber-to-the-home/premises (FTTH/FTTP), and possibly broadband over power lines (BPL). Currently, innovative uses for femto cells are being explored.

SUMMARY

Disclosed herein is a gateway system that provides various features such as Femtocell access to local networks, public Internet, and private service provider networks, e.g., via 3GPP Home Node B (HNB). The implementation of Local IP Access (LIPA), "Extended" LIPA (ELIPA), and Selected IP Traffic Offload (SIPTO) for the design of a "Converged Gateway" (CGW) are disclosed. Devices and configurations are disclosed that may allow for a wireless transmit/receive unit (WTRU) to communicate with a home network via a femto cell (femto access point).

This Summary is provided to introduce a selection of concepts in a simplified form that are further described below the Detailed Description. This Summary is not intended to identify key features or essential features of the claimed subject matter, nor is it intended to be used to limit the scope of the claimed subject matter. Furthermore, the claimed subject matter is not confined to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein:

FIG. 22B is an exemplary illustration of procedures for intra HNBGW mobility (LIPA to ELIPA), wherein FIG. 22B is a continuation of FIG. 22A;

FIG. 68B is an exemplary illustration of a message sequence chart for Intra-HNB-GW Mobility—ELIPA to LIPA, wherein 68B continues 68A;

FIG. 68C is an exemplary illustration of a message sequence chart for Intra-HNB-GW Mobility—ELIPA to LIPA, wherein 68C continues 68B;

DETAILED DESCRIPTION OF ILLUSTRATIVE EMBODIMENTS

A detailed description of illustrative embodiments will now be described with reference to the various Figures. Although this description provides a detailed example of possible implementations, it should be noted that the details are intended to serve merely as illustrative examples.

Figure 1A:
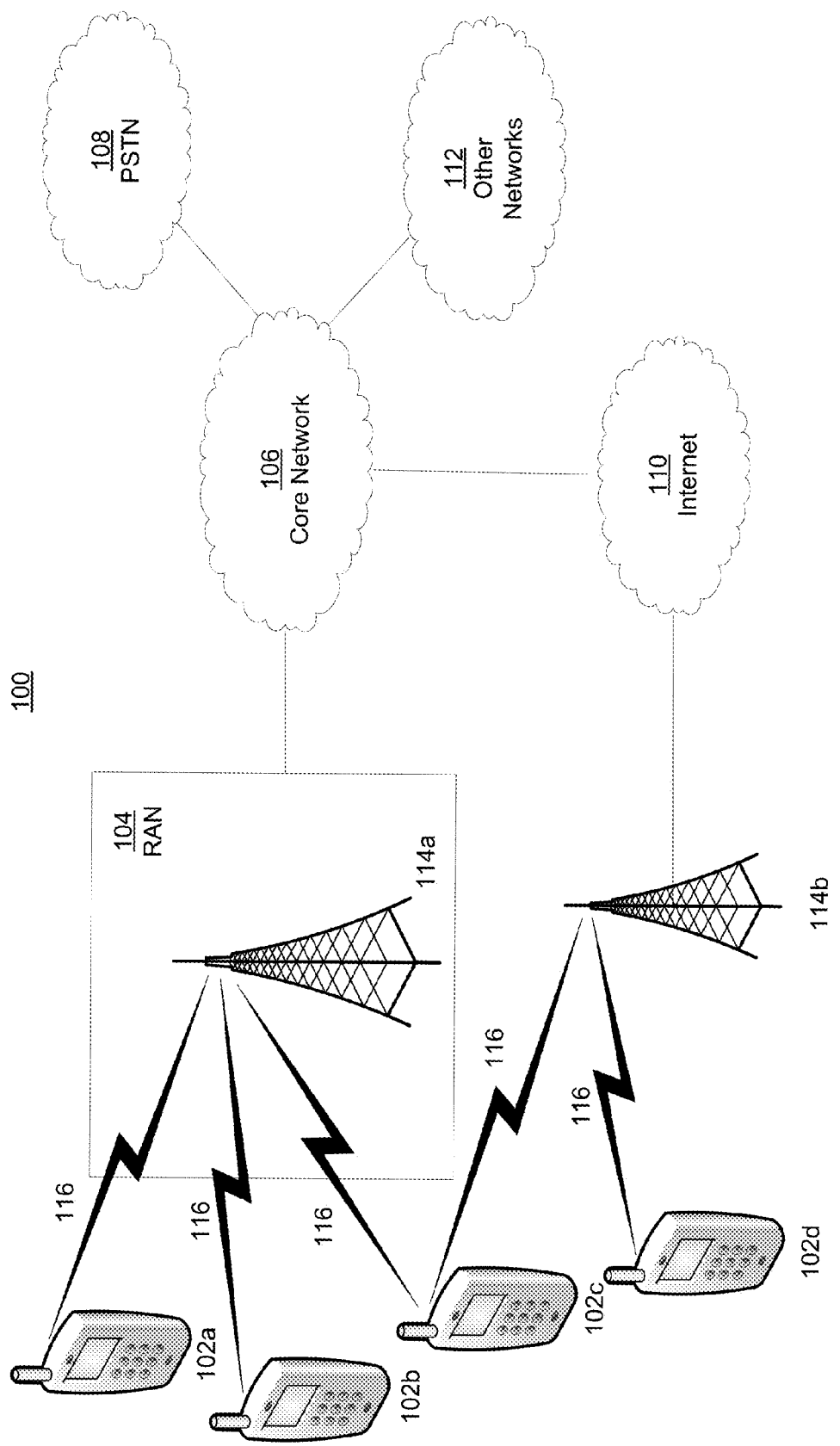
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like. UE may be used herein for exemplary purposes, but any WTRU may be readily applicable for the examples herein.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
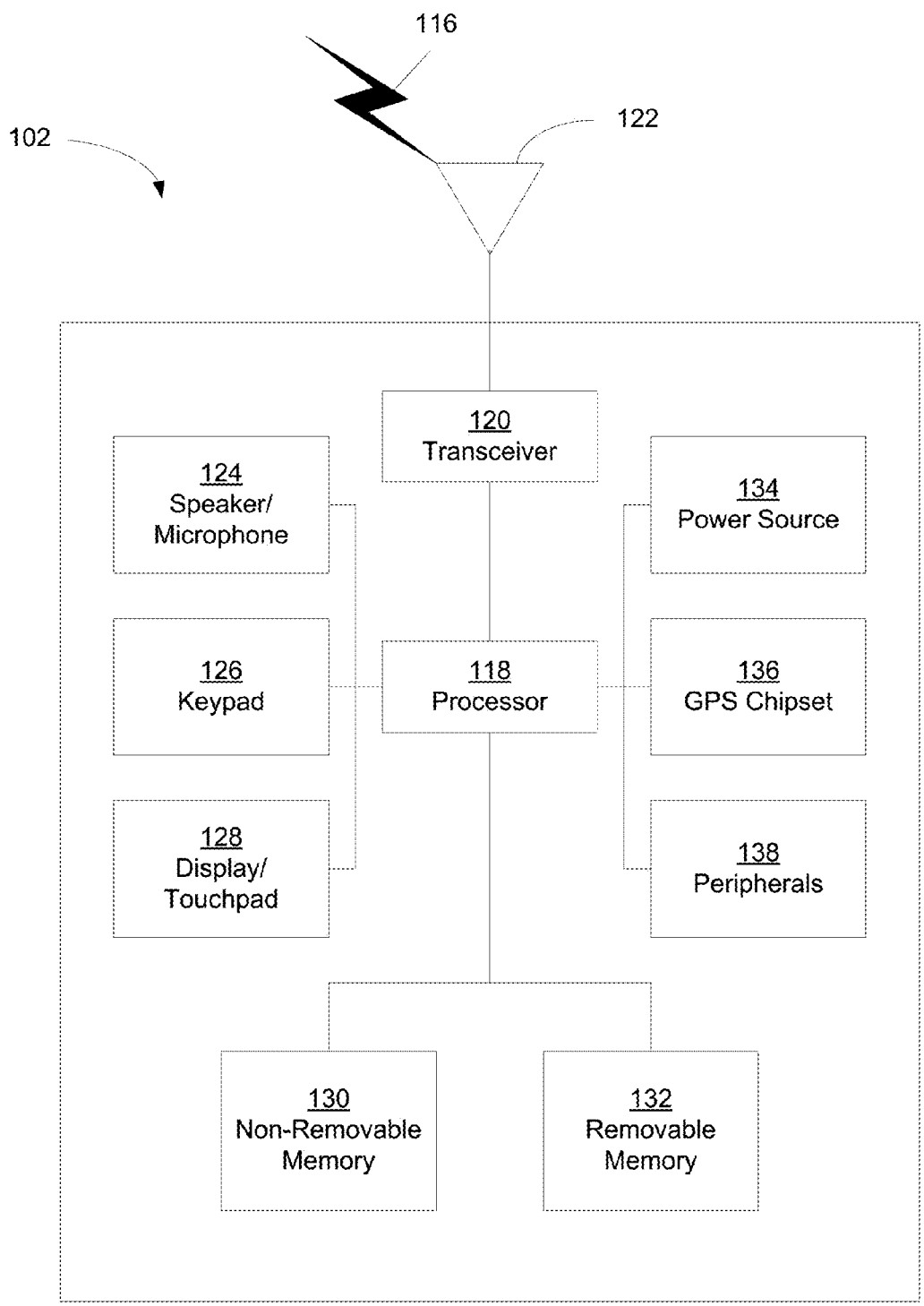
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
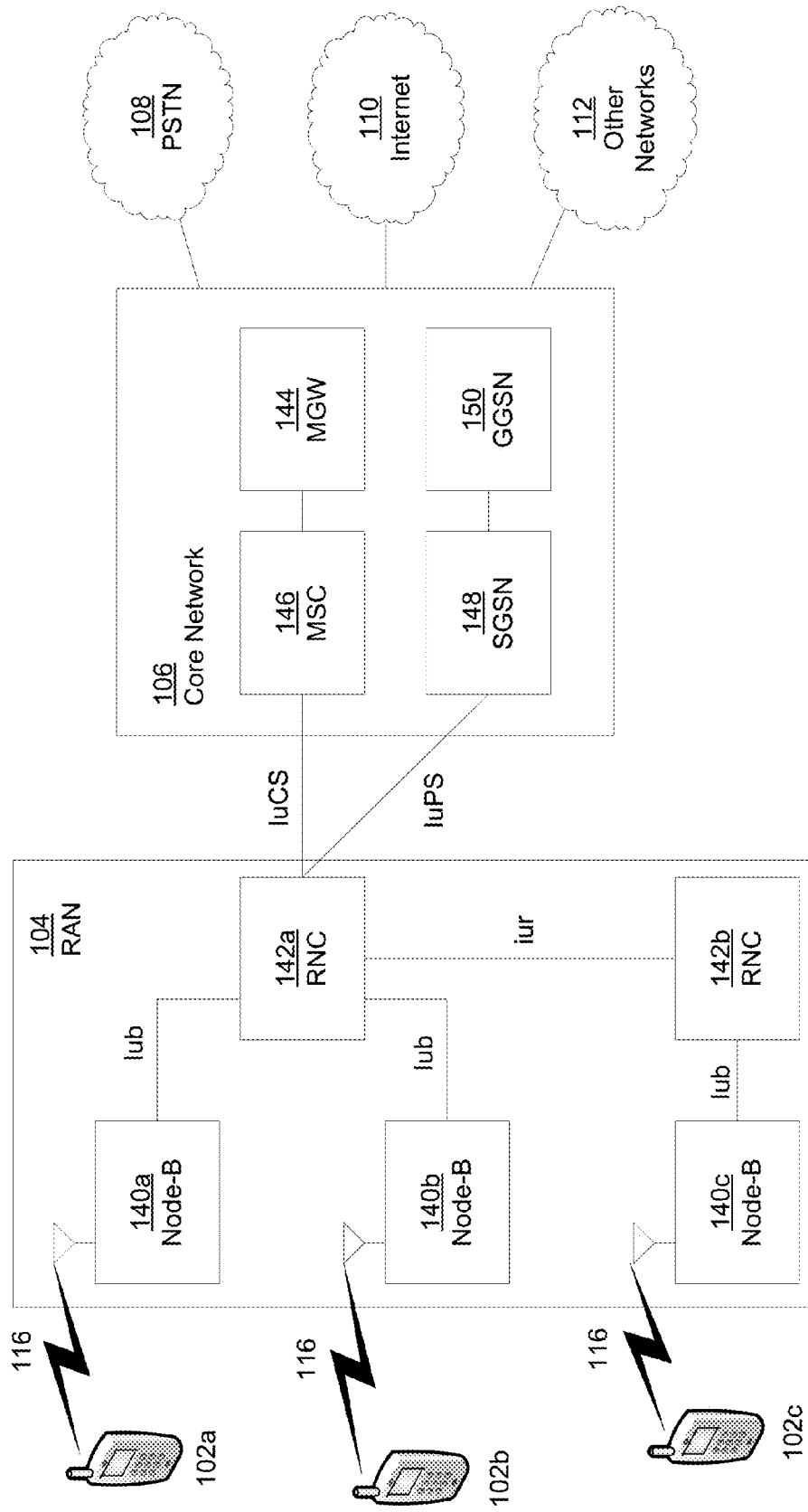
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving general packet radio service (GPRS) support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices. The GGSN 150 may be the device that connects the mobile core network 106 to packet data networks such as the Internet. As noted above, the core network 106 may also be connected to the networks 112, which may include other wired or wireless networks that are owned and/or operated by other service providers.

Although many figures herein display UMTS components the examples herein may also apply to other mobile telecommunication technologies such as CDMA, LTE, LTE-A. In the case of LTE, for example, RAN 104 may include eNode-Bs. The core network 106 may include LTE related mobility management gateways (MME), serving gateways, and packet data network (PDN) gateways. The PDN gateway (P-GW) may be the connection point to external packet data networks, such as the Internet. Also note that the terms managed remote access (MRA) and remote managed access (RMA) are used interchangeably herein.

Home NodeB (HNB) and Home eNodeB (HeNB), which may be jointly referred to as H(e)NB, are 3GPP terms that are not limited to the home only, but are also applicable to enterprise and metro deployment. The term "Femto Access Point" (FAP) may be considered a more general term that may be considered synonymous with H(e)NB. Unless noted otherwise, HNB, HeNB, and H(e)NB are used synonymously in this disclosure.

A H(e)NB may connect WTRUs over the UMTS terrestrial radio access network (UTRAN) or Long Term Evolution (LTE) wireless air-interface to a cellular operator's network using a broadband IP backhaul. Wired options for the customer's broadband IP backhaul may include two-wire xDSL (e.g., ADSL, ADSL2, VDSL, VDSL2), coaxial cable (e.g., via DOCSIS 1.1, 2.0, 3.0), optical fiber-to-the-home/premises (FTTH/FTTP), and possibly broadband over power lines (BPL).

By providing additional intelligence in an evolved HNB platform and offering new value-added services over the broadband IP backhaul, there may be additional opportunities through integration or interaction of an HNB platform with other digital home/neighborhood/enterprise network elements.

Value-added services may include lower cost communication and entertainment options (e.g., "quadruple play"), simplified home network management including remote access, expanded applications for personal devices including audio/video session transfer and universal remote control capabilities, IP multimedia session (IMS)-enabled "local" services, improved personal/home safety, and leveraging of operator-supported cyber-security.

New capabilities may include wireless broadband backhaul options including 3G technologies, and/or higher bandwidth 4G technologies such as WiMAX, LTE, and LTE-A. "Net-neutrality" regulations notwithstanding, this could also be a hedge against future constraints potentially imposed by terrestrial ISP providers in order to avoid exploitation of their broadband wire/cable/fiber network by cellular operators.

New capabilities may also include HNB support for a large number of machine-to-machine (M2M) devices and/or M2M gateways, coordinated multi-RAT delivery of multimedia data, including simultaneous multi-RAT connections, and interconnection of neighboring HNBs to form a neighborhood-area or enterprise-area network, which may facilitate local P2P communications including access to locally cached content.

In addition, the new capabilities may include the interface between a HNB and a wireless access in vehicular environments (WAVE)-enabled vehicle. This interface may assist in session continuity for the users within a vehicle when they arrive or leave home. There also are other uses for this interface such as the transfer of vehicular data to a network.

The following are examples of service requirements that may be supported by the CGW Hybrid Network Architecture: 1) simplified deployment and operation, including auto configuration; 2) all WTRU services as provided by cellular network operators, including mobility to/from macro-cells, support for IMS, M2M gateways, etc . . . ; 3) local device communication with signaling and data through the CGW; 4) local device communication with signaling through the CGW, and data through peer-to-peer (P2P) connections between local devices; 5) local IP access from WTRU to home network; 6) remote access from WTRU to home network; 7) extension of public warning system to home network; and 8) extension of cellular network television service (e.g., multimedia broadcast multicast services—MBMS) to home network.

The following are examples of access requirements that may be supported by the CGW Hybrid Network Architecture: 1) IP-based broadband backhaul towards cellular operator core network; 2) support for closed, open, and hybrid subscriber groups for cellular and WLAN access; 3) UMTS air interface, including support for legacy terminals; 4) LTE/LTE-A air interface; 5) 802.11-based WLAN air interface, including support for legacy terminals and 802.11p WAVE devices; 6) M2M using cellular/WLAN interface/gateway, or directly via alternate M2M interface such as ZigBee, Bluetooth, etc . . . ; 7) support for inter-RAT and inter-HNB access/service transfer; 8) support for Multi-RAT access/service; and 9) local admission control and local resource control.

The CGW design may include the following technology elements: 1) Initialization of CGW components including 3GPP HNB, Local GW, IEEE 802.11 AP, IEEE 802.15.4 WPAN, RF Sensing Module, M2M GW, as well as CGW applications including Dynamic Spectrum Management (DSM); 2) registration of CGW components with external operator network(s) and/or service provider(s), including support for IMS and non-IMS services, external M2M servers, etc . . . ; 3) local IP access (LIPA) between WTRU and residential/enterprise network via CGW; 4) selected IP traffic offload (SIPTO) via CGW; 5) access to local and mobile core operator (MCN) services via BWM-enhanced CGW; 6) idle and active mobility from HNB to HNB, HNB to macrocell, and macrocell to HNB; 7) proactive interference management (PIM) for Assisted Self Organizing Networks (SON); and 8) M2M Gateway functionality, among other things.

Various IP addressing formats may be used. In one embodiment, the gateway may be designed to conform to IPv4 addressing, in either a static or a dynamic addressing mode. For example, the gateway may obtain a public IP address from an ISP DHCP server, private IP addresses from a local DHCP server within the gateway, and private IP addresses from a remote DHCP server in the Mobile Core Network (MCN). The gateway may also incorporate NAT functionality to translate between the publicly routable ISP-assigned IP address and the private gateway-assigned local IP addresses.

IEEE 802.15.4 Wireless Personal Area Network (WPAN) devices interacting with the gateway via a WPAN Coordinator (WPAN-C) may be "auto-configured" with IPv6 addresses with assistance from the WPAN-C. WPAN devices may be auto-configured based on its MAC addresses and an IPv6 network prefix provided by an IPv6 routing function in the WPAN Coordinator. The HNB functionality in the CGW may be selected to be fully compliant with UMTS HNB standards, and may support IPSec tunnel establishment with the MCN via the public Internet.

Existing standards may address issues of idle mobility. In addition, active HNB mobility may support combined hard handover and serving radio network subsystem (SRNS) relocation procedures including support for lossless handover as described herein.

Bandwidth Management in the CGW may include a Bandwidth Management (BWM) Server that may provide multi-RAT distribution of IP packet data between cellular (e.g., UMTS) and 802.11 air interfaces for devices with BWM Clients that support multi-mode capabilities. Some options for integrating the BWM Server into the CGW include integration of the BWM Server functionality within the HNB, or integration of the BWM Server as a standalone entity between a standard HNB and the MCN. In an another embodiment, the BWM server may be integrated with multiple HNBs, which may be useful in an enterprise deployment.

A BWM server may have the following functionality: 1) DNS Server (or proxy DNS Server); 2) DNS Client; 3) DHCP Client; 4) GTP entities that support 3GPP TS 29.060, v9.1; and 5) IPSec support. In addition, the BWM server may have deep packet inspection capabilities for carrying out the following actions: a) radio access bearer (RAB) Assignment Request; b) RAB Assignment Response; c) DNS Request; d) TR-069 Set Parameter Value; e) RANAP Relocation; f) RANAP Forward SRNS Context; and g) forwarded DL data packets during mobility, among other things.

A home or enterprise network may be configured to have a cable modem or digital subscriber line (DSL) connection to the public internet. It may also have HNBs and BWM servers able to connect to each other in the same Home Area Network (HAN) or Enterprise Area Network (EAN) and HNB and BWM server that have IP address on the HAN or EAN.

The HNB and MCN may be configured to have the following: 1) no change to HNB or MCN element protocols; 2) HNB with initial HMS fully qualified domain name (FQDN) burnt into memory; 3) HNB configured so that primary DNS server is BWM server; 4) HNB configured to have a pre-shared key in common with the BWM Server for use during IPSec tunnel establishment and use; 4) initial or serving SeGW configured to have a pre-shared key in common with the BWM Server for use during IPSec tunnel establishment and use; and 5) HNB configured to have initial SeGW FQDN burnt into memory, among other things.

A BWM server may be configured so that the initial SeGW FQDN is burnt into memory and so that it may agree with Initial SeGW FQDN in HNB. The BWM server also may be configured to know the location of the "outer" DNS server which may be done as part of the DHCP process of assigning local IP address. "Outer" DNS Server is a DNS Server that may be on the public Internet while a "inner" DNS Server is a DNS Server within the Mobile Core Network. The BWM Server may be powered up and have a local IP address prior to the HNB being powered on. A BWM solution may be provided at a macrocell level and may not be necessarily implemented in all HNBs. The "BWM" layer may reside between the Transport and IP Layers in both the client and server. The embodiments described herein support lossless as well as lossy data services There are multiple ways to trigger the BWM server to establish an IPSec tunnel with the initial or serving SeGW. In general, the BWM server may support the establishment of an IPSec tunnel with the HNB and the BWM Server may have the MCN IP address provided by the initial or serving SeGW during the establishment of its IPSec tunnel with the serving SeGW. Possible ways to trigger the BWM server to establish an IPSec tunnel may include the following: 1) IPSec tunnel from the BWM server to the initial or serving SeGW triggered by the HNB requesting the initial or serving SeGW IP address via DNS; 2) BWM Server may listen to the IKE_SA_INIT message from the HNB and trigger itself to establish an IPSec tunnel with the initial or serving SeGW; and 3) the application of power to the BWM Server may trigger the IPSec tunnel.

Figure 26:
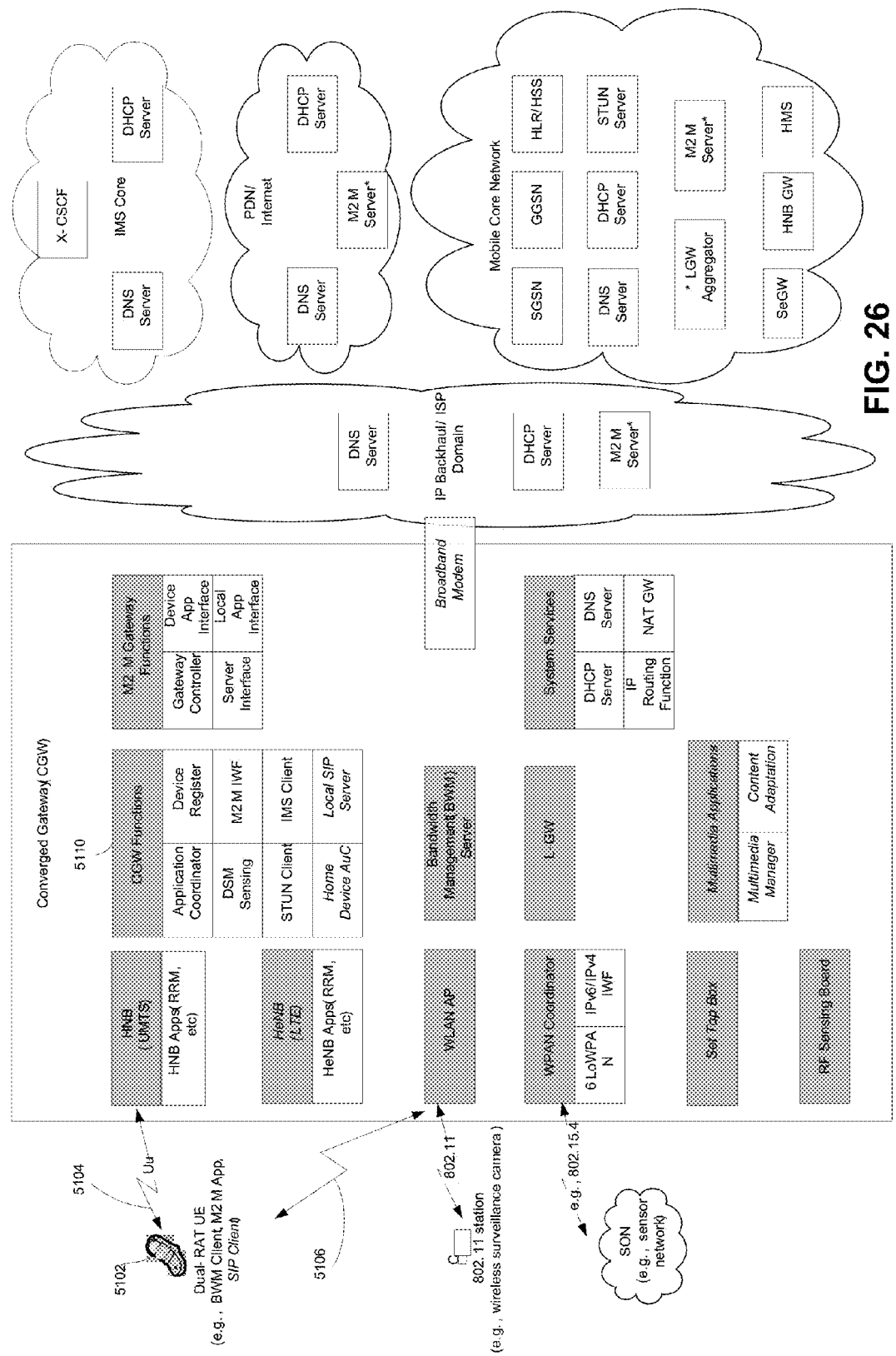
FIG. 26 is an exemplary basic architecture of a Converged Gateway Hybrid Network.

FIG. 26 is an exemplary basic architecture of a CGW Hybrid Network. The physical implementations may vary depending on the specific functions of interest. A description of the major components is summarized herein.

An extension to the architecture shown in FIG. 26 is one where a particular interface shown in FIG. 26 (which we shall refer to as a logical interface) may actually be implemented by more than one physical interface. For example, an end device, such as a cell phone or an appliance 2602, may have both WiFi 2606 and a cellular interfaces 2604. In this example, the logical interface would be a physical multi radio access technology (multiRAT). This may facilitate multiple transmissions being used to increase the data rate or to provide link robustness (i.e., multiRAT diversity) or to provide flexibility where each RAT is selected in an adaptive manner depending on the suitability of the RAT to the data being transferred, wherein the suitability may be aspects such as security, data rates supported, QoS supported, cost, etc. Variations are possible wherein subsets of functions are implemented. For example, the body area network (BAN) may be absent in a particular variation.

The CGW Infrastructure may consist of home "core network" elements including any hardwired facilities (e.g., Cat. 5 cable, coax cable, phone line, power line, fiber). The infrastructure elements typically consist of stationary line-powered devices that may also operate via battery-backup in case of temporary power outages, thereby ensuring continuity of critical services involving security, healthcare, and public safety. Such devices may include cable/DSL modems, access points, routers, M2M gateways, media servers, registration/security database servers, and a HNB.

In FIG. 26, some functions of the CGW platform are shown in the box labeled CGW Functions 2610. These functions may logically exist within the CGW platform, but may be implemented in either a centralized fashion, e.g., within the HNB, or distributed among multiple nodes.

Herein the high level components of the CGW infrastructure network may be considered as separate entities in order to facilitate an understanding of the generic architecture. However, commercial implementations of the generic architecture may combine various components for improved performance and reduced size/cost/energy consumption. For instance, the HNB could be physically integrated with a residential gateway, WLAN access point, and TV STB to provide a single-box multi-technology "converged gateway." To further support this, HNBs, broadband modems, and STBs may already share a common application layer protocol for remote management based on the Broadband Forum's TR-069 standard. Additionally, some operators offer both residential broadband and mobile services, so for them there may be an incentive to integrate femtocell base stations with residential gateways and Wi-Fi routers.

Of specific interest to our architecture definition is the HNB's ability to provide WTRU-enabled devices with "Local IP Access" (LIPA) to the home-based network and to the external Internet. In addition, HNB may support logical and/or physical connection to and/or integration with other networks via gateways such as WLAN AP.

The HNB may connect via Ethernet to the customer's residential gateway which may provide access to the cellular operator's core network through broadband cable, fiber, or DSL. Fixed wireless broadband access may also be an option, e.g., WiMAX or LTE cellular technologies may be used. This may be a desirable option if, for example, future policies allow ISP providers to limit and control indiscriminate use of their broadband facilities by H(e)NBs from competing cellular operators.

Non-operator provided WLAN APs may be used in the home network the CGW may also utilize 802.11n-based APs managed by the cellular operator. This may allow tighter integration with the overall solutions, including support for all of control functions (e.g., security, mobility, network management, DSM, etc . . . ).

M2M devices in the CGW domain may be on the same subnet. IPv4/IPv6 translation may be covered in the WPAN Coordinator, therefore all communication within the home subnet may be IPv4-based. Communication within the WPAN may be IPv6 based. Any IP version (e.g., IPv4 or IPv6) may used to implement the embodiments herein.

M2M Gateways may support multiple interfaces, e.g., they may communicate within wireless capillary networks via short-range low power interfaces, while exchanging information with the CGW, which may further disseminate the information into the WAN. Inter-M2M Gateway communication (e.g., for inter-gateway mobility) may also be accomplished via the CGW, or directly, for example, when the M2M gateways share a common M2M technology. Although end devices such as sensors are typically designed for extremely low power consumption, the M2M Gateways could themselves be plugged into power outlets and may easily support multiple air interfaces with higher duty cycle communications. Note that M2M gateways are potential candidates for reconfigurable hardware technologies based on FPGAs, SDR, and software configurable hardware, such that a single piece of equipment can be marketed to support multiple standards.

Multi-RAT mobile terminals may also act as M2M gateways. For instance, a handset with cellular, WiFi, and Bluetooth capabilities may communicate with healthcare body sensors via Bluetooth or WiFi, and convey the information to a remote network via WiFi or cellular.

The traditional role of a set-top box (STB) is to control and display inter-active subscription TV services provided via coaxial cable, digital subscriber line (xDSL), optical fiber-to-the-home (FTTH), satellite, or possibly via wireless cellular technologies such as WiMAX or future LTE/LTE-A. Herein primarily the delivery of TV (primarily digital TV (DTV)) to the STBs will be assumed. The DTV content may be delivered over modulated radio frequency (RF) channels or as IPTV. Digital TV and digital radio options include "over-the-top" transport using the Internet, subscribed satellite broadcasts, and terrestrial over-the-air.

Audio visual devices (A/V devices) in the multimedia network may be wireless-enabled, and that the STB function may wirelessly transmit subscribed A/V content from the service provider, as well as local content from the integrated home network (e.g., media server, handset, and potentially via the HNB and AP). As such, the role of the STB can be expanded to that of a "media gateway."

In order to support the proposed CGW functions, various nodes such as servers, databases, and storage facilities also may need to be supported. For example, these nodes may contain personal media and data content, identification and addressing registries, as well as security and access control policies.

Figure 27:
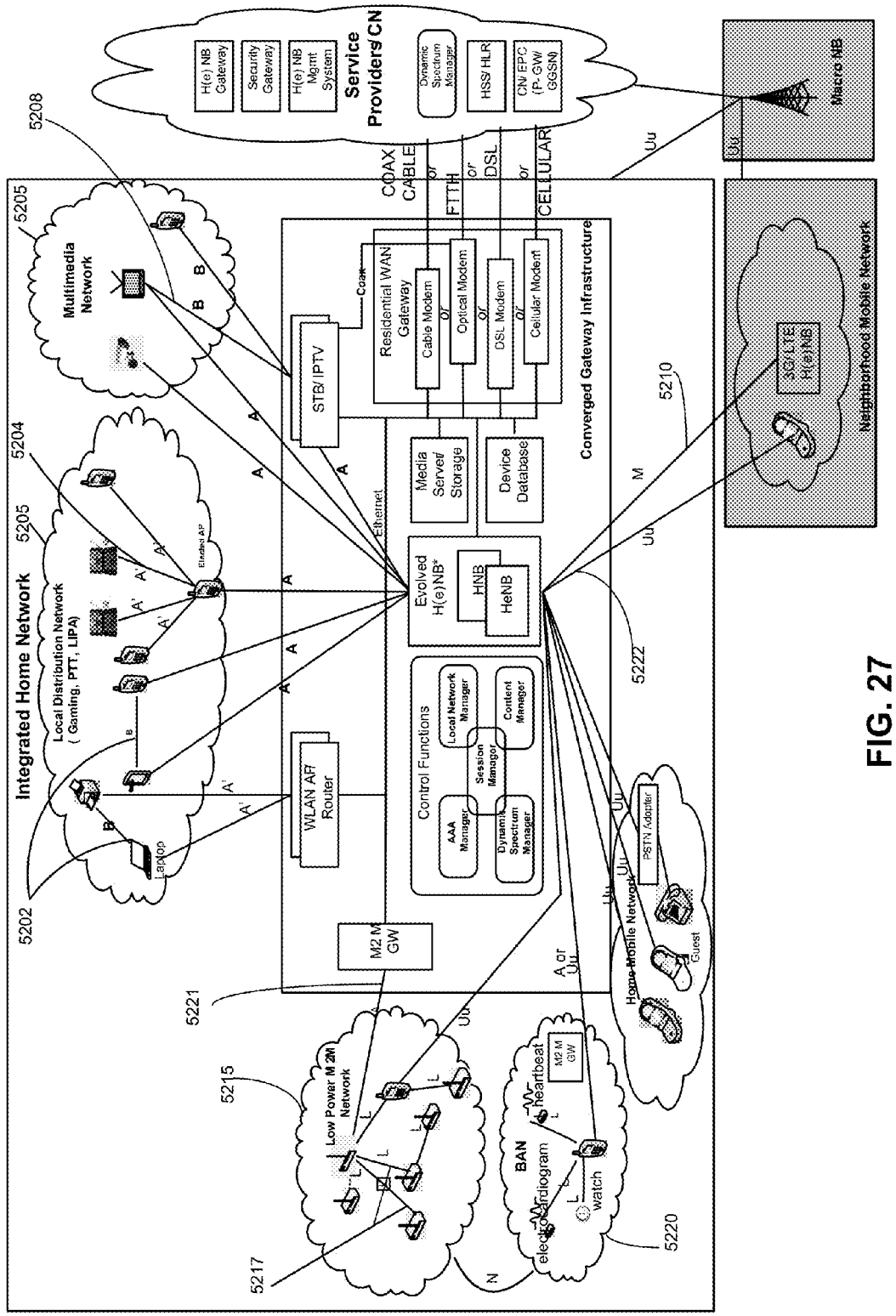
FIG. 27 is an exemplary illustration of an architecture of a CGW Hybrid Network.

FIG. 27 is another exemplary illustration of a CGW architecture. FIG. 27 shows the networks that interact with the CGW. A local distribution network 2705 may include productivity devices that exchange information between local network nodes (e.g., computers, printers, etc.), or externally to other networks via gateway-enabled devices. Such networks may operate in infrastructure modes (e.g., via base stations or access points) or non-infrastructure modes (e.g., peer-to-peer or master-slave), and may be supported by various wireless technologies including WiFi or cellular. For example, applications include file transfer, web browsing, and email, among other things.

There are several variations of this architecture. For example, the interface can be Ethernet, but may be implemented by other means such as backplane, power line networking, etc. Similarly, the interface in FIG. 27, which can be termed as 'M' 2710, may be the 3GPP defined X2 interface or possibly an enhancement thereof. An M interface may be considered n inter-H(e)NB interface.

FIG. 27 illustrates an example integration of various local networks, such as low power machine-to-machine (M2M) networks, body-area networks (BAN), multimedia networks, and local data/voice communication networks. In FIG. 27 interfaces are shown between devices in the local distribution network. The interface A' interface 2704, may be an evolved infrastructure mode 802.11-like interface with a centralized Access Point (AP) controlling communications to connected devices. Direct links can be set up between peer devices using a logical B 2702 interface. Typically, the B 2702 interface provides high throughput and low latency.

Low power M2M network 2715 may include wireless sensor and home automation. Such sensors and home automation networks typically involve data gathering devices which convey raw, processed, or aggregated information between local network nodes, and may include external communication with other networks via gateway-enabled devices. Such sensors are usually low data rate, low duty cycle, and power-constrained devices. In addition to passive sensing, some devices may support active control functions such as sounding an alarm or flipping a switch. Cluster formation of the sensor networks may occur via device discovery procedures.

M2M networks may operate in infrastructure modes (e.g., via base stations or access points) or non-infrastructure modes (e.g., peer-to-peer or master-slave), and may be supported by various technologies including ZigBee, Bluetooth, WiFi, or cellular. In FIG. 27, the logical L 2717 interface may represent any of the aforementioned technologies (e.g., Wifi and Zigbee). The interface typically provides a low throughput, and assumes that the devices are power constrained. Applications may include home security, surveillance, health monitoring, energy management, HVAC control, WAVE, etc.

Somewhat similar to the low power M2M networks, body area networks (BANs) 2720 may include wearable/implantable wireless sensors that may convey information locally to the user or externally to other relevant entities via a CGW. The gateway device may also act as an aggregator of content from the wireless sensors.

Wireless multimedia networks 2706 typically include home entertainment equipment that exchange multimedia information (e.g., audio, video, data) between local network nodes, or externally with other networks via gateway-enabled devices. These devices generally require support for much higher data rates than sensor networks. Such networks may operate in infrastructure modes (e.g., via base stations or access points) or non-infrastructure modes (e.g., peer-to-peer or master-slave) and may be supported by various technologies including WiFi or cellular. Applications include real time audio/video, playback of locally/remotely stored content, automated sync between devices, live transfer of sessions between devices, etc. In FIG. 27, the logical B 2708 interface may be used between devices in the multimedia network.

The cellular network may overlap with parts of the previously described networks, and may include macro-cell, inter-Home (e)Node B, and intra-Home (e)Node B elements. Devices may include Closed Subscriber Group (CSG) and non-CSG WTRUs, and may be used for traditional services such as voice, text and email. In addition to traditional functionality, the cellular operator's core network may be expected to include support for future value-added services enabled by the evolved CGW platform The CGW may communicate with a number of devices within the local clouds. Note that not all devices in the local clouds need to communicate with the CGW. For instance, some devices may not have the necessary radio access capability. Alternatively, some devices may decide to restrict communication within the local cloud in order to conserve resources (power, storage, etc, . . . ). For devices that are capable and willing to communicate with the CGW, this communication may be via a logical A 2721, interface, that provides synchronization, control, and optionally a data plane functionality. These functions may be achieved through dedicated physical channels, or through shared channels. Synchronization provides the local cloud devices with the reference timing, and optionally an indication of where to find the control information. The control information may provide the signaling (between local cloud device and CGW) to allow local cloud device registration, local cloud device (re)configuration, measurement reporting to CGW, local cloud device assistance, etc. The A 2721 interface may allow a level of centralized control for interference management and load management within the converged gateway network.

The A interface may be implemented using a new air interface, optimized for the specific application and conditions (home, office, industrial, etc . . . ). Alternatively the functions may be carried over the Uu interface 2722 (e.g., H(e)NB interface) or over an 802.11-like interface (shown as A' 2704 in FIG. 27).

Figure 28:
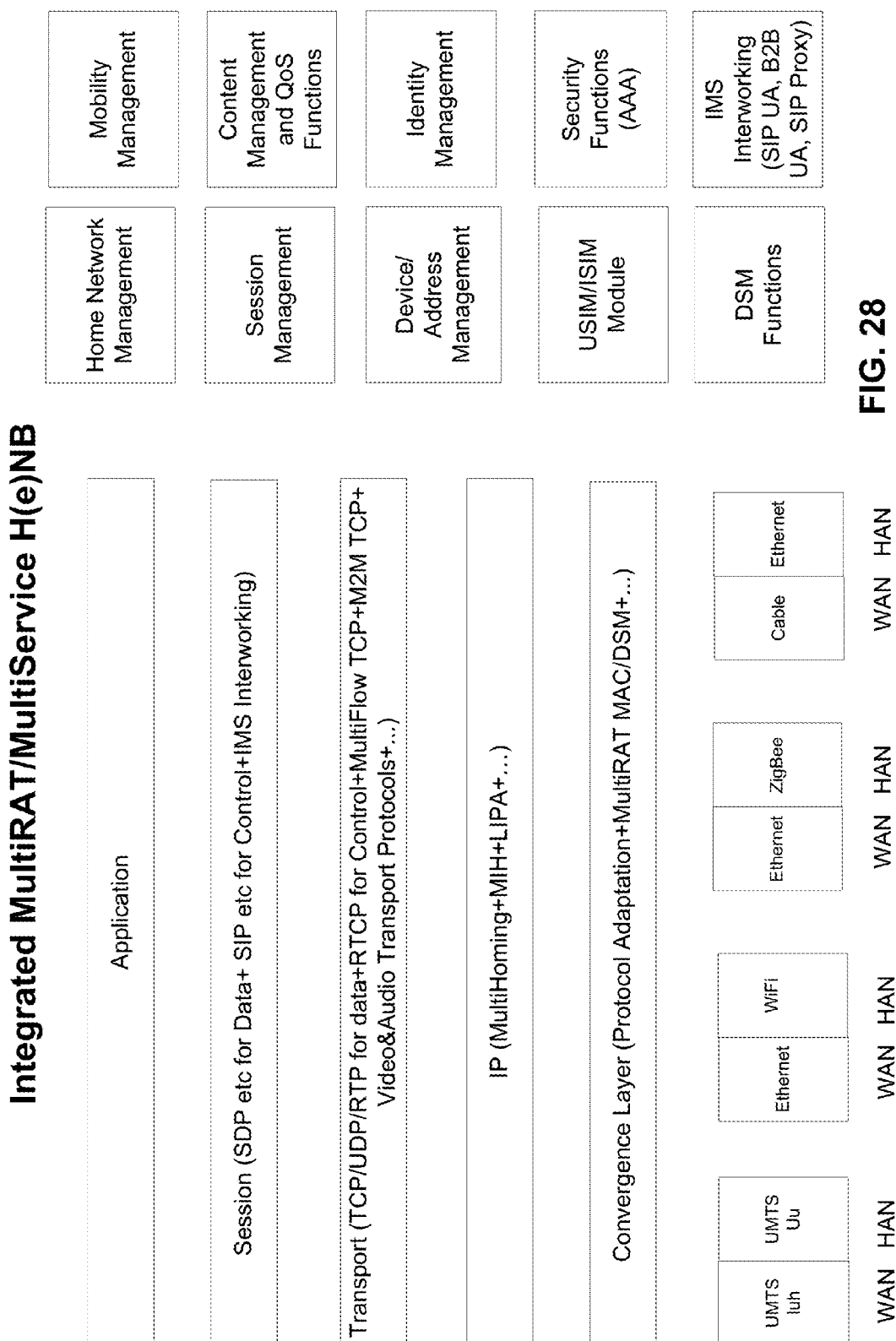
FIG. 28 is an exemplary block diagram that illustrates the high-level architecture of a Converged Gateway.

FIG. 28 is an exemplary block diagram that illustrates the high-level architecture of the Converged Gateway.

The CGW may be the central entity in a home (or enterprise) that contains a Broadband Modem, a Cellular H(e)NB, a WiFi Access Point, an IP Router and possibly other functional and physical entities, and serves to integrate the various sub-Networks in the integrated home network (IHN). The CGW may provide a logical binding to a home, just as a mobile phone may provide a logical binding to a person. A home, with all its devices, sensors, appliances, etc., may become identifiable by a CGW, so that each of the individual home devices may be indirectly addressable via the CGW. In return, the CGW may become a gateway for each home device to communicate with the wide area network (WAN) as well as other devices locally within the IHN.

A CGW may have a unique identifier, and attached to this identifier may be a list of home devices, each of which may have its own identifier. Furthermore, since the CGW, may be a communicating entity, where the communication services may be provided by a network operator, the CGW identifier may also include the identity of the network operator. While the CGW identity may be any alpha-numeric or binary value, it also may be a user friendly identity. For example, the home address may be the CGW identity, coupled with the Network Operator identity. If the home address is 123 Freedom Drive, Happyville, Pa. 10011, USA and the communication services are being provided by Universal Communications Corporation, then the CGW identity may be 123_Freedom_Drive, Happyville,PA__10011, USA@Universal_Communications.com. Individual Sub-Networks and devices may further be appended to this identity. For example, Thermostat#123_Freedom_Drive, Happyville,PA__10011, USA@Universal_Communications.com, where the #sign may be used to denote the split in the address.

Other architectures for the CGW are possible, by adding or deleting certain functional entities. For example, the ZigBee modem may be deleted and a Bluetooth modem added.

CGW Architecture may have many elements. For example, the CGW architecture may comprise the following local devices: 802.15.4 devices (WPAN), 802.11 devices, WTRUs, generic IP devices (e.g., printer, digital picture frame, etc.), BWM client enabled multimode devices. Some CGW entities may include HNB, WLAN-AP, WPAN-C, LGW, BWM server, RF sensing module, among other things. CGW applications may include M2M IWF, application coordinator, IMS client, STUN client (e.g., for ELIPA mobility), and DSM spectrum sensing function (SSF), among other things.

Additional CGW architecture elements may include: M2M gateway; M2M server; M2M applications; system services (e.g., local DHCP server, local DNS server, IPv4 router, NAT); ISP network (e.g., ISP/"outer" DNS server); MCN (MNC/inner DNS server, HNB management system, SeGWs, HNB gateways, LGW aggregator, SGSN, GGSN, RNC (e.g., for handover between HNB and macrocell), STUN server); and IMS core network (e.g., IMS CN DHCP, IMS CN DNS, IMS CN x-CSCF).

The home network manager, may provide semi-static management of the home network including support of Self Organizing Network (SON) features. This function may discover the access technologies and associated functional capabilities available to the Converged Gateway.

A session manager is in the CGW platform. This function may control the transfer of media, data and voice sessions between various networks or devices shown in FIG. 27. This function may be centralized, e.g., in the H(e)NB, or distributed among home infrastructure nodes (e.g., in the case of "loose" integration). The initiation of session transfers may be based on user interaction, or automated response based on mobility, context awareness, event-driven cues, and stored user profiles. Once initiated, the Session Manager may control the transfer, possibly involving the cellular operator and its knowledge of "registered" devices within the home, e.g., for digital rights management (DRM). This function may interact with the Content Management function for some transfers.

The Content Manager may handle functions such as content adaptation, e.g., transformation of required media formats between the home network and mobile handheld devices. This may include a content decomposition function.

The Dynamic Spectrum Manager (DSM), as shown in FIGS. 26 and 27, may be defined as the entity that facilitates assignment of the right RAT(s)/frequencies/bandwidth to the right application at the right time. The DSM may optimize utilization of available spectrum to minimize the local interference levels, satisfy the required QoS, allows spectrum aggregation using the same or different radio access technologies (RATs), and oversee the spectrum sensing and environment-based information fusion while enabling high throughput real-time multimedia content sharing among local devices.

In the context of the CGW, Dynamic Spectrum Management (DSM) may be considered as a common service providing spectrum sensing functions (SSF) and bandwidth management functions (BMF). For example, to assist with the self-organization of 802.15.4-based WPANs, the WPAN Coordinator may interact with DSM to obtain initial and alternate channels for operation. Similarly, the Bandwidth Management (BWM) Server may interact with DSM to decide on bandwidth aggregation and/or switching policies.

A security manager may include Authentication, Authorization, and Accounting (AAA) functions and may facilitate use of operator resources (e.g., providing proxy functions as needed). Also considered here are the open/closed/hybrid modes of operation of the H(e)NB and WLAN APs.

The IMS interworking functions may enable managed IMS-based services like VoIP and IPTV to be delivered to the home. Operator provided services may be accessed via remote application servers, and may also be accessed from local application servers or cached storage. Support may be provided for IMS-enabled and non-IMS-enabled devices in the home. Support for non-IMS-enabled devices may be provided by an IMS inter-working function in the converged gateway.

There may be an RF sensing module. The module may be a centralized single scanner entity as part of CGW. A embodiment may have the sensing performed in the CGW represent the interference that is seen by the entire network, in which case a single sensing node may be sufficient. The scanner outcomes may drive a SW entity ("Spectrum Sensing Function") as part of CGW to determine preemptive frequencies against interference. The scanner outcomes also may support interference mitigation and bandwidth aggregation decisions. In an embodiment the RF sensing module may be able to scan approximately 3 GHz.

Exemplary illustrations of system description of the CGW have been captured via message sequence charts (MSCs) detailing the interactions between technology elements of the system. The MSCs capture high-level flows while encapsulating example detailed messaging within individual procedure blocks.

Figure 2:
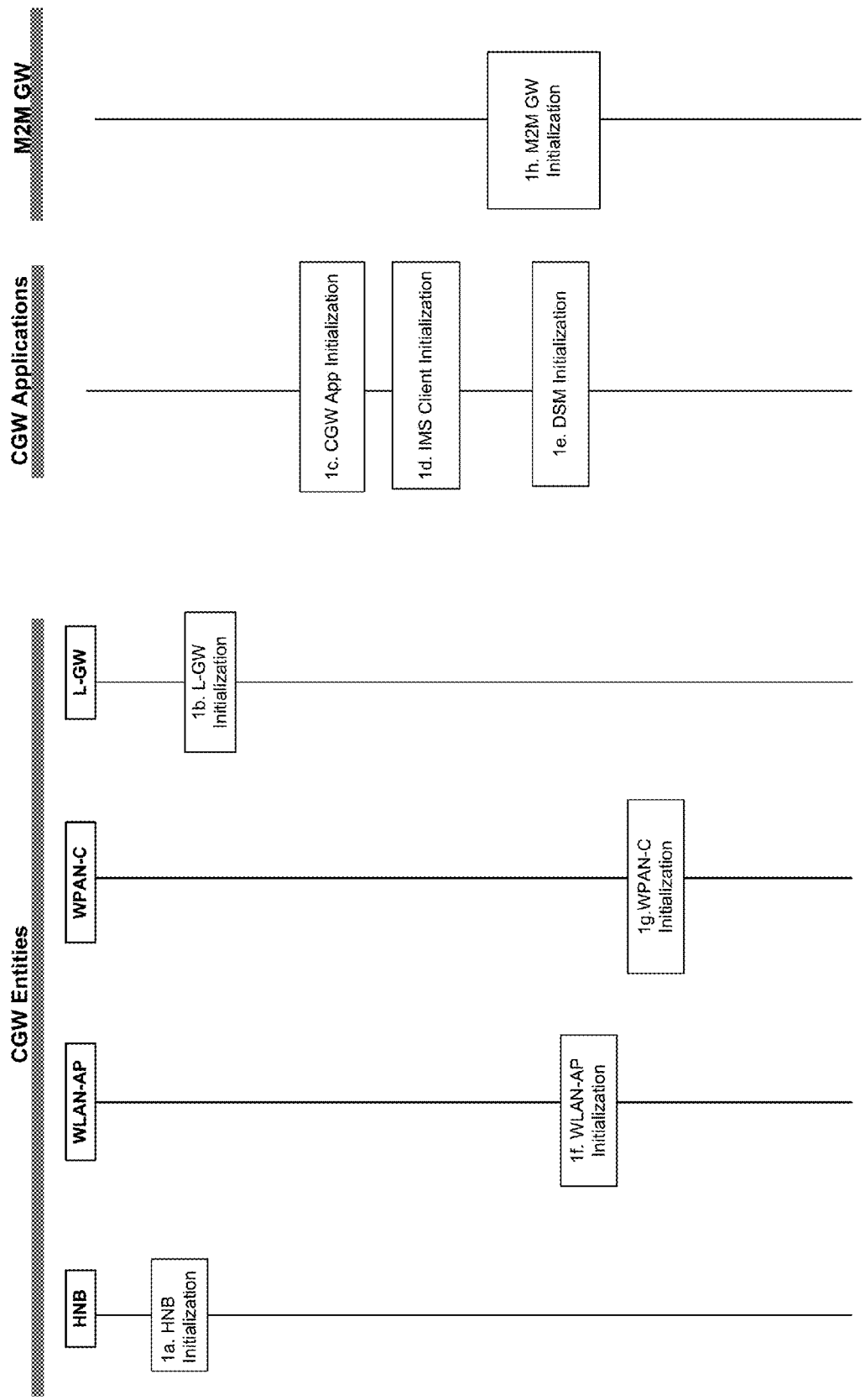
FIG. 2 is an exemplary illustration of a procedure for CGW initialization.
Figure 3:
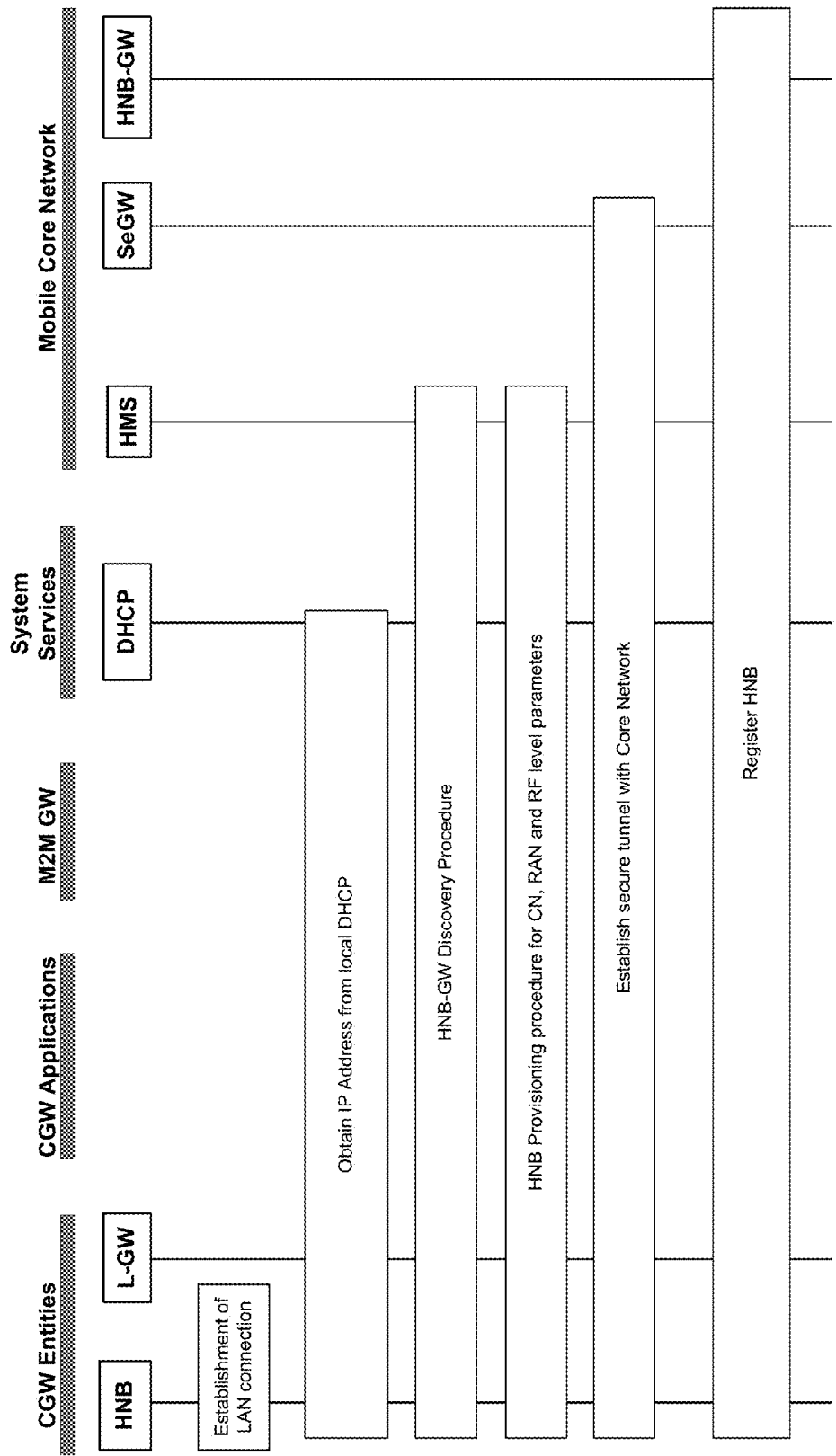
FIG. 3 is an exemplary illustration of a procedure for HNB initialization.
Figure 4:
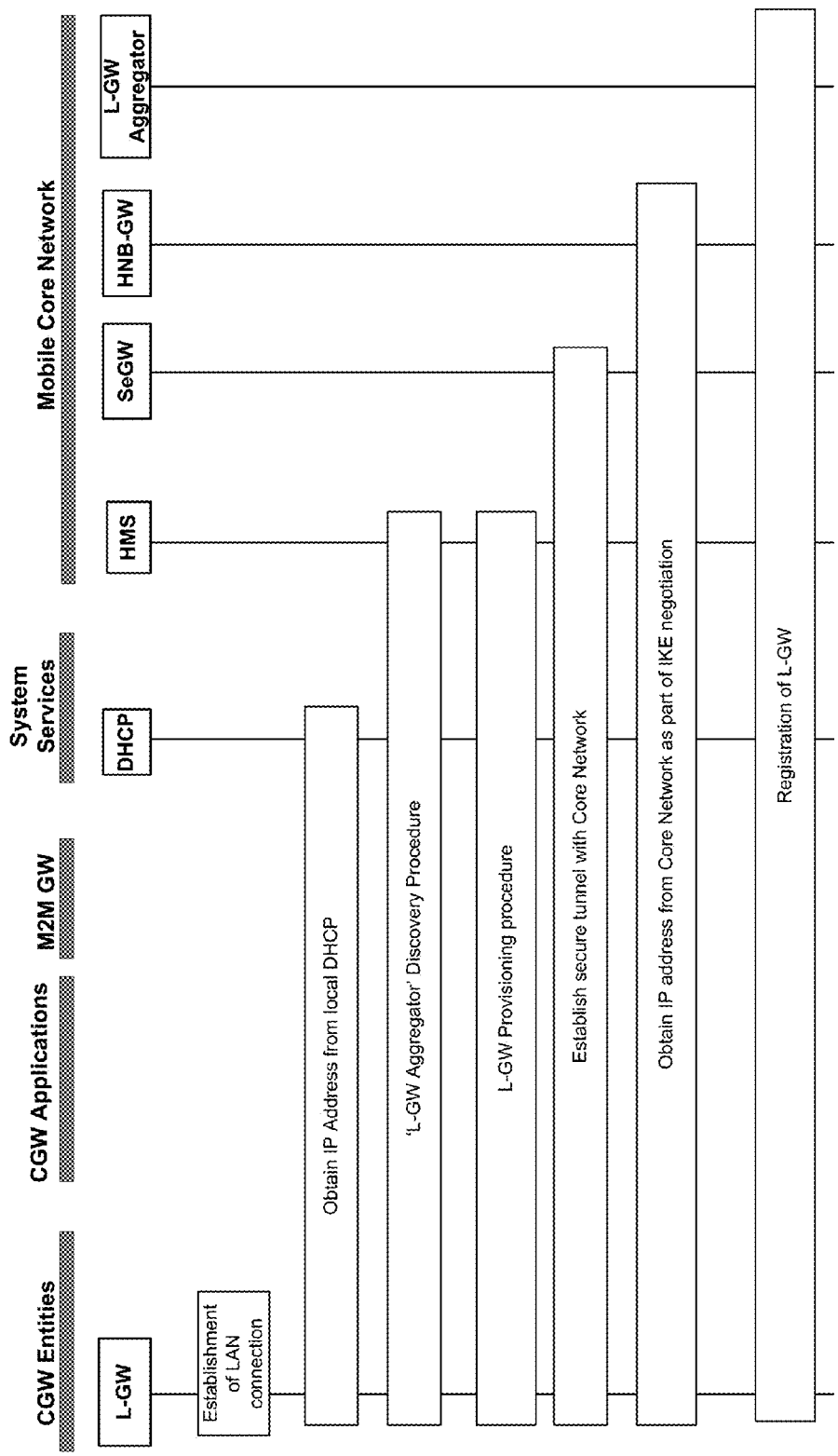
FIG. 4 is an exemplary illustration of a procedure for LGW initialization.
Figure 5:
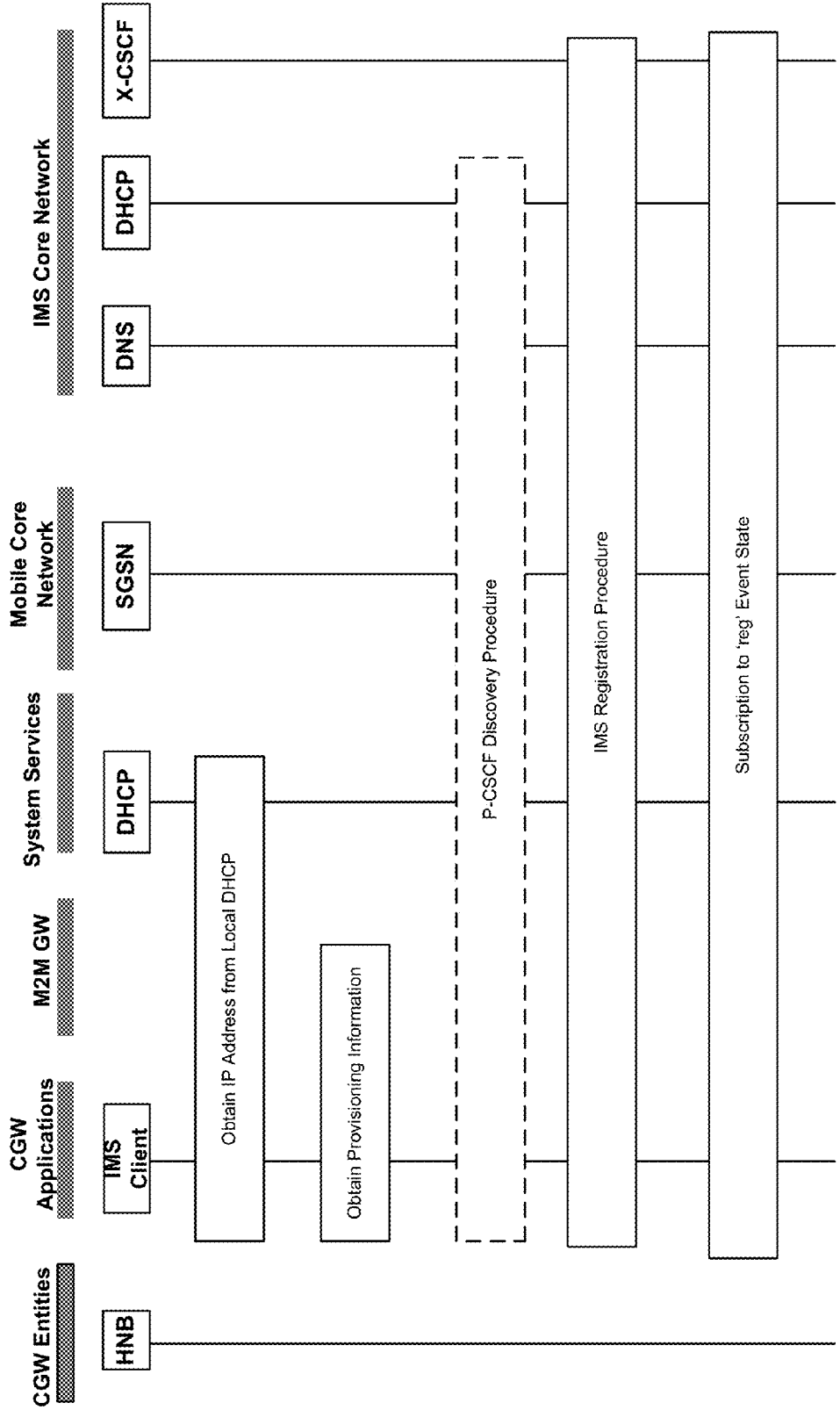
FIG. 5 is an exemplary illustration of a procedure a IMS client initialization.
Figure 6:
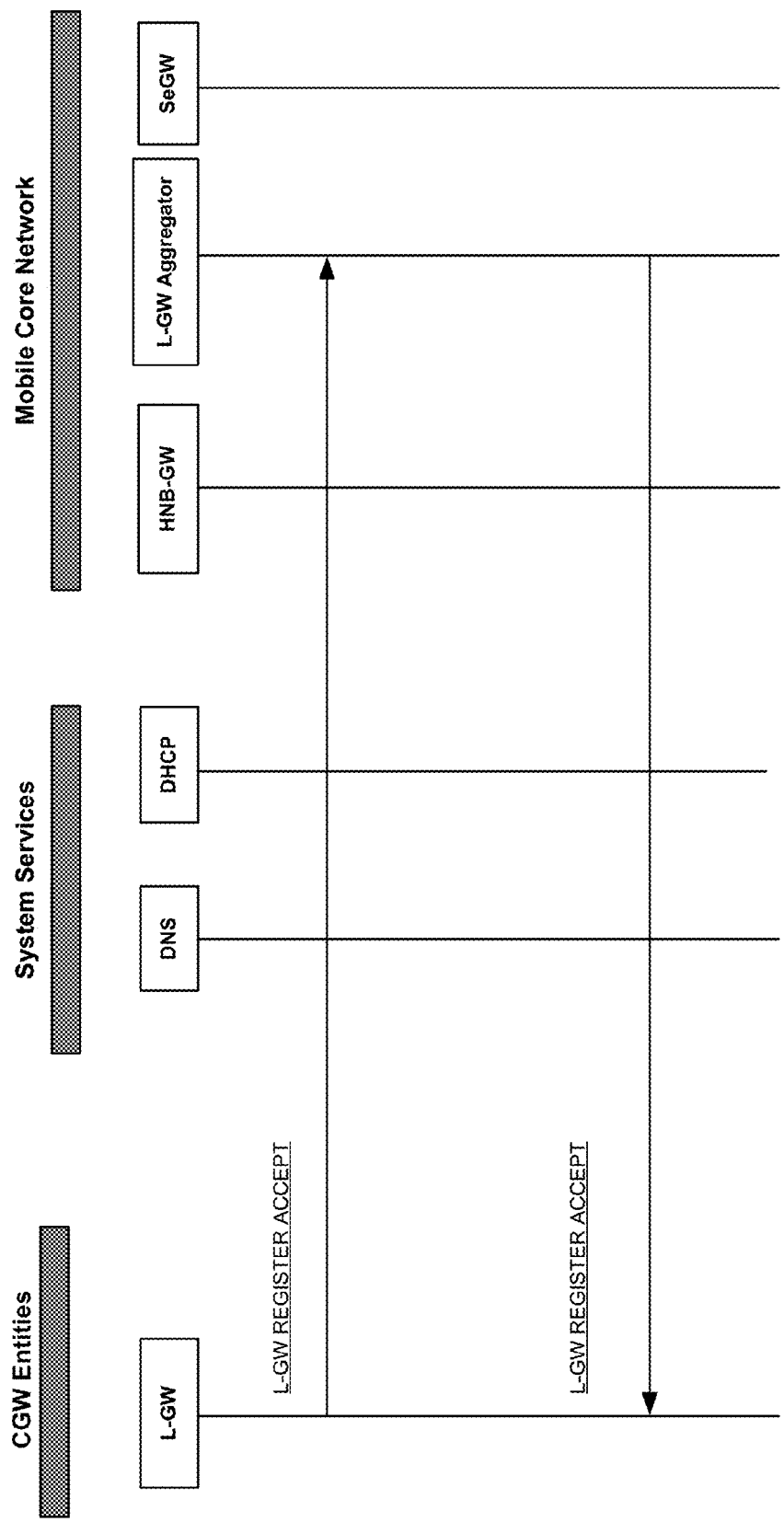
FIG. 6 is an exemplary illustration of a LGW registration.
Figure 7:
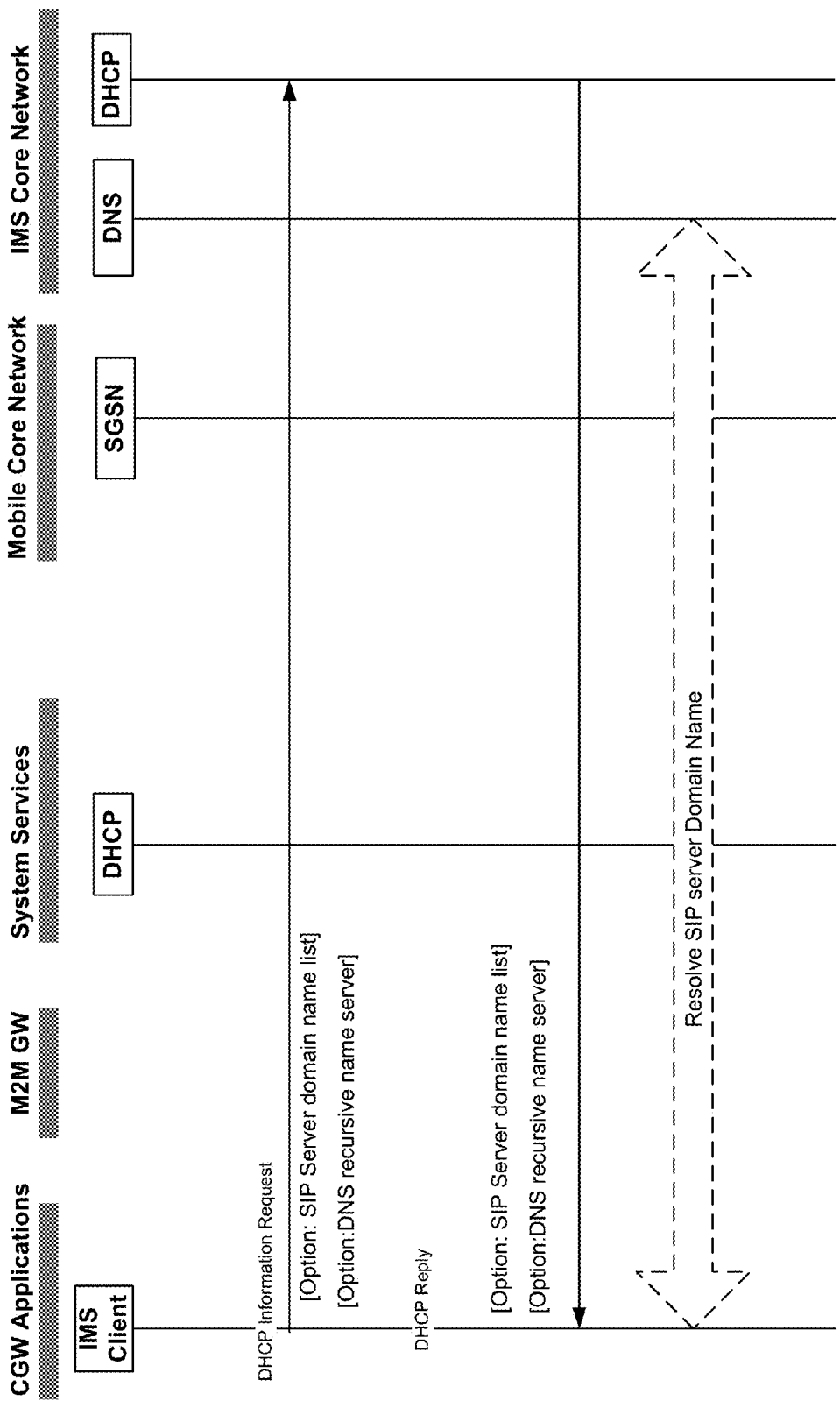
FIG. 7 is an exemplary illustration of a proxy call session control function (PCSCF) discovery procedure.
Figure 8:
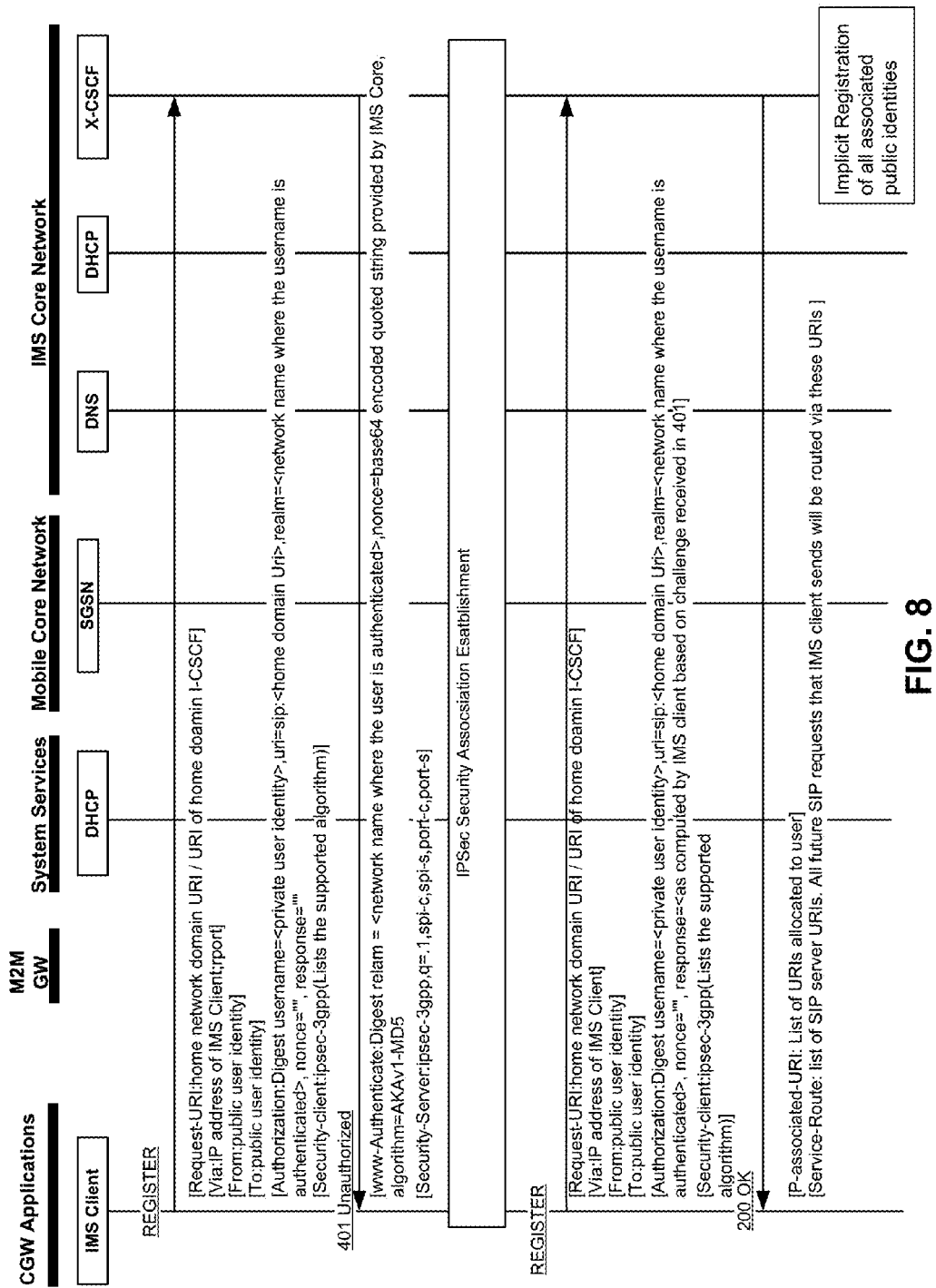
FIG. 8 is an exemplary illustration of a IMS registration procedure.
Figure 9:
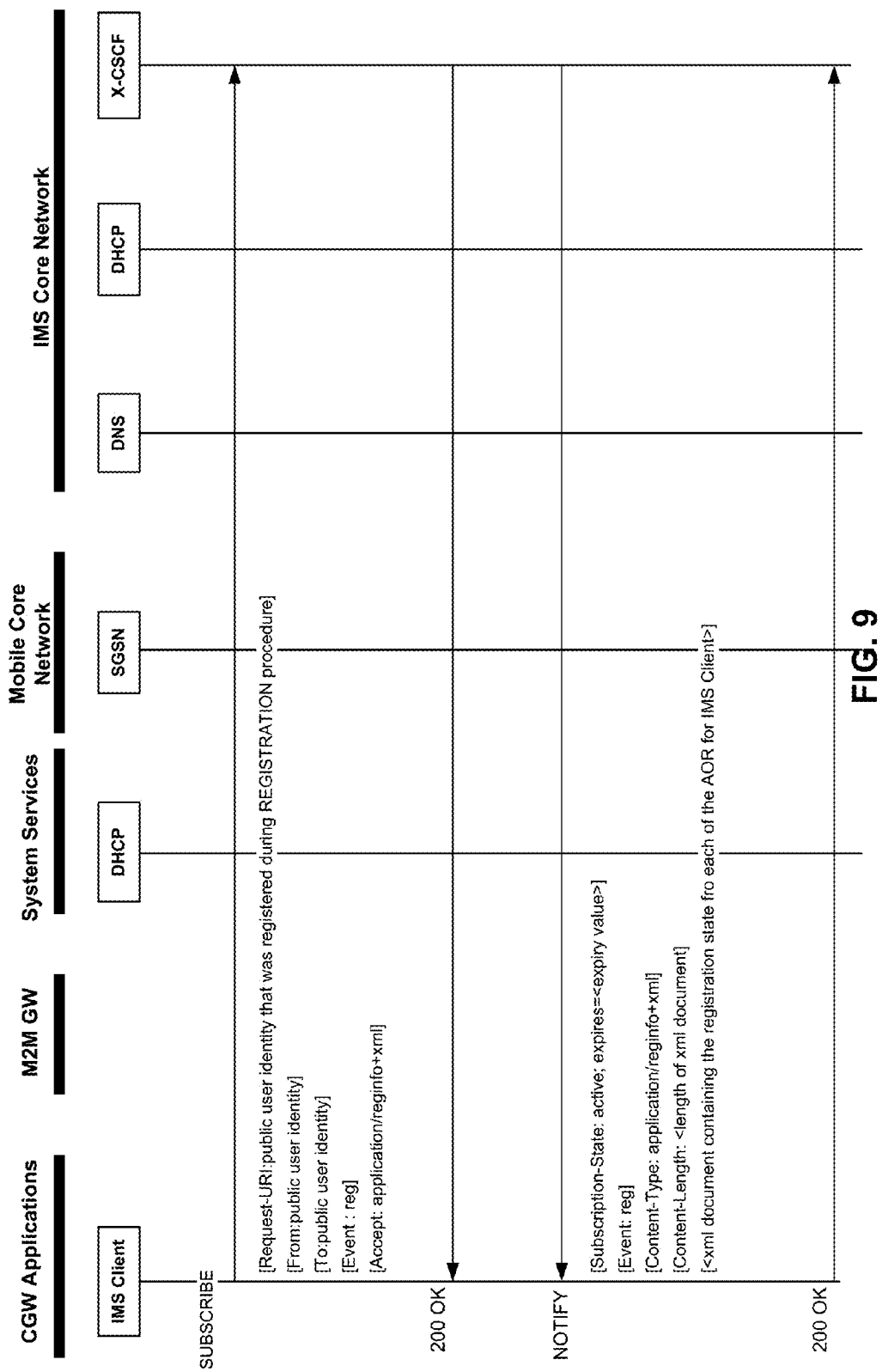
FIG. 9 is an exemplary illustration of a procedure for subscription to 'reg' Event state.

The CGW Initialization and Registration MSCs, as shown in FIG. 2 thru FIG. 9 are exemplary illustrations of the initialization of CGW entities including HNB, WLAN-AP, WPAN-C, LGW, M2M GW, and CGW Applications including DSM Spectrum Sensing initialization and IMS Client registration. FIG. 2 is an exemplary illustration of a procedure for CGW initialization. FIG. 3 is an exemplary illustration of a procedure for HNB initialization. FIG. 4 is an exemplary illustration of a procedure for LGW initialization. Note that the LGW may be a logical entity and its provisioning parameters may be similar to that of a HNB. FIG. 5 is an exemplary illustration of a procedure a IMS client initialization. FIG. 6 is an exemplary illustration of a LGW registration. FIG. 7 is an exemplary illustration of a proxy call session control function (PCSCF) discovery procedure. FIG. 8 is an exemplary illustration of a IMS registration procedure. FIG. 9 is an exemplary illustration of a procedure for subscription to 'reg' Event state.

Figure 10:
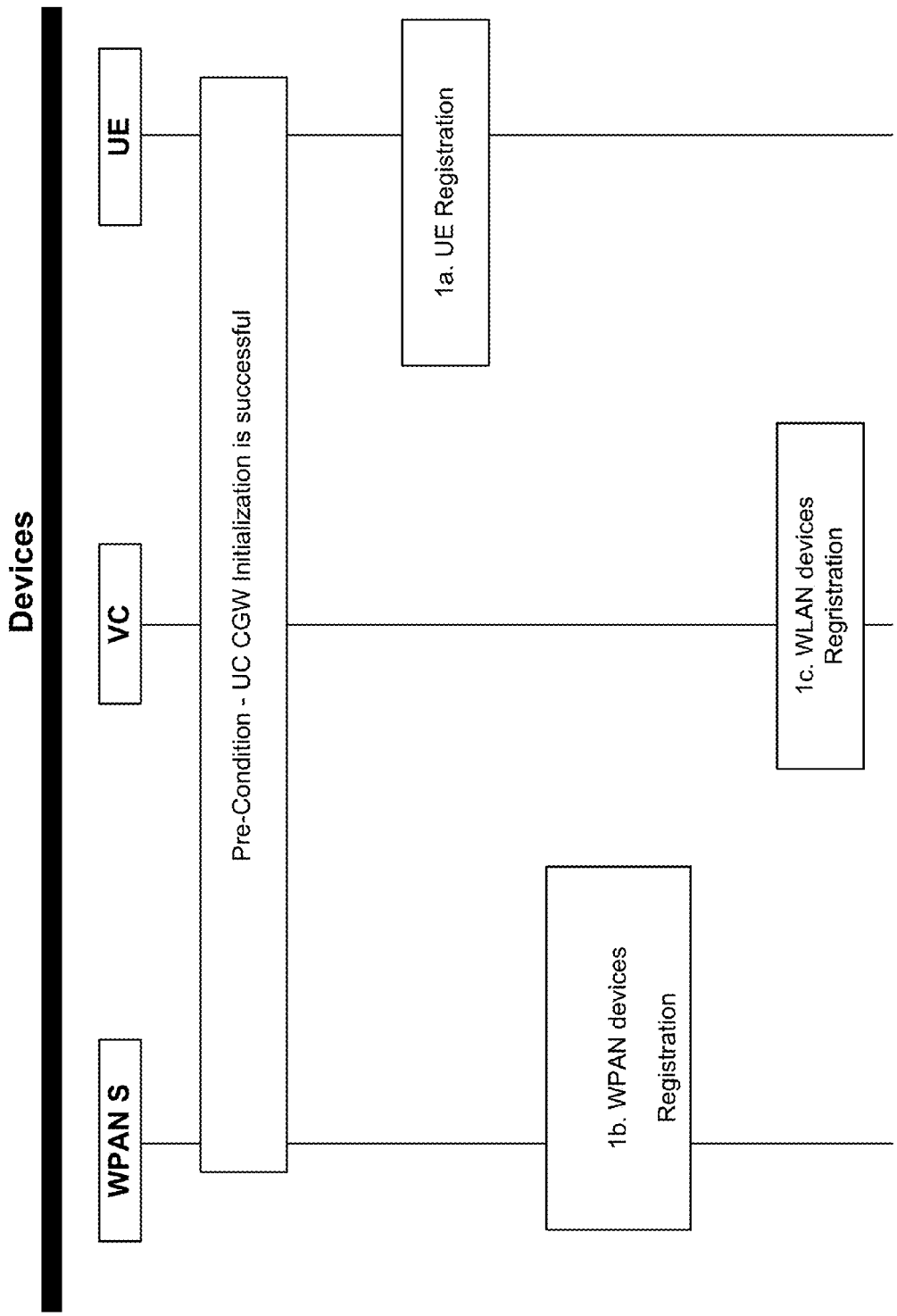
FIG. 10 is an exemplary illustration of a procedure for device registration.
Figure 11:
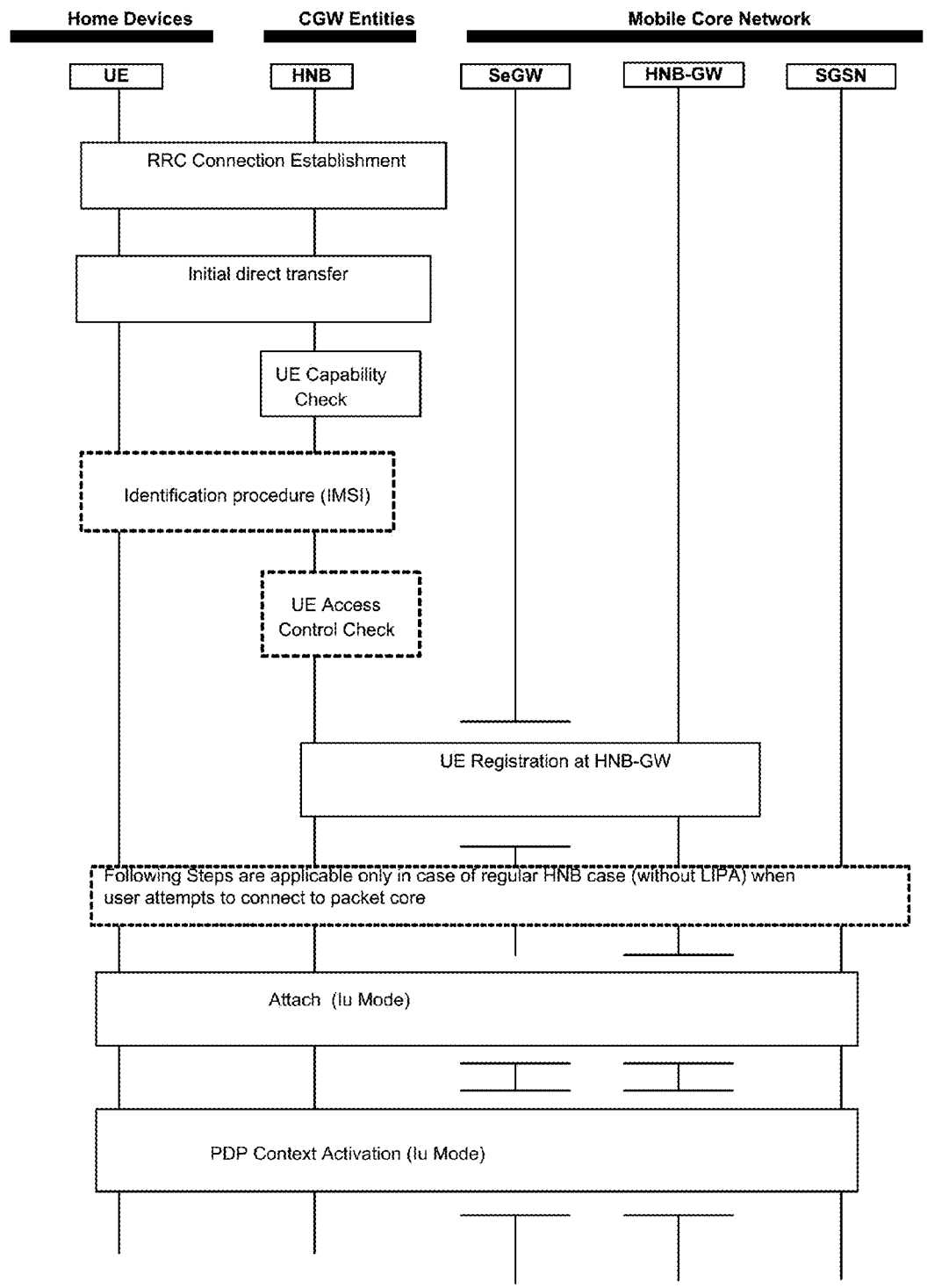
FIG. 11 is an exemplary illustration of a procedure for UE registration (NON CSG UE)
Figure 12:
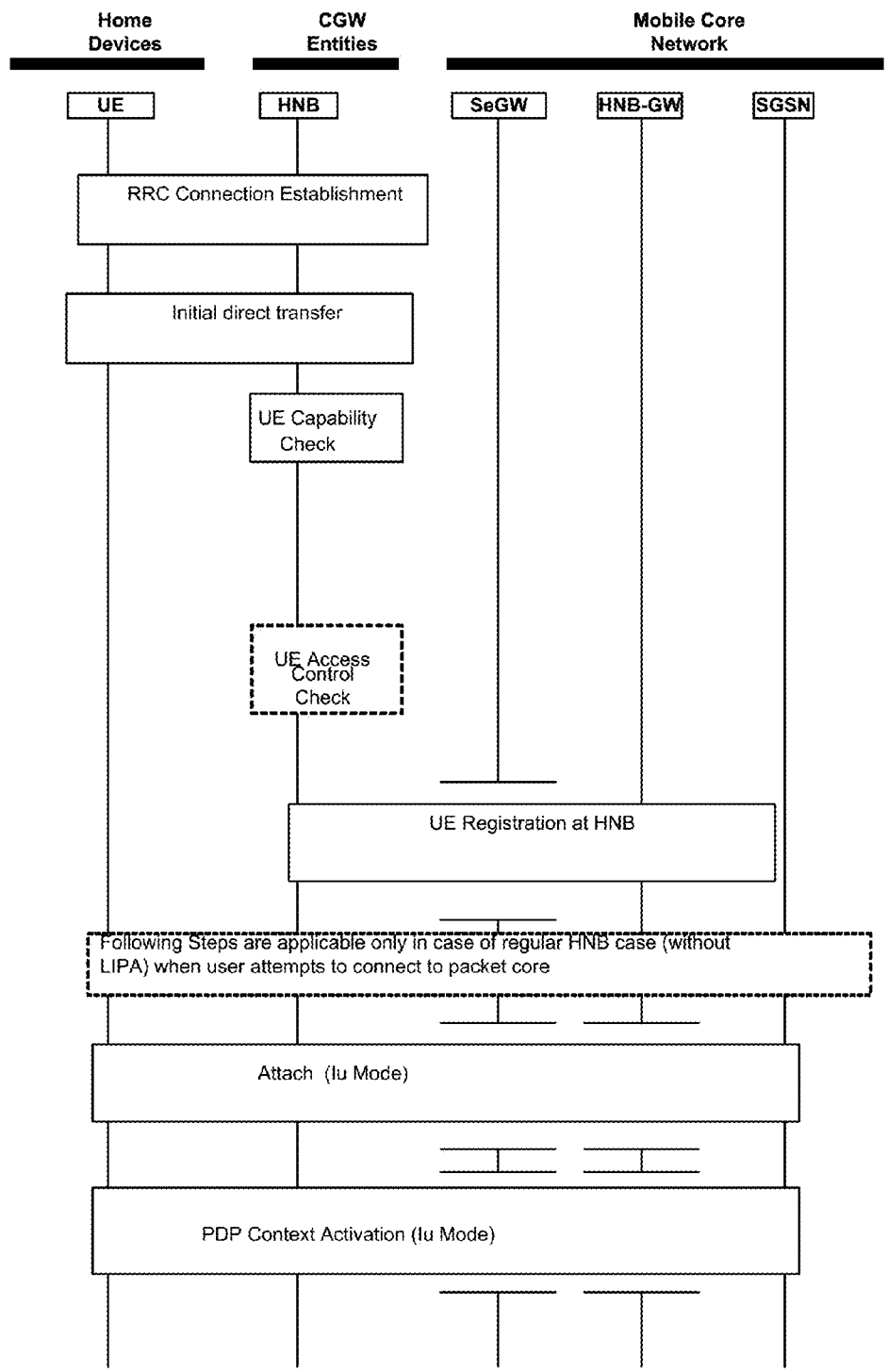
FIG. 12 is an exemplary illustration of a procedure for UE registration (CSG UE)

The Device Registration MSCs, as shown in FIG. 10 thru FIG. 12, are exemplary illustrations of the registration of UE, WLAN, and WPAN devices within the CGW, and with external operator/service provider networks. FIG. 10 is an exemplary illustration of a procedure for device registration. FIG. 11 is an exemplary illustration of a procedure for UE registration (NON CSG UE). FIG. 12 is an exemplary illustration of a procedure for UE registration (CSG UE).

The simple LIPA MSCs, as shown herein, are exemplary illustrations of setup of the LIPA path and local data transfer, including transition to idle mode during periods of data inactivity with preservation of PDP context and subsequent paging with connection/tunnel re-establishment for resumption of downlink initiated LIPA sessions.

The "Extended" LIPA (E-LIPA) MSCs, as shown herein, are exemplary illustrations of setup of the E-LIPA path and local data transfer, including transition to idle mode during periods of data inactivity with preservation of PDP context and subsequent paging with connection/tunnel re-establishment for resumption of downlink initiated E-LIPA sessions.

The HNB Handover MSCs, as shown herein, are exemplary illustrations of the active handover of packet switched (PS) sessions between HNBs, from HNB to macrocell, and from macrocell to HNB.

Figure 13:
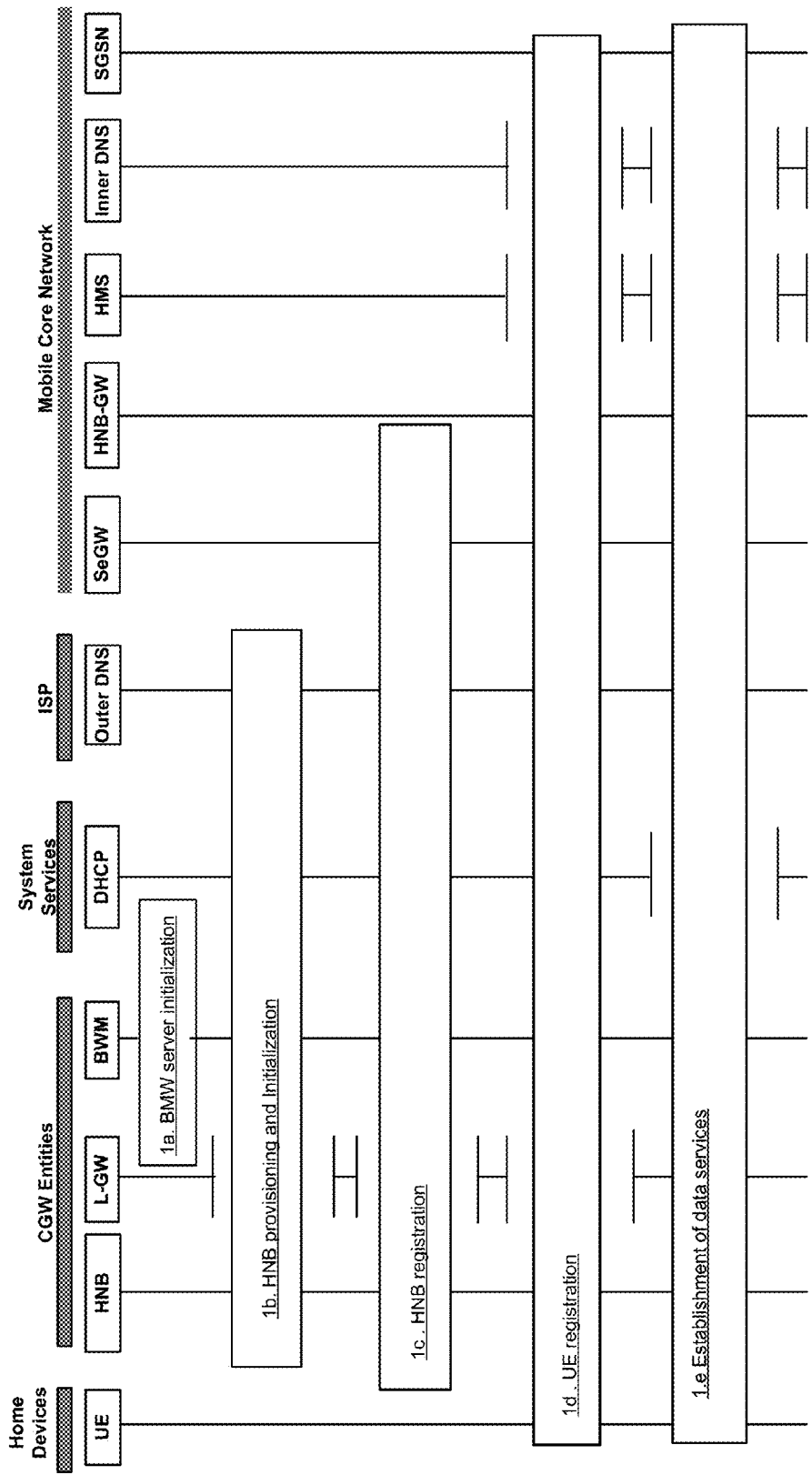
FIG. 13 is an exemplary illustration of a procedure for the establishment of data services between a UE and core network.
Figure 14:
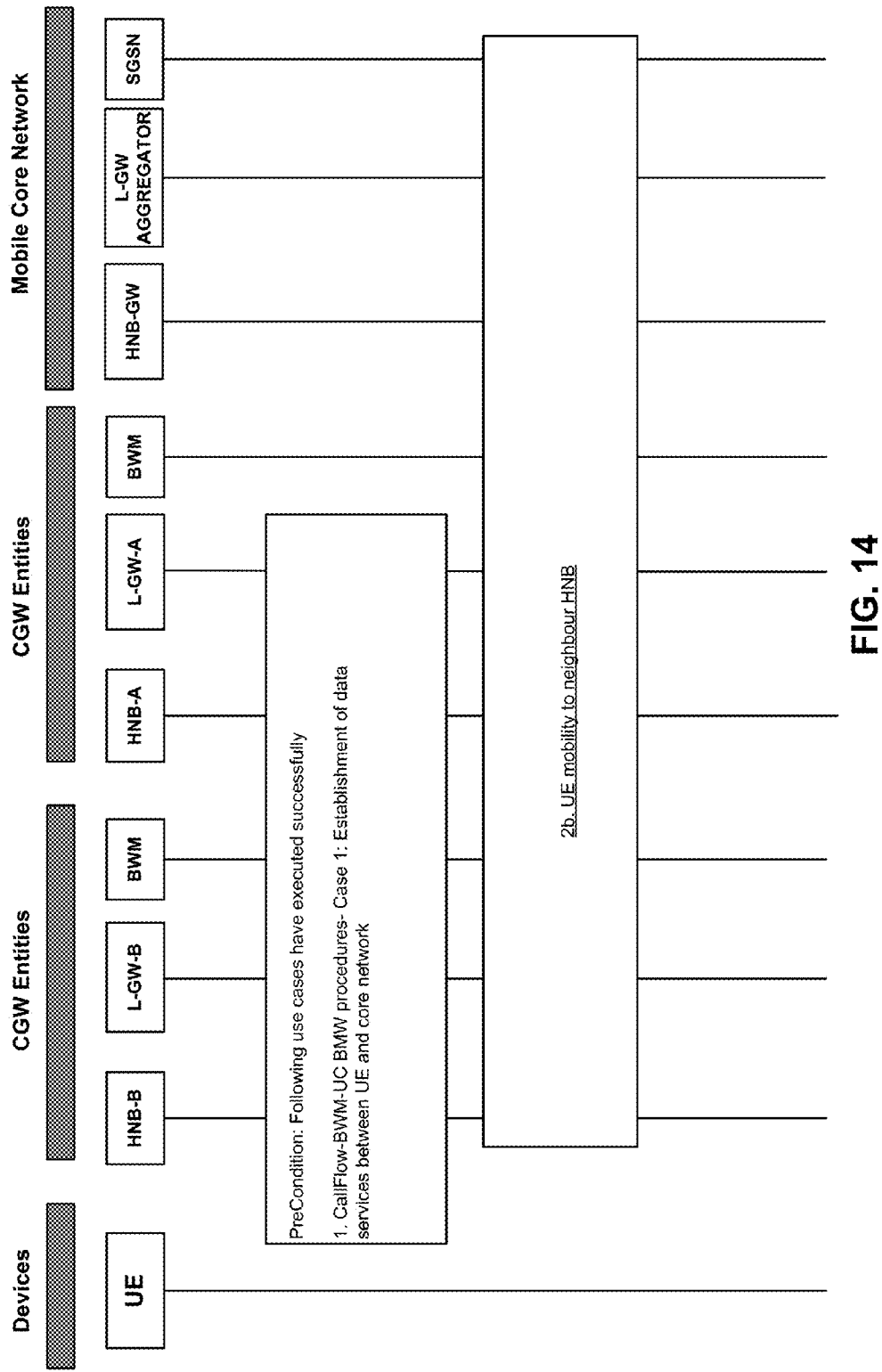
FIG. 14 is an exemplary illustration of a procedure for the mobility of UE connected to one HNB to a neighbors home network, wherein the neighbor is connected to another HNB.
Figure 15:
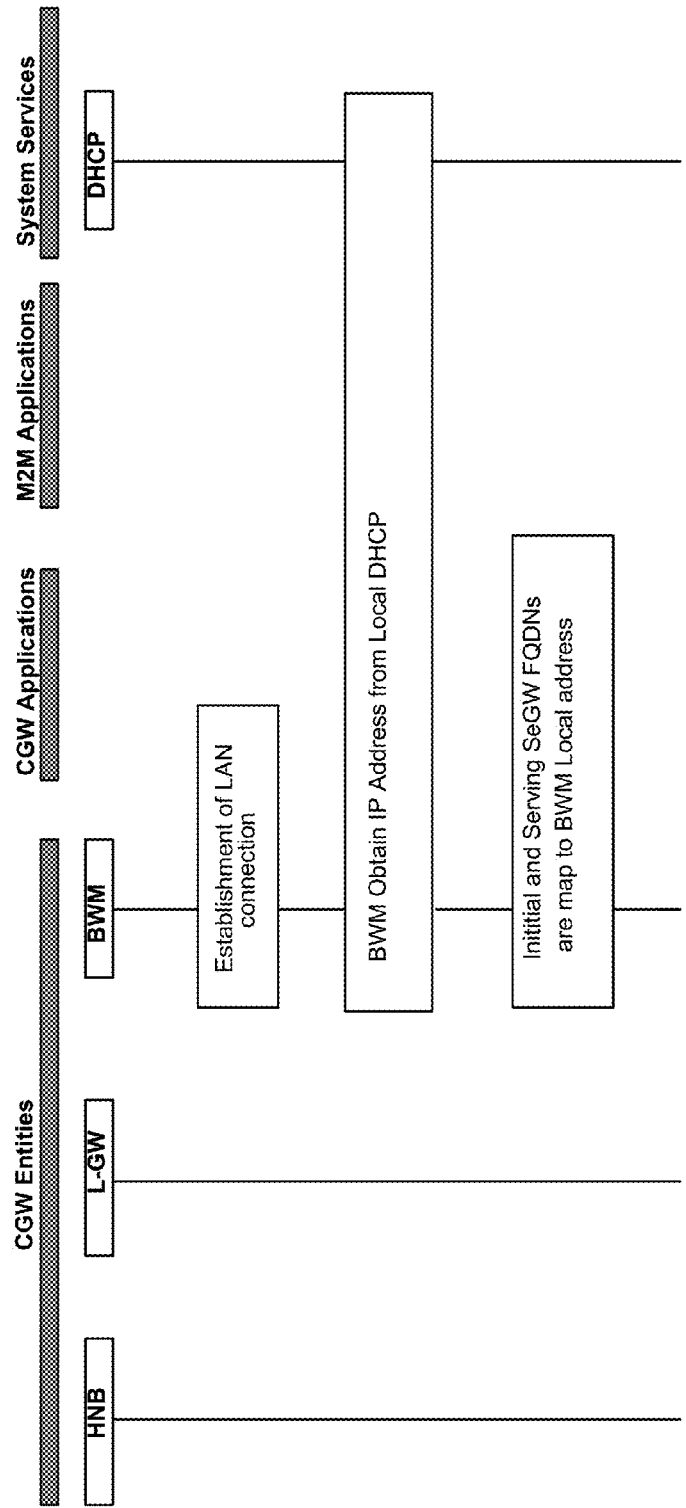
FIG. 15 is an exemplary illustration of a procedure for BWM initialization.
Figure 16:
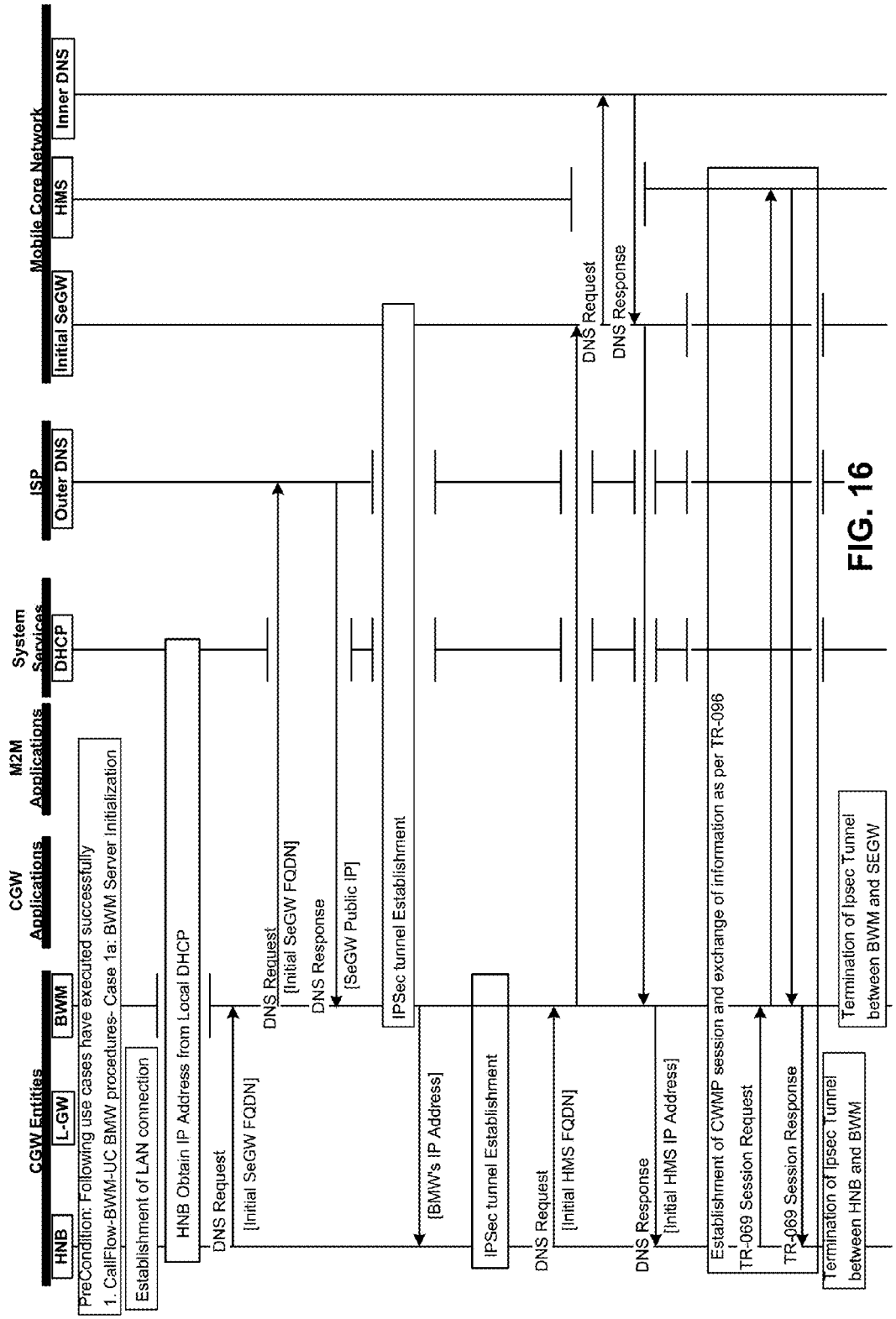
FIG. 16 is an exemplary illustration of a procedure for CGW initialization in the presence of BWM.
Figure 17:
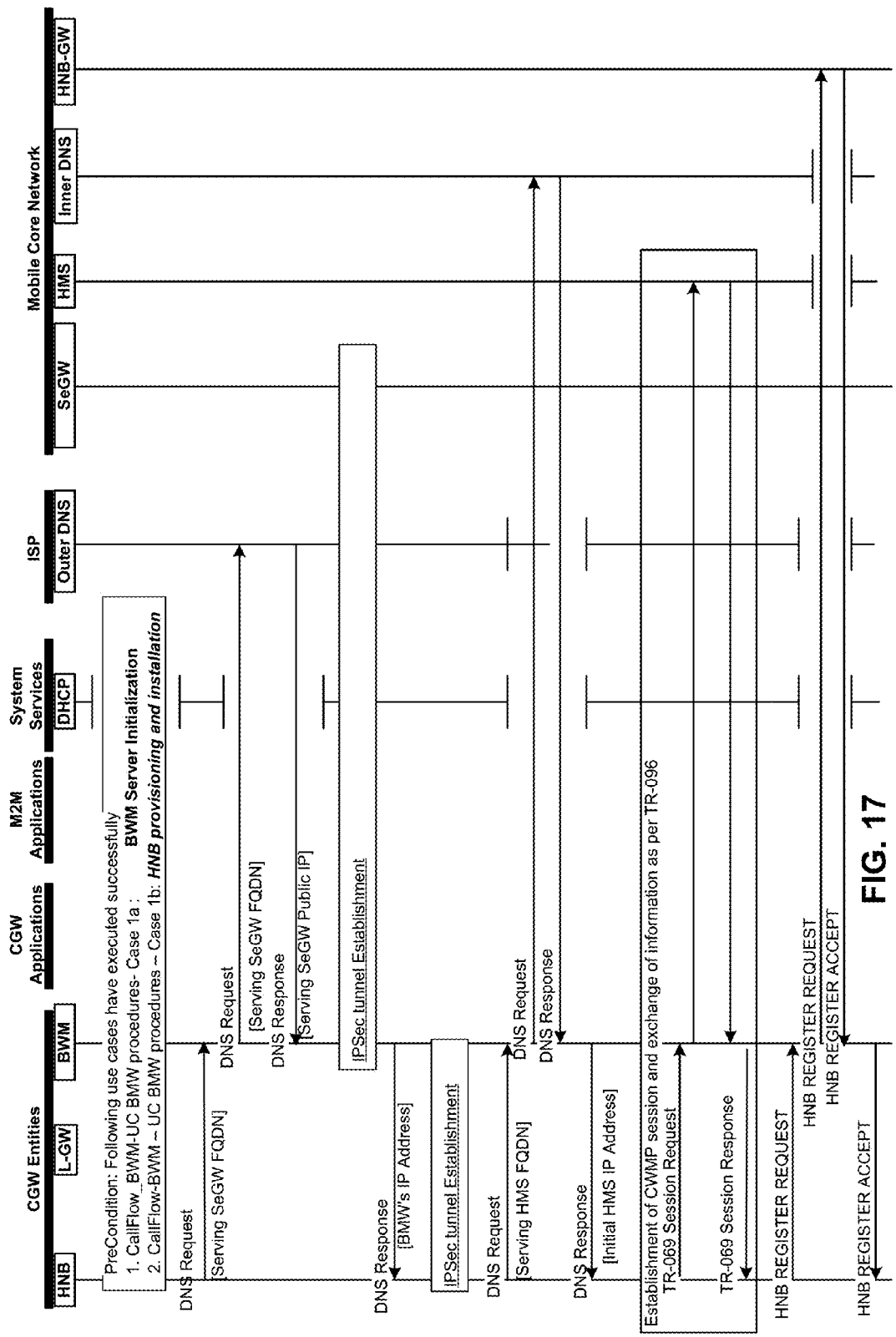
FIG. 17 is an exemplary illustration of a procedure for HNB registration.

The BWM MSCs, as shown in FIG. 13-25, are exemplary illustrations of the initialization, session establishment, and mobility procedures associated with the introduction of the BWM Server within the CGW between the HNB and the MCN. FIG. 13 is an exemplary illustration of a procedure for the establishment of data services between a UE and core network. FIG. 14 is an exemplary illustration of a procedure for the mobility of UE connected to one HNB to a neighbors home network, wherein the neighbor is connected to another HNB. FIG. 15 is an exemplary illustration of a procedure for BWM initialization. FIG. 16 is an exemplary illustration of a procedure for CGW initialization in the presence of BWM. FIG. 17 is an exemplary illustration of a procedure for HNB registration.

Figure 18:
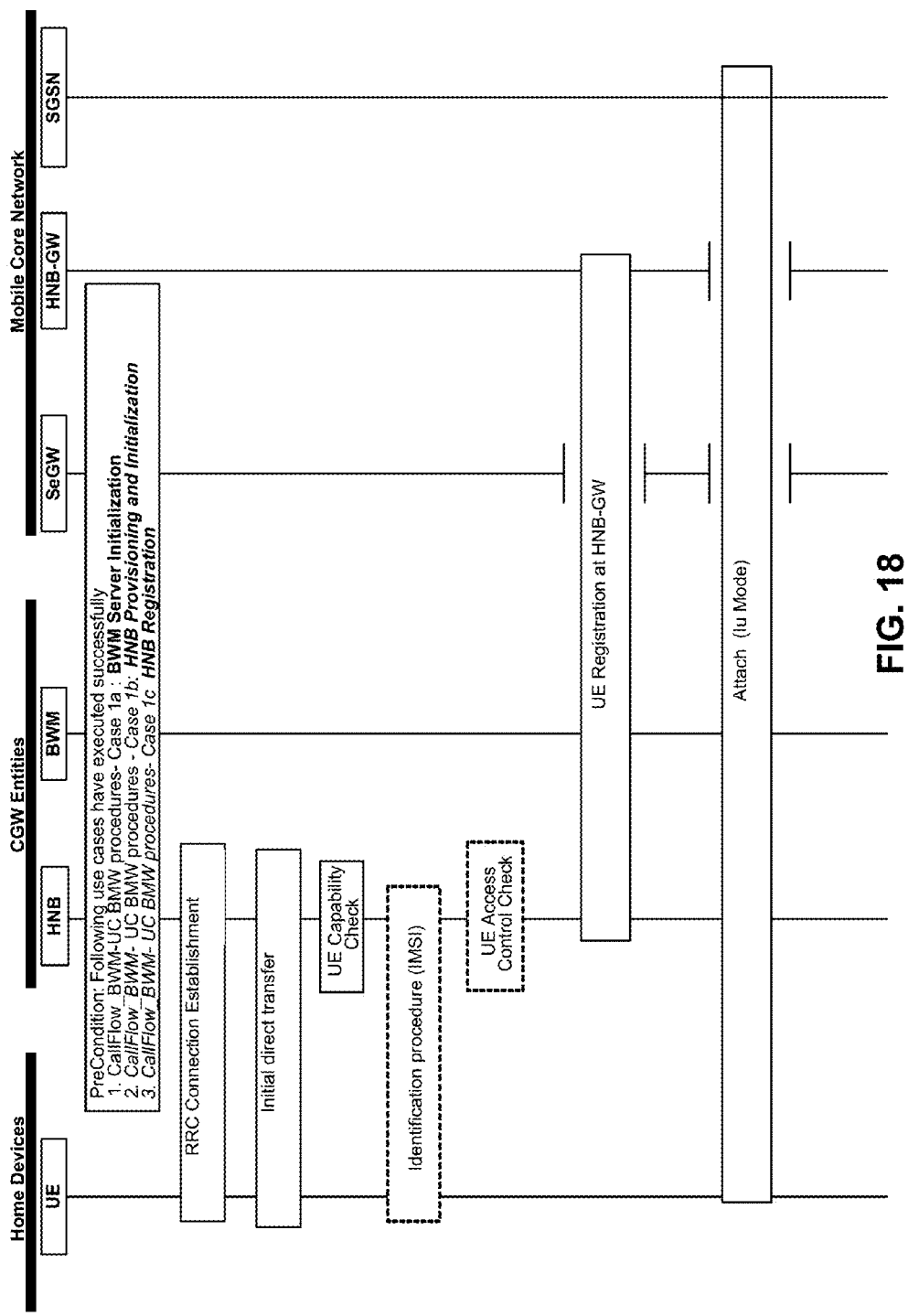
FIG. 18 is an exemplary illustration of UE registration (Non closed subscriber group (CSG) UE)
Figure 19:
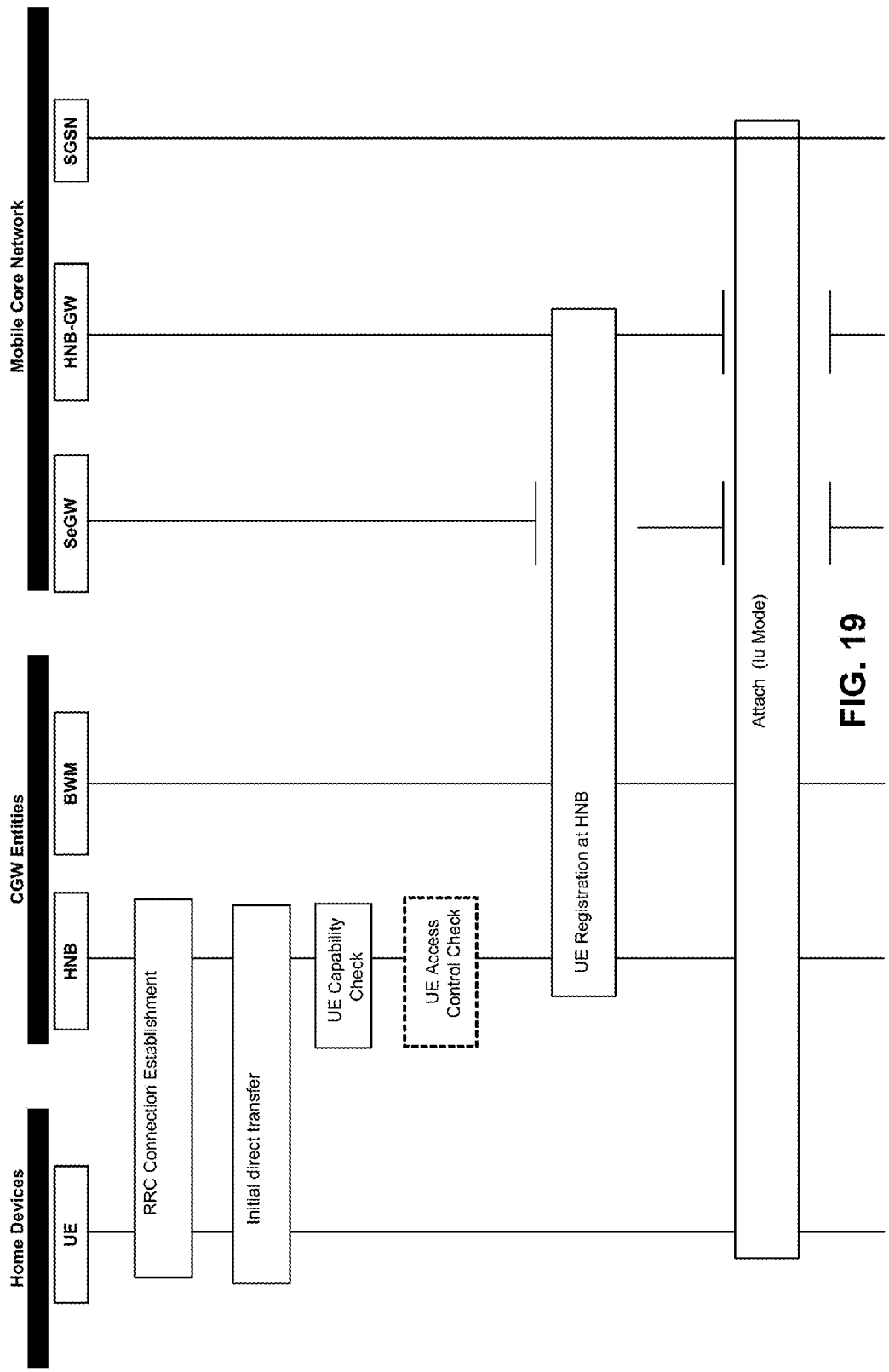
FIG. 19 is an exemplary illustration of UE registration for a CSG UE.

FIG. 18 is an exemplary illustration of UE registration (Non closed subscriber group (CSG) UE). In FIG. 18, all messages between the HNB and MCN elements may pass through the HNBGW. The role of the BWM server will be to unpack messages from one IPSec tunnel and then repack them on the other IPSec tunnel FIG. 19 is an exemplary illustration of UE registration for a CSG UE.

Figure 20:
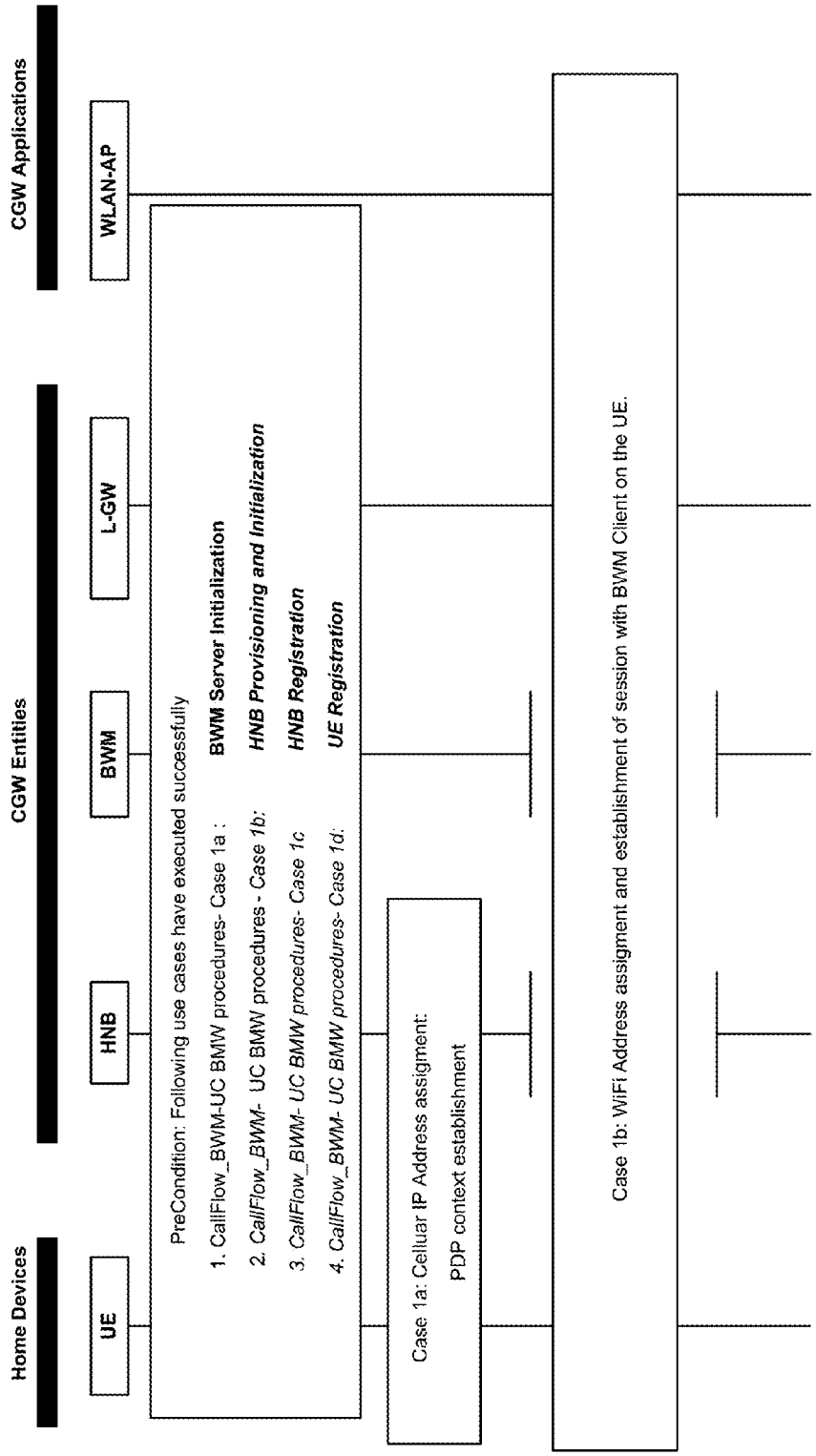
FIG. 20 is an exemplary illustration of packet switched (PS) data services establishment.
Figure 21:
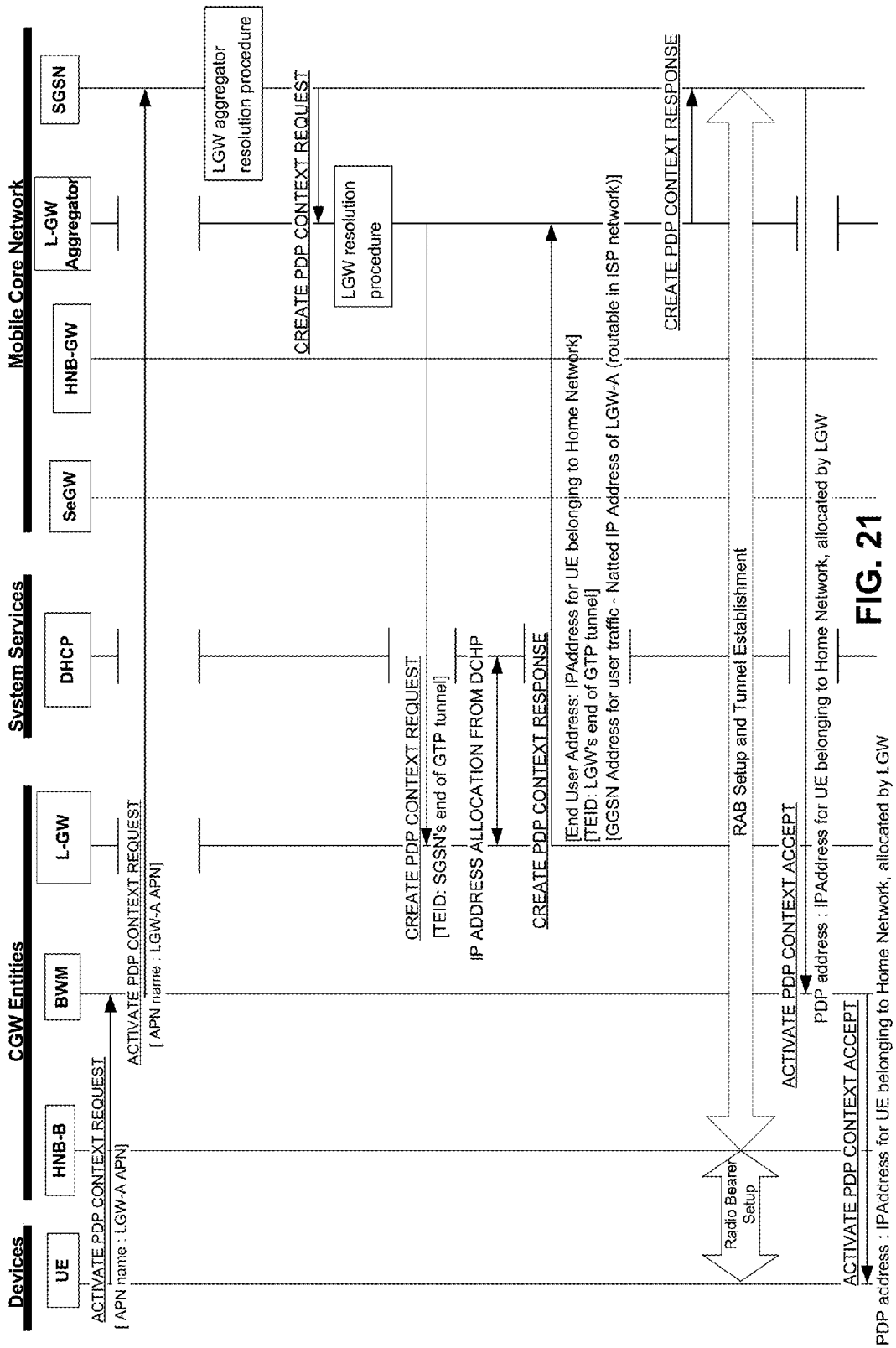
FIG. 21 is an exemplary illustration of cellular PDP context establishment.
Figure 22A:
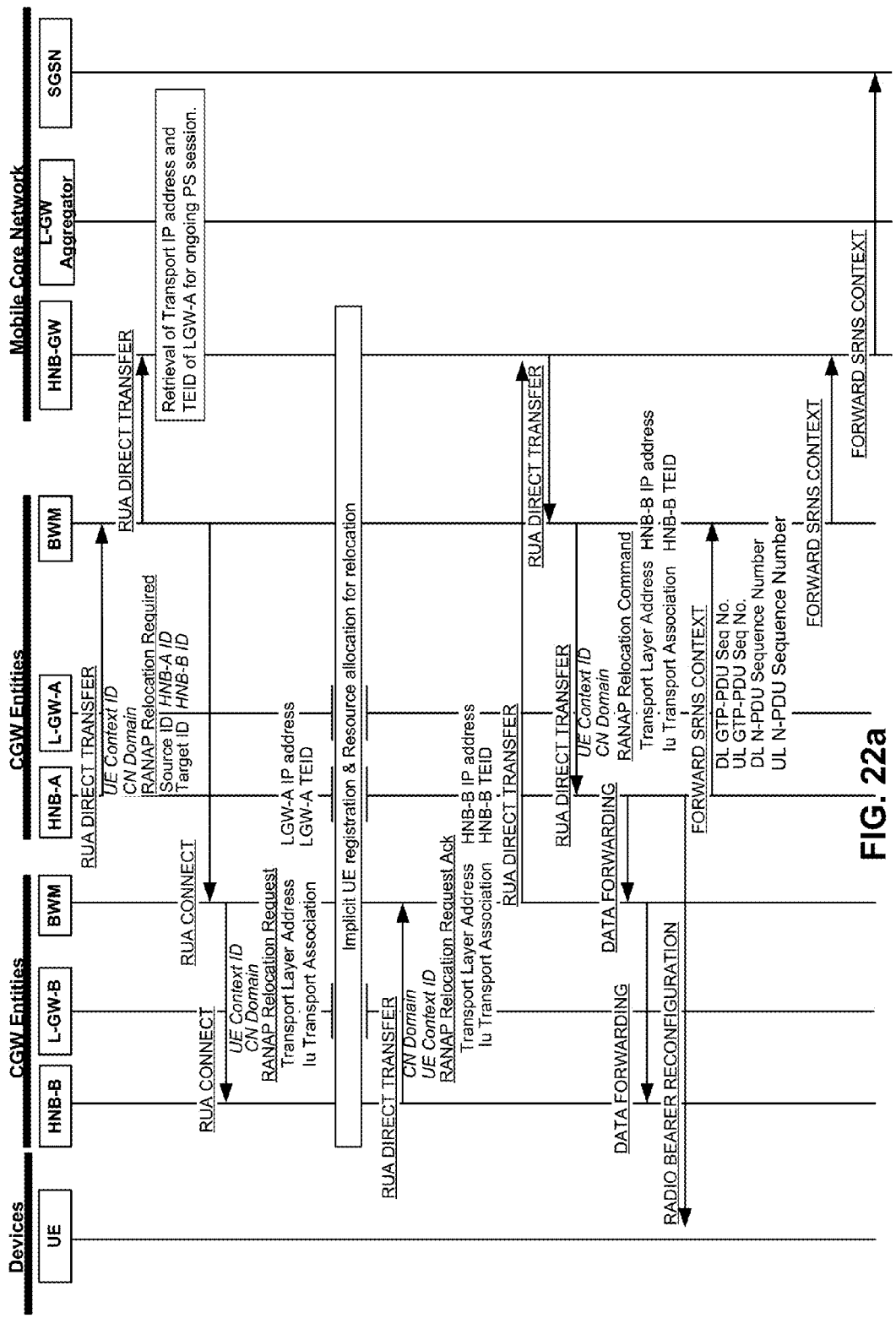
FIG. 22A is an exemplary illustration of procedures for intra HNBGW mobility (LIPA to ELIPA)
Figure 22B:
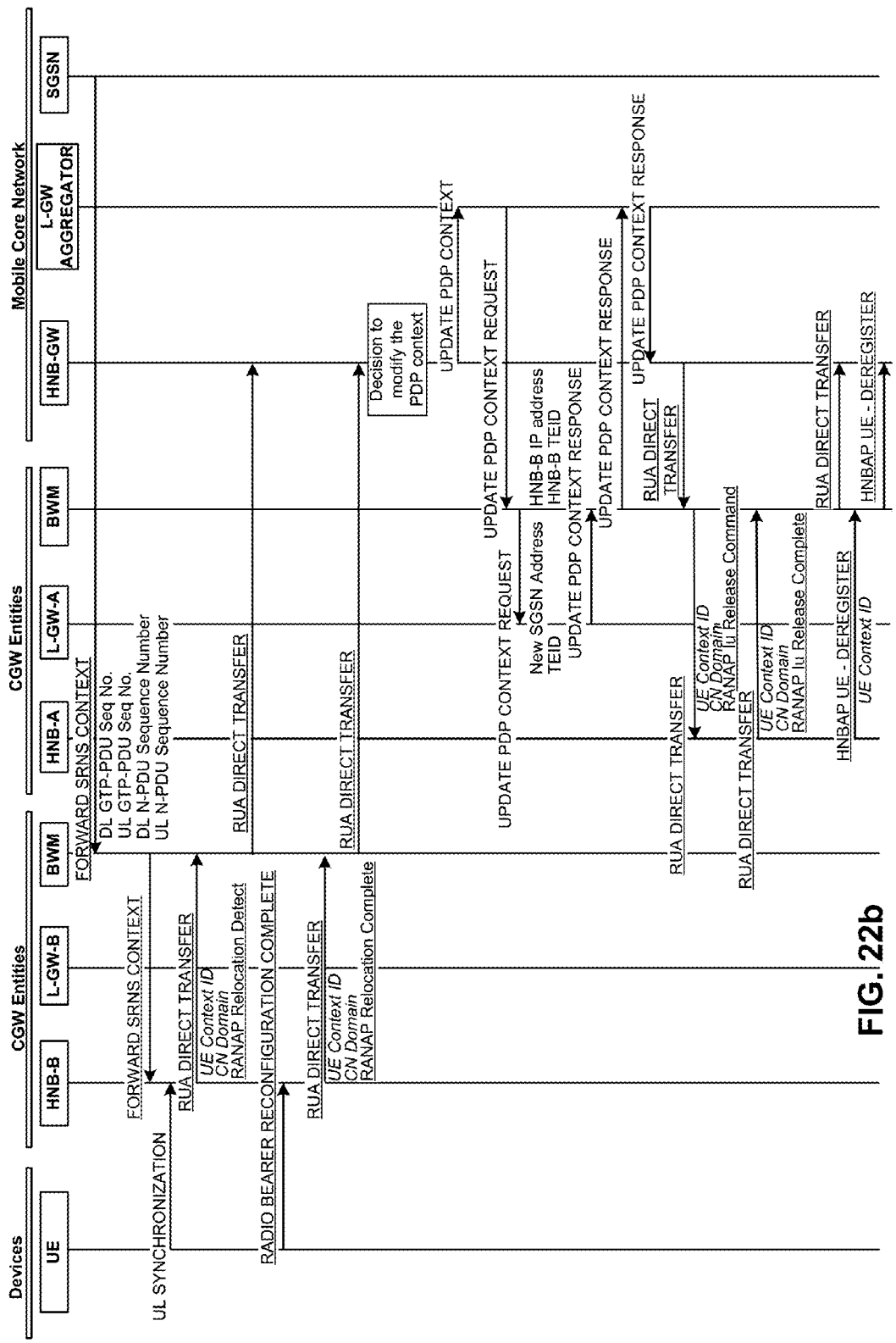
Figure 23:
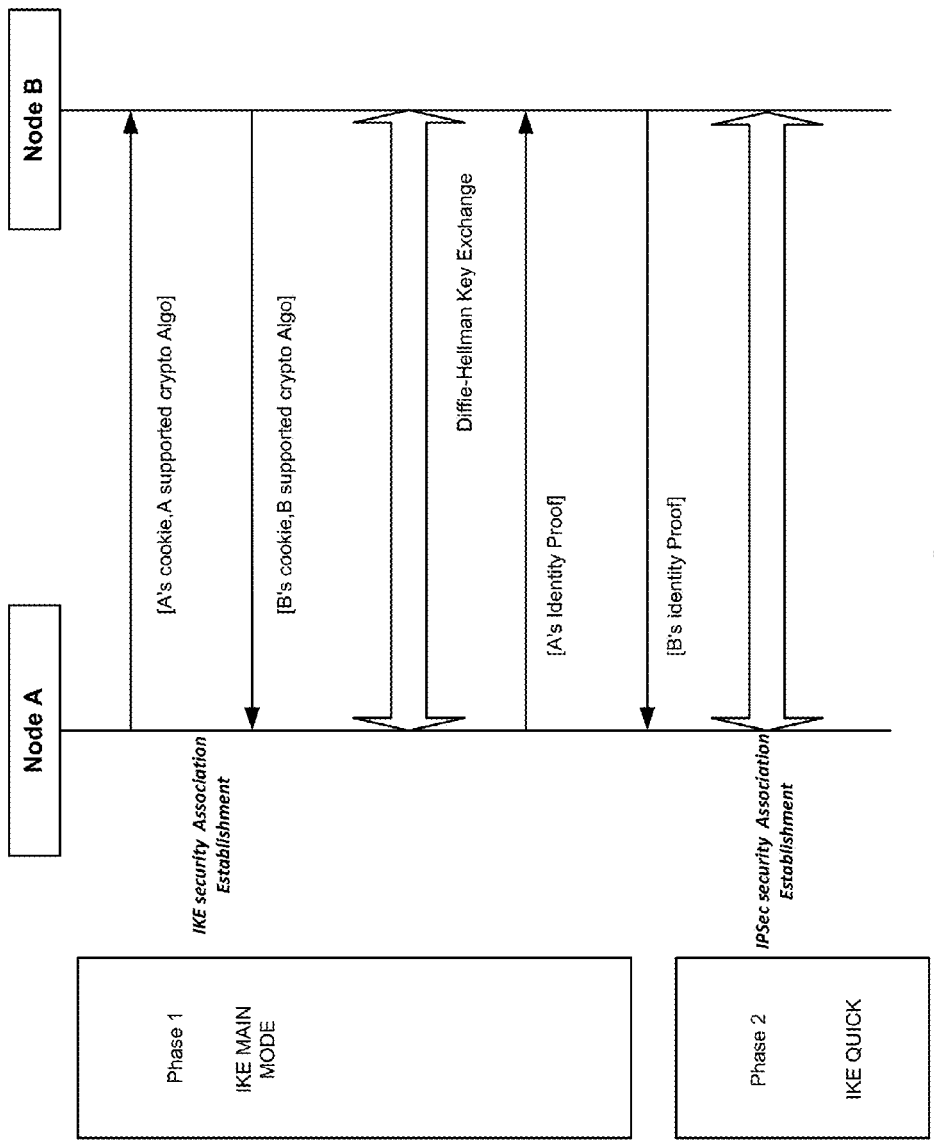
FIG. 23 is an exemplary illustration of IKE IPSec procedures between BWM and SeGW.
Figure 24:
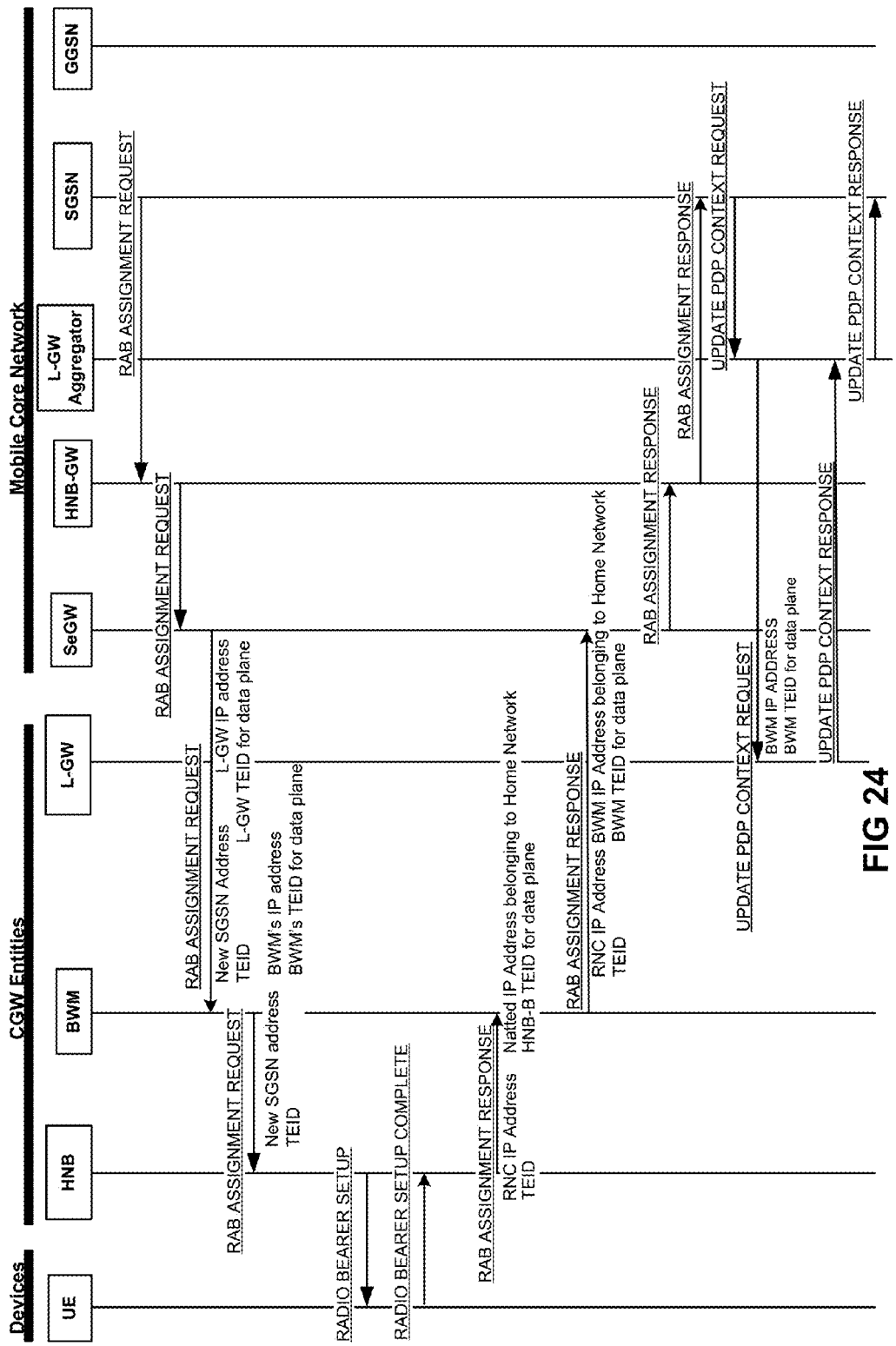
FIG. 24 is an exemplary illustration of procedures for RAB Setup and user plane establishment with one tunnel establishment.
Figure 25:
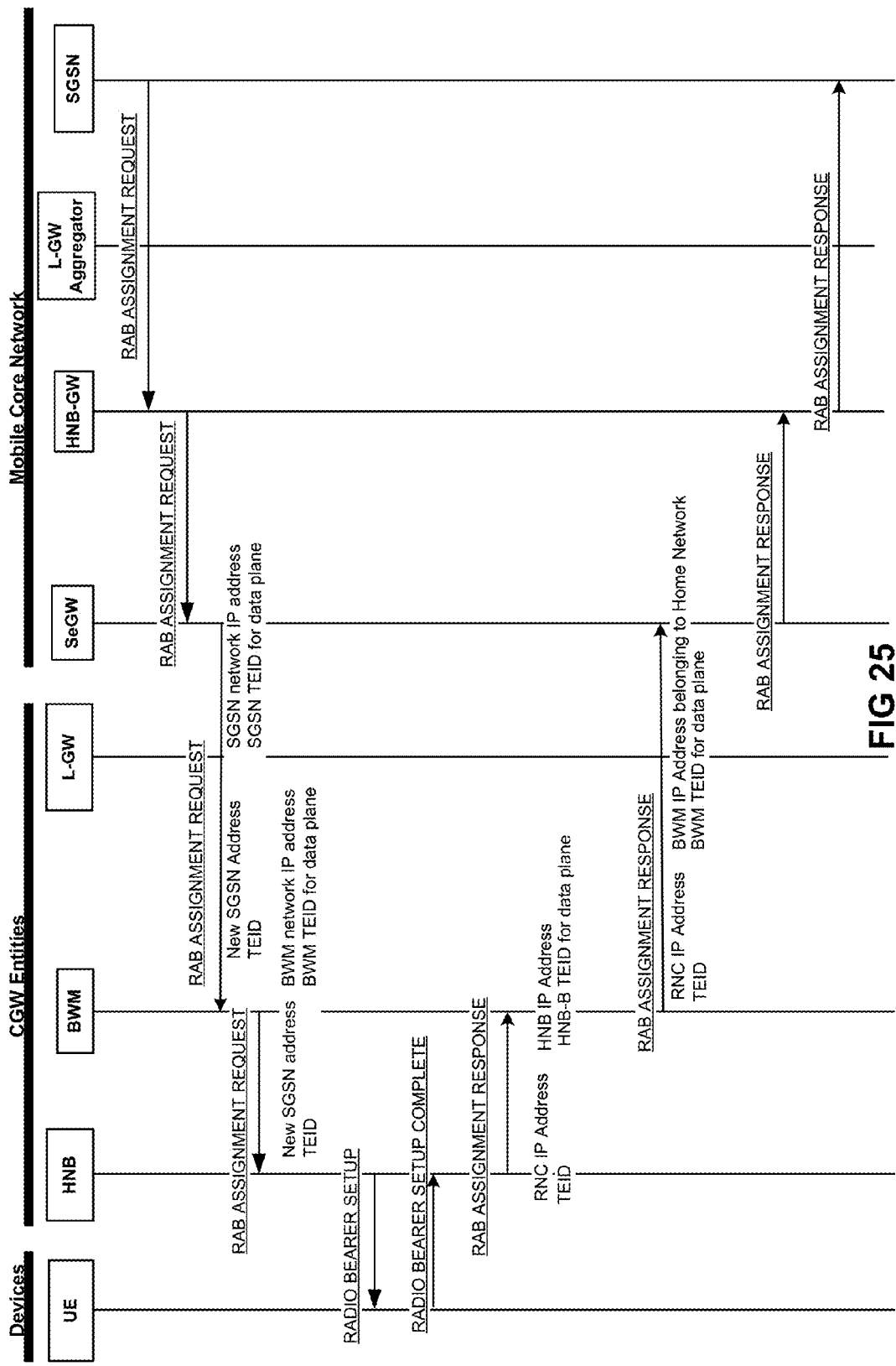
FIG. 25 is an exemplary illustration of procedures for RAB setup and user plane tunnel establishment with two tunnel establishment.

FIG. 20 is an exemplary illustration of packet switched (PS) data services establishment. FIG. 21 is an exemplary illustration of cellular PDP context establishment. FIGS. 22A and 22B is an exemplary illustration of procedures for intra HNBGW mobility (LIPA to ELIPA), wherein FIG. 22B is a continuation of FIG. 22A. FIG. 23 is an exemplary illustration of IKE IPSec procedures between BWM and SeGW. FIG. 24 is an exemplary illustration of procedures for RAB Setup and user plane establishment with one tunnel establishment. FIG. 25 is an exemplary illustration of procedures for RAB setup and user plane tunnel establishment with two tunnel establishment.

Assigning unique APNs to each LGW may lead to a large number of entries in an SGSN APN database. Consequently, in one embodiment, the LGW's IP address is resolved at runtime based on logic provided by the core network. Typically, each LGW has a unique identity pre-determined in manner similar to a HNB. Also typically a user profile in the HLR has entries for home HNB and home LGW. Under this scheme, the address resolution process may incorporate the following scenarios: 1) user is latched to his home HNB and wants to connect to his home network—Network resolves the IP address of user's home LGW; 2) user is latched to neighbor A's HNB and wants to connect to his home network—Network resolves the IP address of user's home LGW; and 3) user is latched to neighbor A's HNB and wants to connect A's network—Network resolves the IP address of Neighbor's LGW.

The are many different "digital home" use cases that would be enabled by the Hybrid Network Converged Gateway architecture. Since WiFi and Cellular accesses are expected to be available within the Integrated Home Network, one use case is where the device is a MultiRAT (e.g., dual mode WiFi & Cellular) device. The data transfer between such a device and CGW may take place in parallel on both RATs. The parallel transmission may be used to provide higher data rates or improved robustness (by providing multi RAT diversity) or provide flexibility (whereby data packets are appropriately and adaptively mapped onto each RAT depending upon various characteristics such as security, data rates, QoS, cost, robustness, channel quality etc).

In another use case, a smart phone may communicate with the CGW using the Cellular RAT (so that QoS is guaranteed, as opposed to WiFi RAT), and the CGW may communicate with the STB over Ethernet. Following the accessing of the TV Program Guide, the smart phone user may initiate a viewing session. The content, in this example, is streaming from the WAN. A variation to this use case is where the content resides in a DVR unit, which is connected to the STB. In this example, the video transfer is local to the IHN.

The CGW architecture may have the following use case categories: local access, remote access, lawful interception, mobility, home security, enterprise—small business, enterprise—network operator, enterprise—home office, self-configuration, store, carry and forward, and bandwidth aggregation.

Examples of local access include session push, local based access to network for LIPA (through CGW and peer-to-peer) and non-LIPA services, mobility within home/enterprise, parental control and guest access, support of legacy devices (non-IMS), session modification, content sharing/multicast, inter-CGW coordination, and get nearest copy.

Examples of remote access include remote access of media data, media services, and media devices within the home, remote access of security devices within the home, and remote access of appliances within the home.

Examples of lawful interception include lawful interception under LIPA scenarios, surveillance—presence, and content protection/digital rights management.

Examples of mobility include inbound mobility (macrocell-to-CGW), outbound mobility (CGW-to-macrocell), and inter-CGW. An example of home security includes notification to remote stakeholders.

Examples of a small business enterprise include customer guide in shopping center using LIPA access, IP-PABX, and mobile IP-PABX.

Examples of a network operator enterprise include new operator offers NW whose capabilities are only IMS capable (no CS domain), operator removes legacy services (removes CS domain), open access mode, hybrid access mode, offload of CS domain congestion, offload of PS domain congestion—SIPTO, improved coverage, and interoperability across providers.

Examples of a home office enterprise include access to home based content and devices, and access to outside home services.

Examples of self-configuration include built-in test/diagnostics, self healing, energy savings, self-configuration upon power up of CGW, and self configuration upon power up of devices which will access the CGW.

An example of store, carry and forward include a stationary device that uses CGW to hold data until the CGW can forward the data to its destination.

Examples of bandwidth aggregation include mega-data transfers, security—break data up over several RATS to hide traffic, an minimal error—redundant transmissions.

The topology of a cellular network is changing such that HNB devices may be available and deployed in most homes. These may be offered to the end-consumer by the cellular operator and may utilize the consumers' broadband to connect the HNB to the mobile core network. The consumers' broadband modem may use a number of technologies, all of which are similar and provide a conduit from the broadband modem to the mobile core network. As UMTS and LTE become more popular, there is a need to offload traffic from the mobile core network. LIPA is one method to offload local traffic from using bandwidth on the core network. There may be times when two HNB devices that are in close proximity might have to communicate. For example, each HNB may be connected to devices that need to communicate with each other. The data that is passed during this communication may take many different paths.

In a standard implementation, the data passed between HNB devices would travel from each HNB, through the respective broadband modems, the IP backhaul and then enter the mobile core network. Once in the mobile core network, the data will be routed to an SGSN (or SGW) which will route the data back through the mobile core network to the IP backhaul. Once in the IP backhaul, the data will get routed to the proper broadband modem and then delivered to the target HNB. The target HNB will deliver it to the proper device within its sphere. This approach is less efficient because bandwidth which could be devoted to other activities is used for this reflected data. Additionally, since more network nodes are traversed, there may be a higher likelihood of data being delayed or not delivered at all. There are alternatives which would allow for data to be reflected to its intended target by traversing fewer nodes than the standard implementation. These alternatives may be described as "Extended LIPA" or "ELIPA" and perform inter-HNB communication in a more efficient manner. E-LIPA may allow devices camped on different HNB devices to communicate with minimal involvement from the complete mobile core network.

LIPA provides access for internet protocol (IP) capable WTRUs connected via an HNB (i.e., using HNB radio access) to other IP capable entities in the same residential and/or enterprise IP network. User data traffic for LIPA is expected to not traverse the mobile operator's network. Although examples disclosed herein may refer to a home-based scenario, the present subject matter can also be extended to an enterprise-based scenario as well. A CGW may be located in various places such as a home, an enterprise, and public areas (mall, park, neighborhood, etc.).

In addition to legacy IP access to the MCN, an HNB Subsystem may provide support for LIPA for IP capable WTRUs connected via a HNB radio access allowing such WTRUs to communicate with other IP capable entities in the same residential or enterprise IP network. Traffic for LIPA may or may not traverse a mobile operator's network. A HNB subsystem may support SIPTO to provide access for a WTRU connected via a HNB radio access to a defined IP network (e.g., the Internet). In addition, the HNB may support remote access for a Closed Subscriber Group (CSG) member to the home based network from a WTRU via a public land mobile network (PLMN) in order to provide access to IP capable devices connected to the home based network, in other words managed remote access (MRA).

of the connecting devices may differ slightly in name with other mobile wireless technologies.

Figure 30:
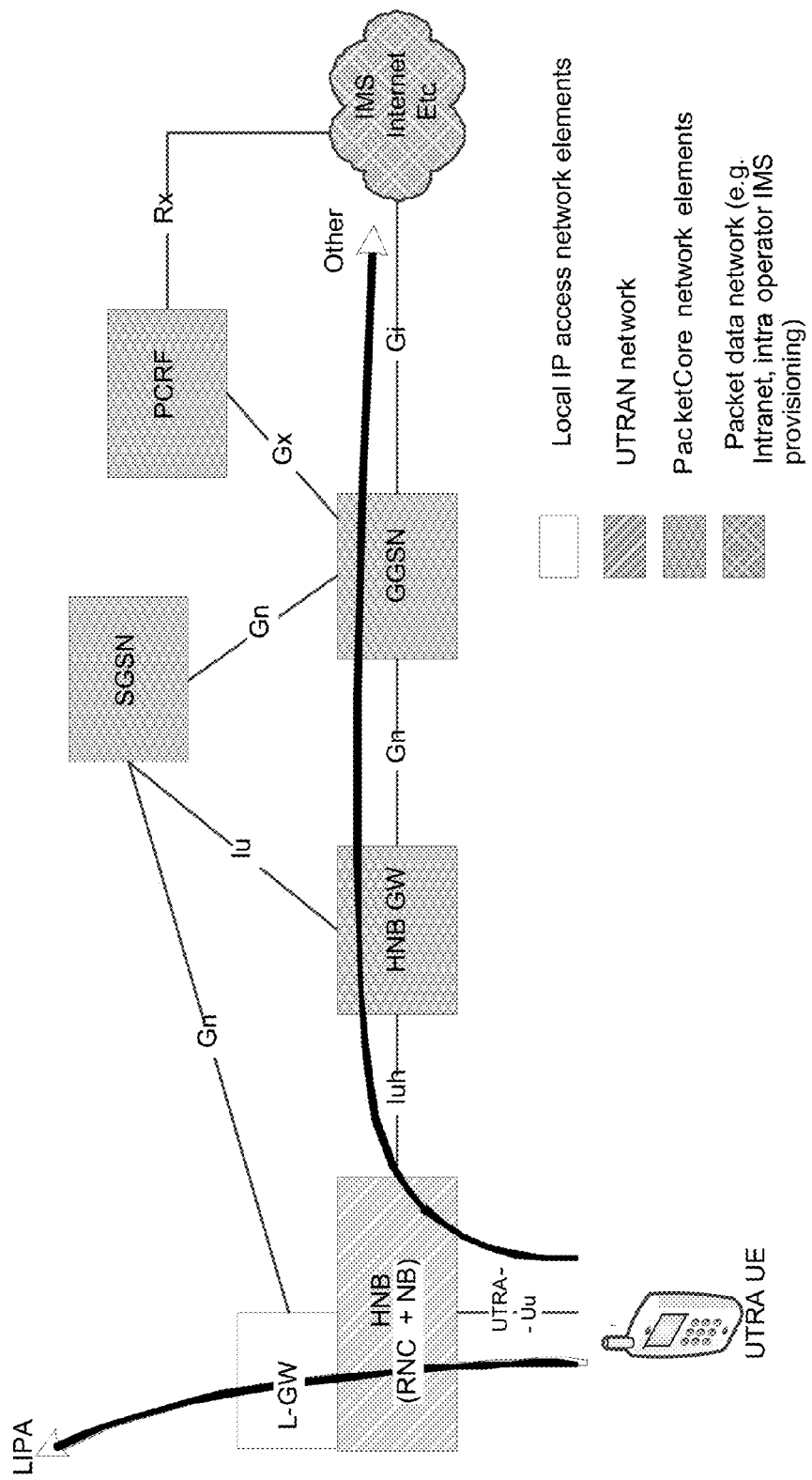
FIG. 30 is an exemplary illustration of a LIPA solution for UMTS-based local PDN connection.

As shown in FIG. 30, LIPA and SIPTO, based on traffic breakout, may be performed with an HNB using a local PDN connection. There may be separate PDN connection(s) for traffic going through the mobile operator's core network. For LIPA traffic, a Local packet data network (PDN) gateway (P-GW) function or Local GGSN function for evolved packet system (EPS) and UMTS, respectively, may be located within a residential or enterprise network. The "local gateway" (LGW) may perform any of the following subset of P-GW or GGSN functions: 1) Per WTRU policy based on packet filtering and rate policing or shaping; 2) WTRU IP address assignment; and 3) Direct Tunneling between LGW and HNB in connected mode.

From a "services" perspective, LIPA and SIPTO for H(e)NB may be viewed as a disjoint set as summarized in Table 1. For example, home/enterprise based services traffic may be routed via a LIPA path, while internet based services not provided by the mobile network operator (MNO) (e.g., watching a Youtube.com video) may involve SIPTO with a breakout at the HNB. In addition, value-added services provided by an operator, but hosted by some third-party, may use SIPTO with breakout at a HNB-GW or HNB.

TABLE 1

|  | LIPA | SIPTO via HNB Subsystem |
|---|---|---|
| Objective | Enable access to home/enterprise network devices from UE by routing the traffic locally, bypassing the Mobile Core Network | Enable access to PDN networks, other than the MNO's core network, from UE by routing the traffic so as to bypass the Mobile Core Network |
| Applicability Domain | Accessing Home/Enterprise Network | Accessing PDN networks, other than the MNO's core network. These will typically be the value-added services provided by the MNO which are not hosted by the MNO |
| User Awareness | Takes place by user action | Transparent to user, n/w takes all decision if traffic of a particular session is to SIPTOed or not. |
| Breakout point | HNB | HNB, HNB-GW |
| UE Capability | May need support for multiple PDN connection for simultaneous access to LIPA and MCN IP Access | No special capability |
| MNO's Role | LIPA setup is user-initiated. MNO role is limited, e.g., subscriber authentication and authorization and session establishment | SIPTO setup is network-initiated. |
| Policing & Charging | Mostly static policies, pre-configured on HNB. Policing and charging requirements will mostly be very simple | Can be dynamic. Certain APNs may require policy control and charging architecture (PCC) based policing also |

Figure 29:
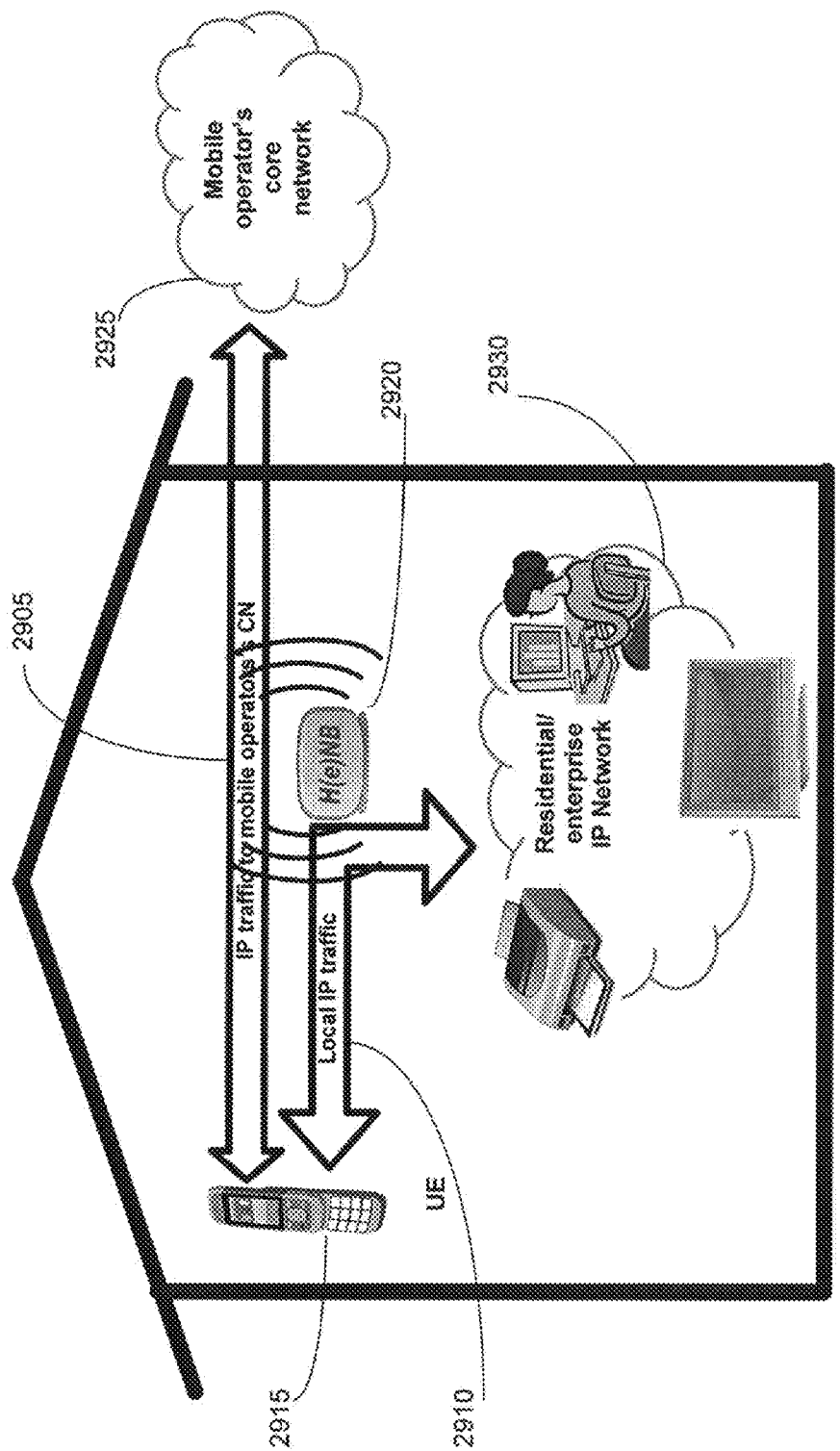
FIG. 29 is an exemplary illustration of an embodiment of LIPA.

FIG. 29 is an exemplary illustration of an embodiment of LIPA. Here, 2915 may be a WTRU which is capable of making a logical connection 2905 to a mobile operator's core network (MCN) 2925 via an H(e)NB 2920. The WTRU 2915 may also connect to a residential or enterprise network 2930 via the H(e)NB 2920.

Embodiments of the present disclosure may comprise any of the following HNB scenarios for SIPTO: HNB subsystem and backhaul provided by the same operator; HNB subsystem and backhaul provided by different operators; and LGW for LIPA/SIPTO located in a private address domain (e.g., behind a network address translation (NAT) gateway).

FIG. 30 displays an exemplary embodiment of a LIPA solution for UMTS-based local PDN connection. Note that other mobile telecommunications wireless technologies may be used such as CDMA, LTE, and LTE Advanced. The names Although many figures herein display UMTS components the application also applies to other mobile telecommunication technologies such as LTE and LTE-A. SGSN, HNB-GW, HNB, and LGW may support "direct tunnel" functionality. Support for direct tunneling between LGW and RAN in connected mode are in exemplary embodiments herein. For example, a direct tunnel approach may define procedures for establishing a direct tunnel between RNC and GGSN. In some embodiments, an HNB may look like an RNC and an LGW may look like a GGSN to an SGSN. This may be needed to allow an SGSN to set up a tunnel.

The following LIPA/SIPTO IP address situations may apply to CGW implementations. An IP address of a WTRU may be assigned by an LGW, acting as a gateway to a local network that a user wishes to access. An IP address may be assigned to a WTRU by an LGW within a home subnet. User mobility (i.e., change of point of radio interface attachment) during an ongoing PS session may not cause a change in the IP address of a WTRU. User mobility during an ongoing PS session may not cause a change of an anchor LGW.

Each LGW may be uniquely resolvable by an APN name. For example, LGWs may have unique names or an SGSN may have the intelligence to identify a particular LGW. Managed remote access (MRA) may include remote access to a user's home network from a macro cell or from a remote HNB. Managed Remote Access (MRA) may include remote access to a user's home network from a macro cell or from a remote HNB.

The LGW may behave like a GGSN, but GGSNs are typically limited in number and may cater to a huge volume of traffic while LGWs may be enormous in number but each individual LGW may cater to a very small amount of traffic. Therefore, a concentration function, such as an LGW Aggregator (similar to an HNB-GW), which may pose as a GGSN to a Core Network, may hide many GGSNs (LGWs) behind it. In many embodiments, an LGW Aggregator may be configured in the MCN, analogous to the HNB-GW.

Traffic on all interfaces owned/managed by MNO may be secured (e.g., HNB to LGW, LGW to MNC). There may also be interfaces which are not managed by an MNO (though such interfaces may emanate from MNO managed elements) and therefore security may not be a concern (e.g., LGW to LIPA network, LGW to SIPTO network, etc.).

The HNB's, LGWs, SeGW, LGW Aggregator, SGSN, STUN Server, MCN, neighbor network, home network, RNC and other devices and systems displayed in figures herein may have different embodiments that combine the functions of the devices into one or several different physical forms. All devices and systems are consistent with the definitions and representations herein.

Figure 31:
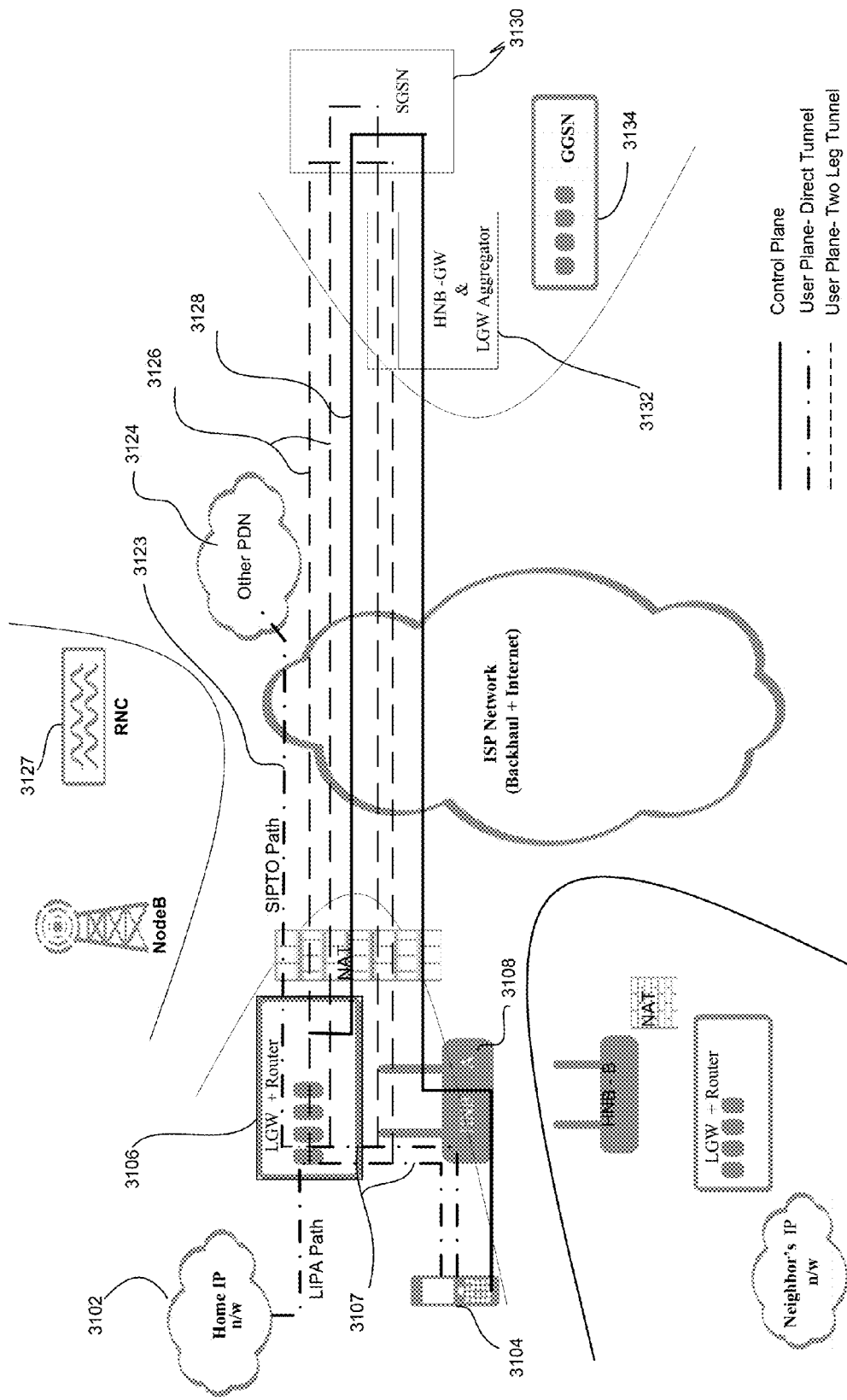
FIG. 31 is an exemplary illustration of a "Simple" LIPA and SIPTO with HNB Breakout implementation.

"Simple LIPA" will be used to distinguish LIPA from "extended LIPA" (ELIPA). While home-based LIPA scenarios will be primarily discussed herein, the present disclosure may also be applied to enterprise-based LIPA scenarios. FIG. 31 is an example of a simple LIPA embodiment, a WTRU 3104 may be attached to its home network HNB 3108 and access its home network 3102 via an LGW 3106.

For example, in FIG. 31, the following method may be implemented in an exemplary simple LIPA embodiment and may not necessarily occur in the order presented: 1) WTRU 3104 may request PDP context creation using an access point name that the MCN can resolve to find the LGW providing LIPA to the home based network, such as home-LIPA-APN, through WTRU's home HNB 3108; 2) a SGSN 3130 or LGW Aggregator 3132 may resolve home-LIPA-APN to LGW 3106 and may select that as a "home GGSN"; 3) LGW 3106 may allocate a private home IP address to the WTRU 3104, which may be echoed back to the WTRU 3104 via the SGSN 3130 on control plane 3128 using the air interface provided by the HNB 3108; 4) User plane paths (e.g., GPRS Tunneling Protocol (GTP tunnel)) may be setup (e.g., 3126 or 3107): 4a) a preferred path wherein there is a direct tunnel path 3107 between the LGW 3106 and HNB 3108; and/or 4b) a less optimal path wherein there is a traditional two leg tunnel 3126, comprising of HNB 3108 to SGSN 3130 tunnel and an SGSN 3130 to LGW 3106 (home GGSN) tunnel; and 5) the WTRU 3104 may access devices on inside home IP network 3102 as the IP address allocated to the WTRU 3104 may be routable in the inside home IP network 3102.

The user plan paths may be setup in different ways. For example, as shown in FIG. 31, there is user plane two leg tunnel 3126 and a user plane direct tunnel 3107. The direct tunnel 3107 may be between the LGW 3106 and HNB 3108. The two leg tunnel 3126 may comprise an HNB 3108 to SGSN 3130 tunnel and LGW 3106 to SGSN 3130 tunnel The two leg tunnel path 3126 may be used subsequently (e.g., after initial setup) to establish anchoring of the LIPA session to account for the WTRU 3104 moving to a macro coverage area.

The WTRU 3104 may establish a normal PDP context via SGSN 3130. While assigning the GGSN 3134, the SGSN 3130 may evaluate a possibility of SIPTO and accordingly may assign a gateway which may connect the user to an intended PDN without passing thru the core network. For example, possible breakouts can happen at any of the HNB 3106, HNB-GW 3132, and RNC 3127. SIPTO with breakout at HNB is considered as shown in FIG. 31, wherein the SIPTO path 3123 is connected to the PDN 524 (LGW 3106 is co-located with HNB 3108).

Figure 32:
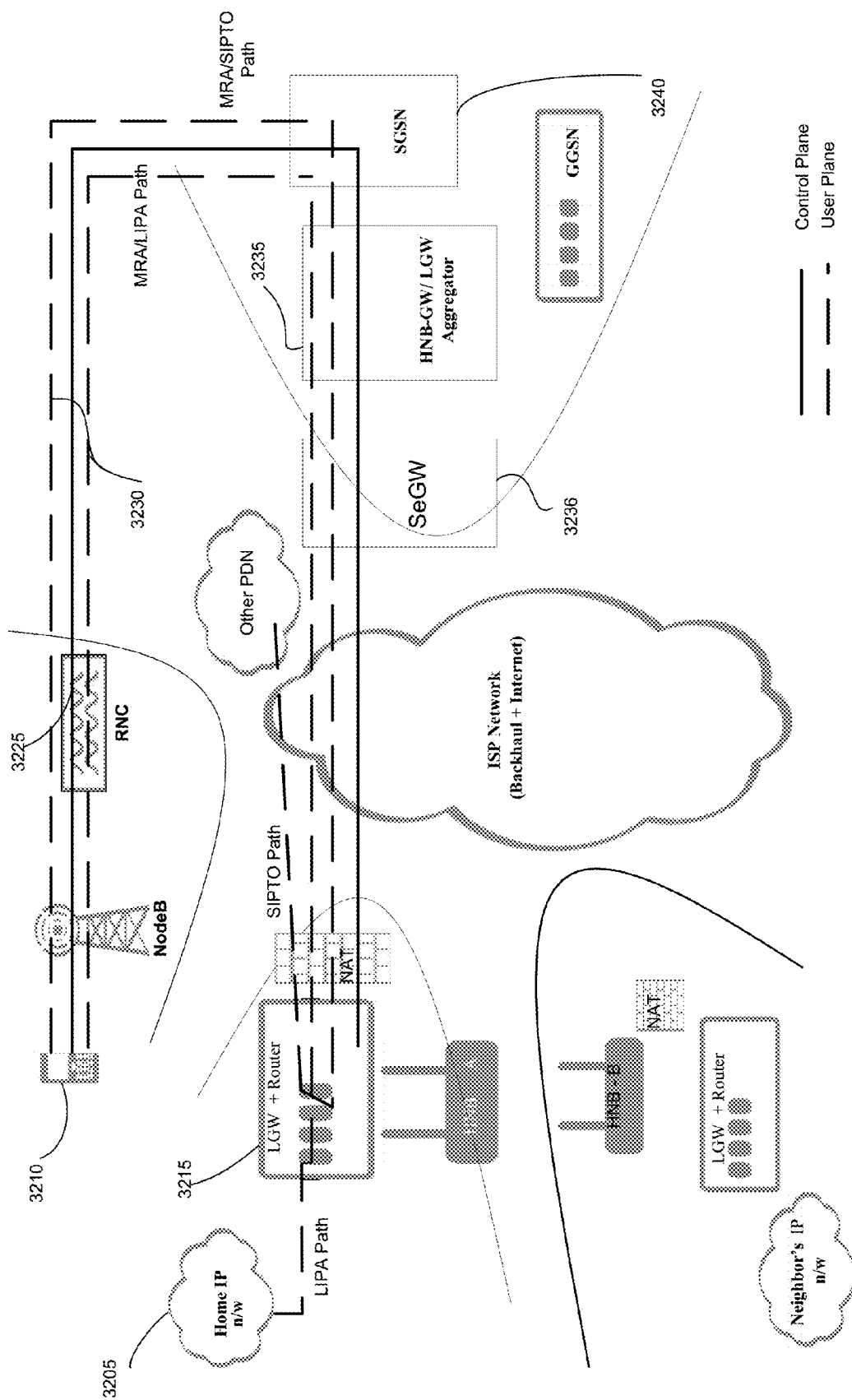
FIG. 32 is an exemplary illustration of a Managed Remote Access (MRA) implementation.

In an embodiment, as shown in FIG. 32, managed remote access (MRA) may be implemented to a home-based network 3205 (or enterprise-based network) via a macro network. In such an embodiment, a user may attach to a macro network and may access his home network via a public land mobile network (PLMN) (i.e., MRA), as illustrated in FIG. 32. The following method may be implemented in an exemplary implementation of this embodiment and may not necessarily occur in the order presented: 1) a call may be routed via PLMN (user plane path 3230 may be SGSN 3240 to HNB-GW/LGW Aggregator 3235 to SeGW 3236 to LGW-A 3215); 2) WTRU 3210, latched to the macro network, may connect to its home network 3205 by selecting home LGW's 3215 APN name; 3) the SGSN 3240 may get an IP address that is routable in the home network 3205 from the home LGW 3215; and 4) setup GTP tunnels via SGSN 3240 (as shown in FIG. 32) or the SGSN 3240 may setup a Direct Tunnel between LGW 3215 and macro RNC 3225 (not shown in FIG. 32).

MRA may be implemented to a home-based network (or enterprise-based network) via a remote HNB. Scenarios wherein UE access to a LIPA-enabled home network is implemented via a remote HNB may be referred to herein as "Extended LIPA" (ELIPA). ELIPA may be applicable to enterprise, residential neighborhood, and broader internet domains, among others.

A WTRU may be connected to the WTRU's home network via a neighbor's HNB/L-GW. The user may not be connected to the neighbor's inside IP network. In this embodiment, a user may not have a dedicated interface defined for inter-HNB communications (i.e., there may be no Iur or X2 type interface between HNBs or HeNBs, respectively). The following method describes an exemplary implementation of this embodiment, and may not necessarily occur in the order presented: 1) no dedicated interface may be defined for inter-HNB communications; 2) a WTRU may be latched to a neighbor's HNB and the WTRU may select its home LGWs APN name for establishing a connection; 3) a SGSN using the control plane may setup the user plane.

Figure 33:
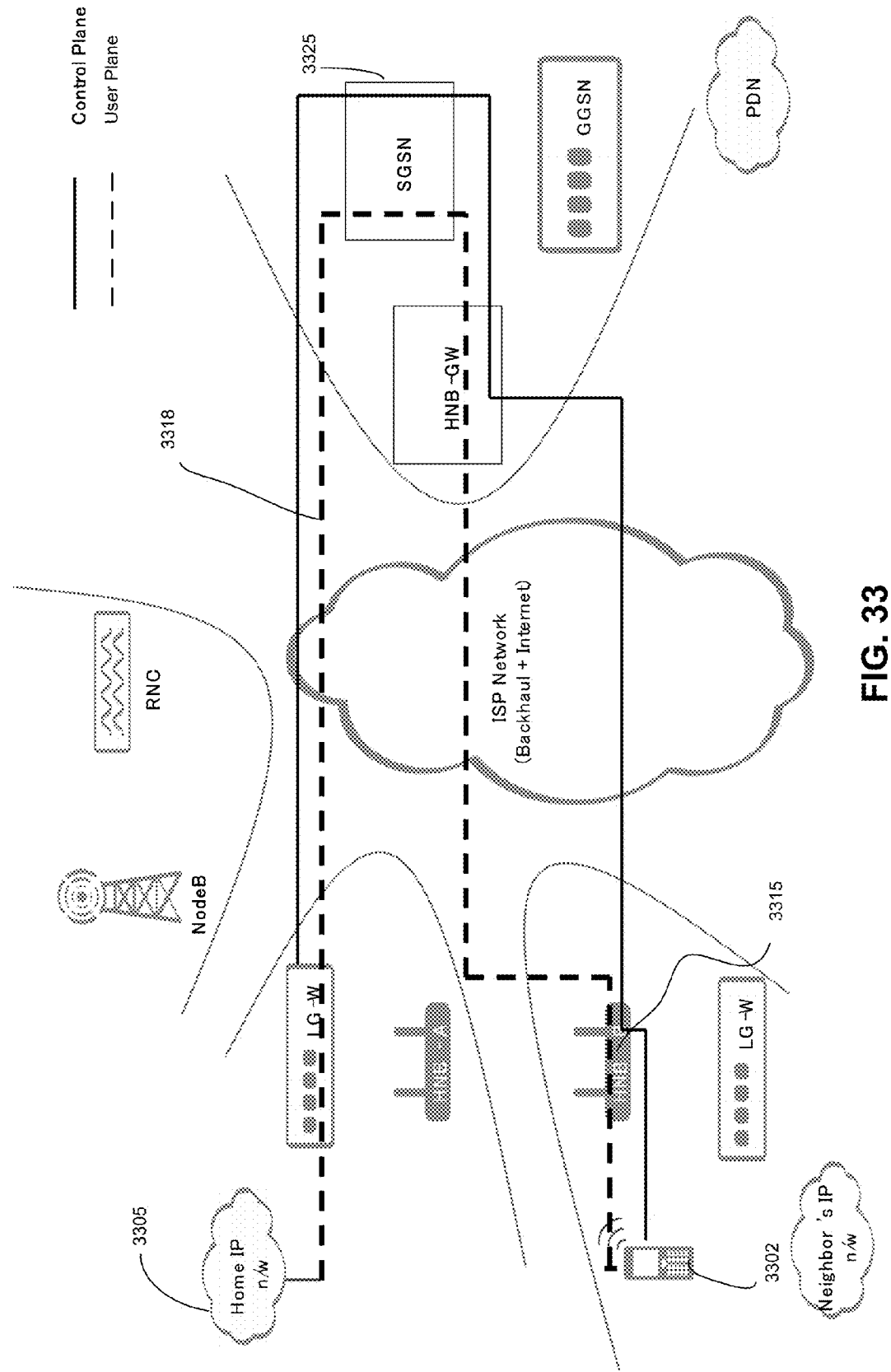
FIG. 33 is an exemplary illustration of a WTRU connected to WTRU's home network via a neighbor's HNB.

FIG. 33 displays an embodiment where a WTRU 3302 may be connected to the WTRU's home network 3305 via a neighbor's HNB 3315. The user plane 3318 may be setup in different ways. For example the core network may establish GTP tunnels via the SGSN 3325. Since the tunnels, which connect thru the user plane 3318, in this case may go through the SGSN 3325, this option may not be preferred for "local" access (it may not offload traffic from the operator's MCN). The use of the SGSN 3325 in this scenario, as shown in FIG. 33, may have the advantage of not needing to reinvent for NAT traversal and security purposes. Charging, lawful intercept, etc., may continue as before.

Figure 34:
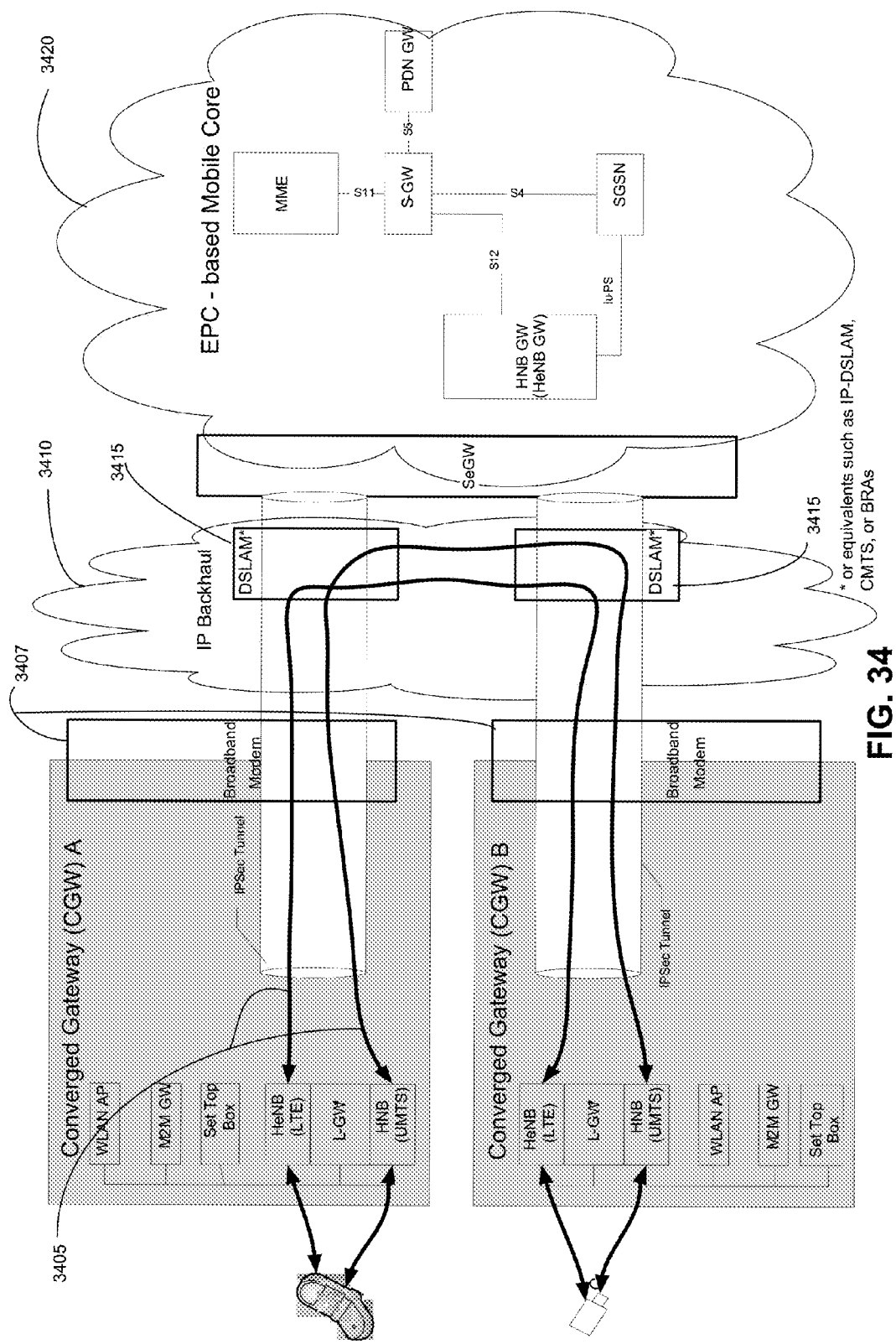
FIG. 34 is an exemplary illustration of WTRU data routed in the IP backhaul with minimal involvement from the mobile core network.

WTRU data may be routed in the IP backhaul with minimal involvement from the mobile core network in the actual routing of WTRU data. The mobile core operator and the IP backhaul provider may have an interworking agreement or alliance or may be the same entity. Packets that may be exchanged between two HNBs (e.g., Neighbor and Home) may be reflected (routed) to the proper HNB within the IP backhaul. FIG. 34 shows that DSLAM 3415 (also BRA, CMTS, and the like) elements in the IP backhaul 3410 may route (reflect) the traffic within the IP backhaul 3410. This re-routing may prevent the user data packets 3405 from reaching the mobile core. This technique is IP backhaul technology agnostic, as the same technique can be used if the IP backhaul technology is either DSL or cable based (or any other access technology). When the IP backhaul network element receives a packet, it may perform a table lookup to determine if the destination is within its sphere. If so, it may reflect the packet to the appropriate broadband modem 3407. If the destination is reachable by routing the packet within the IP backhaul 3410, this may be done as illustrated in FIG. 34. If the destination is not reachable via the IP backhaul 3410, the packet may be passed to the mobile core network 3420.

Figure 35:
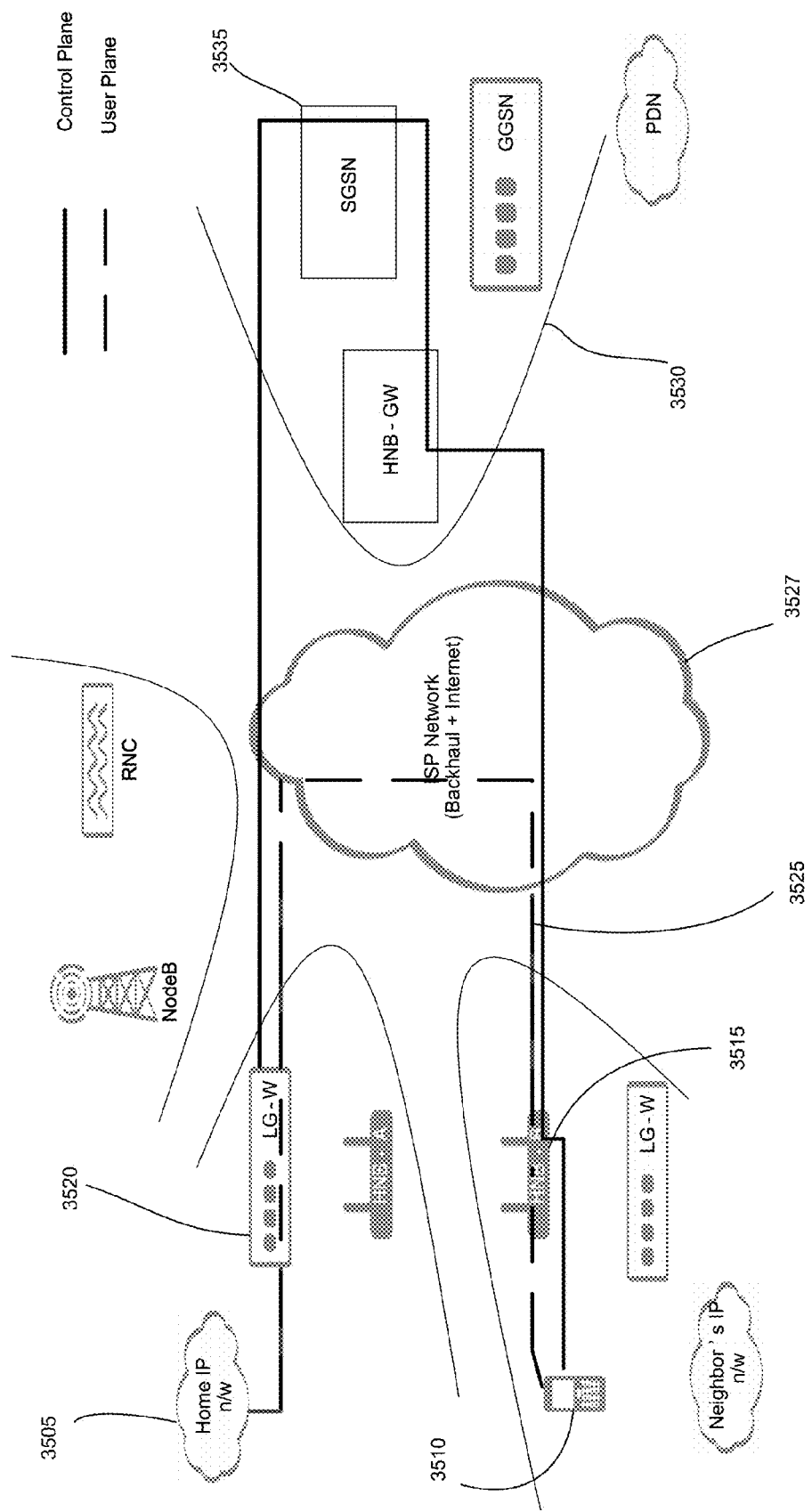
FIG. 35 is an exemplary illustration of a direct tunnel between a neighbor's HNB and Home LGW over an ISP network.

In FIG. 35, for example, an SGSN 3535 may establish a direct tunnel between a neighbor's HNB 3515 and WRTU's home LGW 3520 wherein the user plane 3525 may use the backhaul 3527 instead of the MCN 3530. FIG. 35 illustrates an embodiment where a WTRU 3510 access to the home network 3505 from the neighboring HNBs 3515 may be implemented utilizing direct tunneling. Such embodiments may require minimal or no change in the core network elements. NAT traversal may be an issue in such embodiments. For an unsecured solution, NAT traversal mechanisms such as STUN and ICE may be used.

Figure 36:
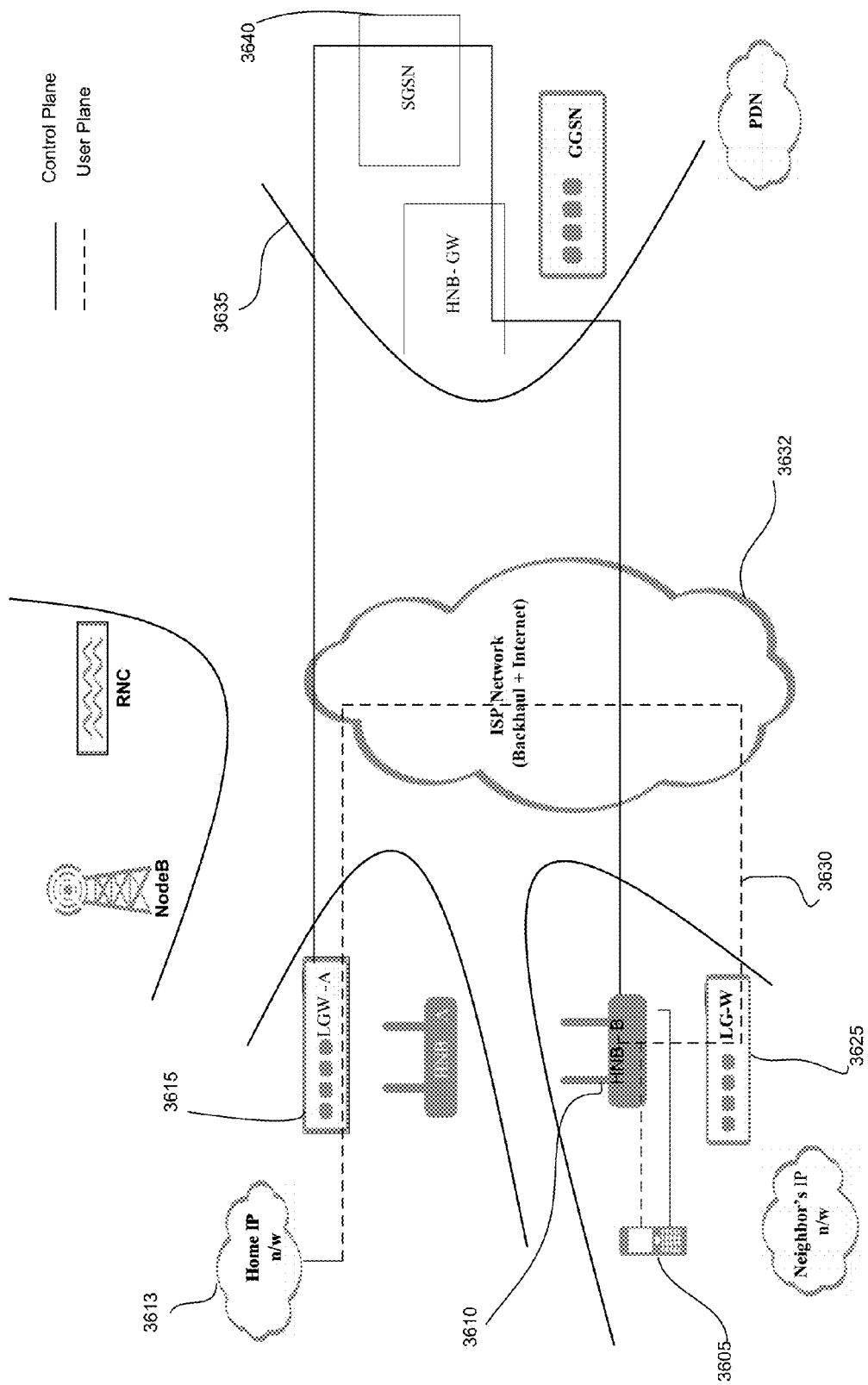
FIG. 36 is an exemplary illustration of a direct tunnel implementation between two LGWs over an ISP network.

In FIG. 36, for example, an SGSN 3640 may establish a direct connection between a neighbor's LGW 3625 and WTRU's home L-GW 3615 wherein the user plane 3630 uses the backhaul 3632 instead of the MCN 3635. This can be categorized as a SIPTO mechanism breaking out at the neighbor's HNB 3610 (here the breakout may be initiated by the WTRU 3605 or neighbor's HNB 3610) instead of at the MCN 3635, for example. This option may need some additional signaling support from SGSN 3640 to support the user plane path 3630. It is contemplated that the IP address to the WTRU 3605 may be given by the LGW 3625 co-located with the HNB 3610 to which the WTRU 3605 is camped.

The user plane option as shown in FIG. 36 may require the establishment of a tunnel between two LGWs (GGSNs). This option may cause changes on core network elements. The setup of "extension tunnels" between LGW and GGSN/P-GW may be used to support idle mobility for SIPTO.

Figure 37:
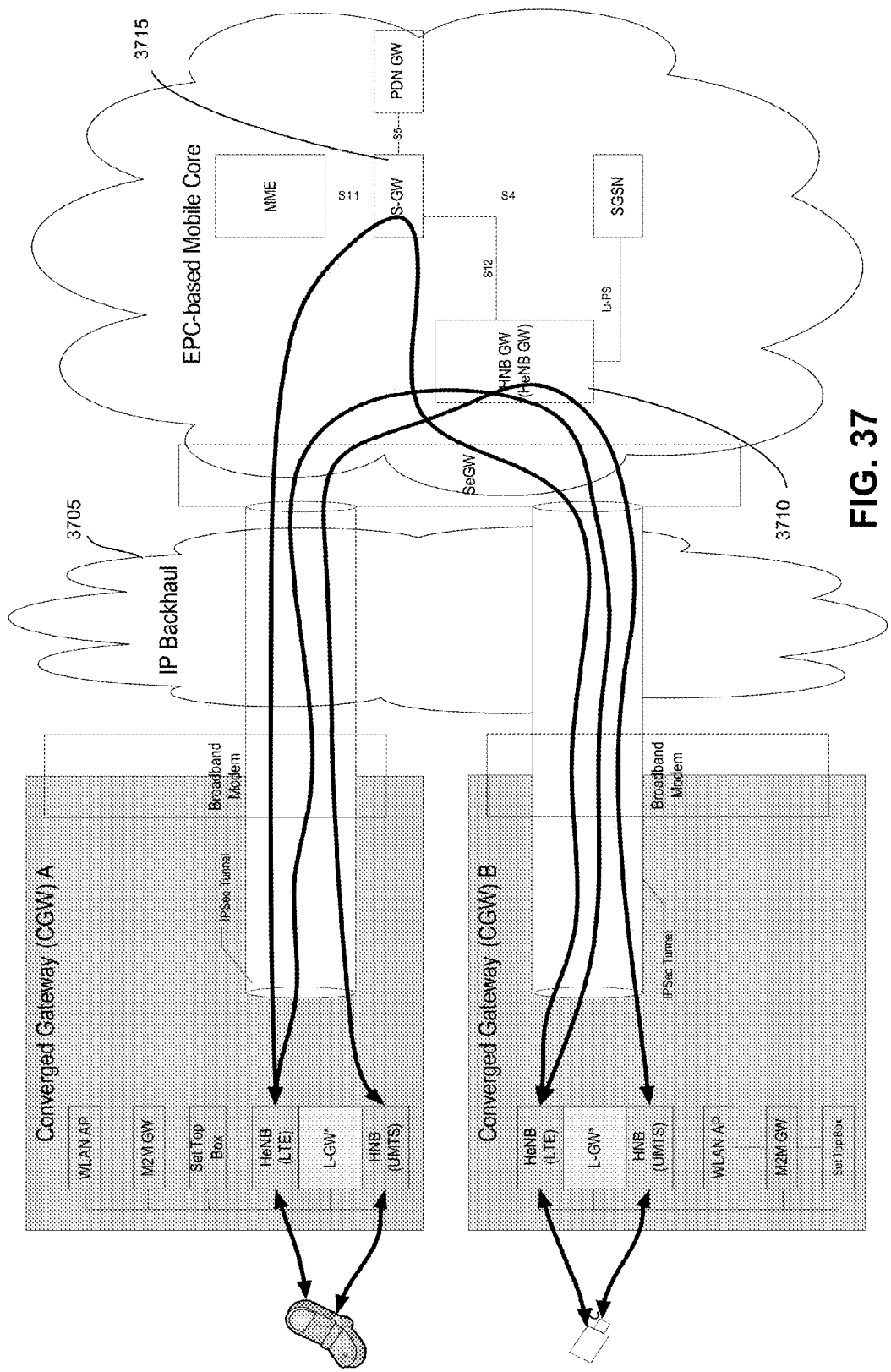
FIG. 37 is an exemplary illustration of a user plane options where the tunnels between respective end points pass thru the MNO's Security Gateway.
Figure 38:
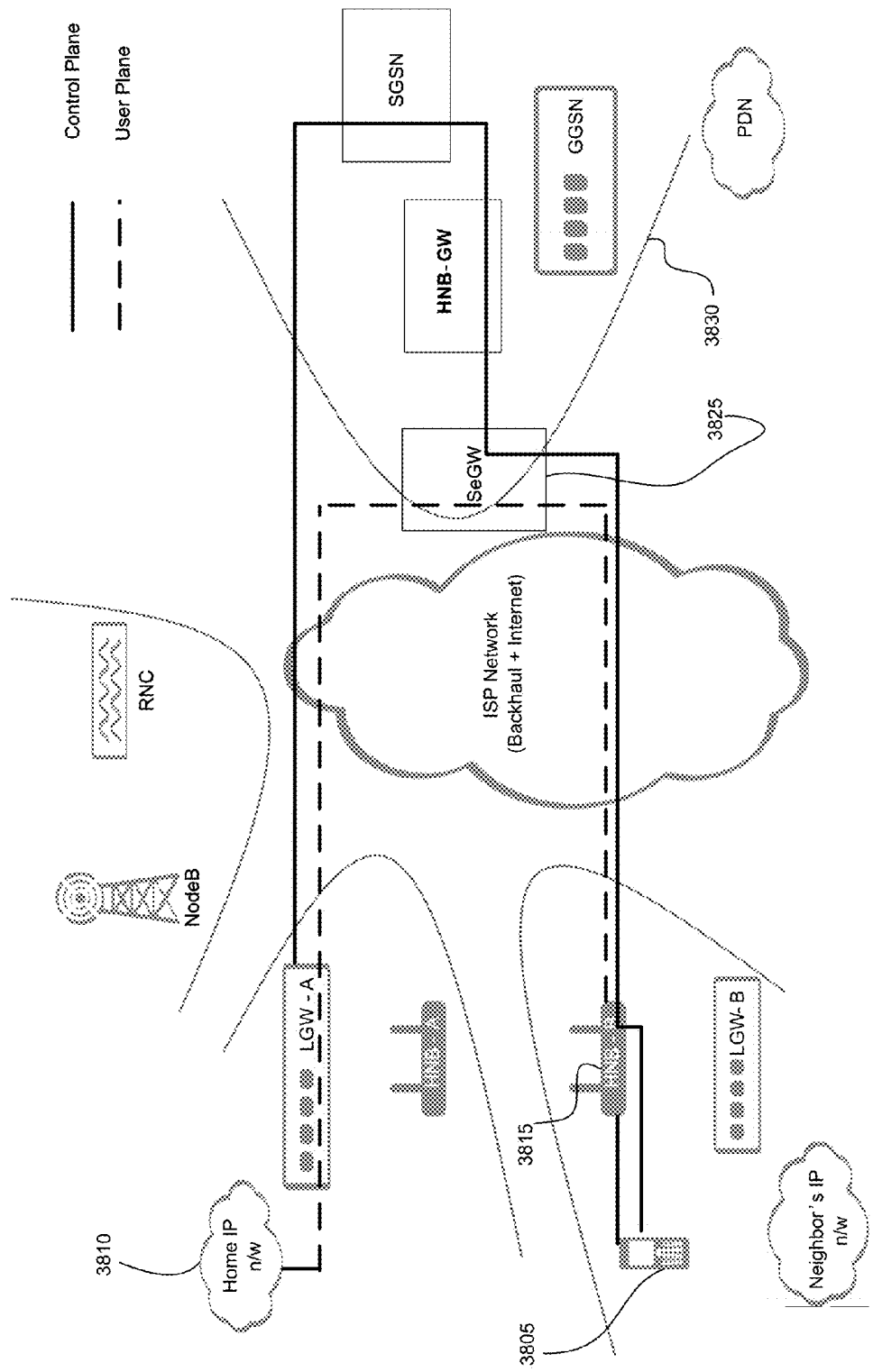
FIG. 38 is an exemplary illustration of a user plane between HNB and LGW passing through a SeGW.
Figure 39:
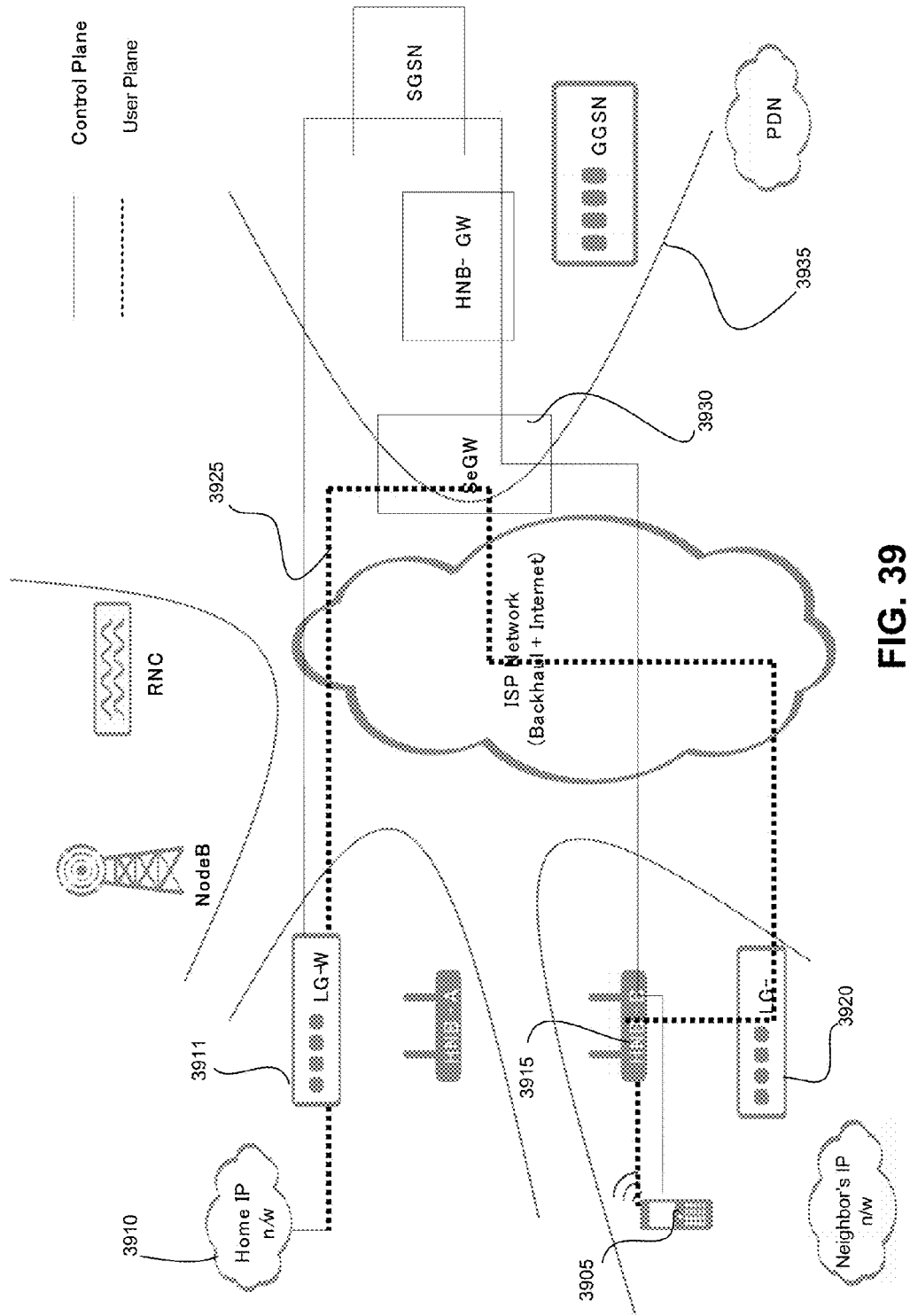
FIG. 39 is an exemplary illustration of a user plane between two LGWs, passing via SeGW.

User plane options may have variations where the tunnels between respective end points pass thru MNO's Security Gateway, as shown in FIG. 37, FIG. 38, and FIG. 39. This may provide a means for solving security and NAT traversal problems and also may provide the MNO with a point of control where it can plug-in functionality for accounting, charging, legal intercept, etc. In the scenarios shown by the figures the H(e)NB will have access to an IP backhaul (maybe through the LGW) which may provide a conduit to the mobile core network. For example, as shown in FIG. 37, when two HNBs need to exchange packets, the packets may be routed (reflected) in the first mobile core entity that receives the packets after the SeGW 3705. This may be the HNB-GW 3710, the S-GW 3715, or similar device depending on the configuration of the network. The network device may have a NAT or lookup table that may examine the packets it receives. If the destination of the packet is a device that the mobile core network element has within its sphere (e.g., the source and destination HNB are both connected to the same HNB-GW or S-GW), then the network element may route (reflect) the packet as illustrated in FIG. 37. If the destination of the packet is a device that is not within the sphere of the mobile core network element, then the packet may be treated normally and allowed to pass through to the packet domain network.

In FIG. 38, for example, a WTRU 3805 may connect via a neighbor's HNB 3815 to get the WTRU's home network 3810. Here, the neighbor's HNB 3815 may connect the user plane 3820 through the SeGW 3825 near the edge of the MCN 3830 and passes the user plane data to the WTRU's inside home IP network 3810.

In FIG. 39, for example, a WTRU 3905 may connect via a neighbor's HNB 3915 and LGW 3920 to get to the WTRU's inside home IP network 3910. Here, the neighbor's LGW 3920 (instead of the HNB 3915) may connect the user plane 3925 through the SeGW 3930 near the edge of the MCN 3935 to the WTRU's home LGW 3911 and to the WTRU's inside home network 3910.

FIG. 38 and FIG. 39 illustrate embodiments where the tunnels between respective end points may pass through the MNO's Security Gateway. FIG. 38 and FIG. 39 embodiments are very similar in concept to FIG. 35 and FIG. 36, respectively, except FIG. 38 and FIG. 39 travel thru the SeGW rather than the IP backhaul. Because of the SeGW difference FIG. 10 and FIG. 11 may have different signaling needs. FIG. 38 and FIG. 39 embodiments may provide the MNO a point of control to which the MNO may plug-in functionality for accounting, charging, legal intercept, etc. By moving this functionality closer to the edge of the MCN, e.g., into the SeGW, the load on the SGSN may be reduced. Moving the functionality may require changes to the SeGW and/or HNB-GW, among other devices.

User data may be routed directly between the HNB devices where one HNB may act as a UE camped on the other HNB. Each HNB may have both the functionality of a HNB and UE. If two HNBs need to communicate, this may be accomplished by one HNB acting as a UE and connecting to the other HNB. This is similar to how a stand-alone UE communicates with a HNB. This may allow an almost direct connection between the two devices and may completely localize the exchange of information without having to involve core network elements for the transfer of data. Once one HNB has established itself as a UE accessing the other HNB, the data that is to be passed between the two end devices may traverse through the created path, as shown in FIG. 40.

Figure 40:
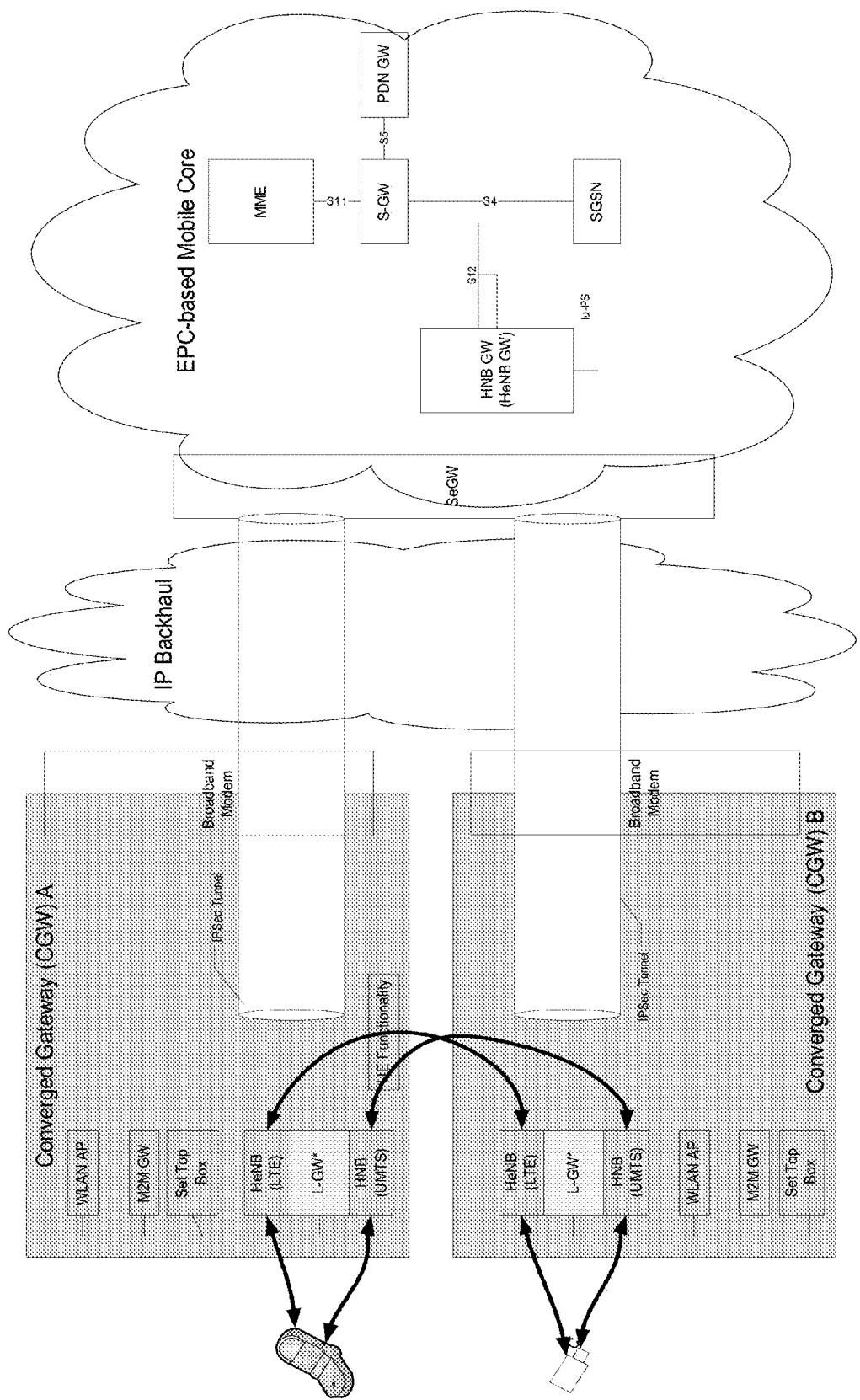
FIG. 40 is an exemplary illustration of a WTRU accessing a remote HNB via an inter-HNB interface.

Expounding on the embodiment of FIG. 40, a WTRU may be attached to a neighbor's HNB and may access its home network with an inter-HNB interface. In this embodiment, an interface (wired or wireless) may be defined for inter-communication of various CGWs. A CGW may be located in various places such as a home, an enterprise, and public areas (mall, park, neighborhood, etc.). The method below describes an exemplary implementation of this embodiment and may not necessarily occur in the order presented: 1) when a user UE latches on the neighbor's LGW, the user UE may tell a home LGW the IP address allocated to a UE by neighbor LGW; 2) the router at home CGW may be made aware of neighbor LGW's subnet so that the router can route packets between home LGW and neighbor LGW; 3) a tunnel may be established between the LGWs where the inner IP packet contains the IP address of UE (e.g., neighbor subnet) or home device (e.g., home subnet).

APN may be considered for LIPA and MRA. While the user's WTRU is camped onto a neighbor's HNB, the user may wish to use the neighbor's inside IP home network. For example, the user may want to print something on the neighbor's local printer from the user's WTRU, or the user may want to connect to the neighbor's TV in order to play a clip from the user's WTRU. At the same time the user may need access to his home network also (for example, the user may want to control a surveillance device). In embodiments, a user may be allowed LIPA in the neighbor's home network and the user may be able to have MRA to the user's home network. If the user is allowed to have access to the neighbor's home network, the user's WTRU may establish a connection with the neighbor's LGW. The user's WTRU may discover the neighbor LGW's APN in different ways.

In an embodiment regarding accessing the neighbor's network, every LGW may have a unique APN. This way a user may very precisely specify to which LGW he wants to connect to. Depending on the implementation, this method may create hundreds of thousands of DNS entries in a DNS server and/or SGSN APN database of a core network. A "buddy list" also may be setup so that a user may be able to type in the APN he wants to connect to.

In another embodiment regarding accessing the neighbor's network, the LGW's IP address may be resolved at runtime based on some logic by the core network. A variation of this approach may involve the introduction of an MCN element referred to as the "LGW Aggregator." The LGW generally may behave like a GGSN. A difference is that the GGSNs may be limited in number and cater to a huge volume of traffic while LGWs may be quite large in number but an individual LGW may cater to a relatively small amount of traffic. Therefore we may need a concentration function, an LGW Aggregator (similar to an HNB-GW) that may pose itself as a GGSN to a Core Network and hide many smaller GGSNs (LGWs) behind it. A LGW Aggregator may exist within the MCN, analogous to the HNB-GW.

In an embodiment, each LGW may also have a unique identity pre-burnt, just like an HNB, and a user profile in HLR may have entries for HNBs and home LGWs. The HNB-GW may maintain a mapping of all HNBs registered with it versus all WTRUs camped onto the individual HNBs. The SGSN may be aware of the HNB-GW where a WTRU is registered and the HNB-GW in turn may know the HNB where WTRU is camped. So to deliver a packet to the WTRU, the SGSN may resolve the address to a destination HNB-GW, and HNB-GW may subsequently find out the HNB and may forward the packet on the resolved IP address of the HNB.

A LGW Aggregator may be configured with the following considerations. The LGW Aggregator logical function may be a part of a core network and may be implemented as part of an HNB-GW itself The LGW Aggregator may share some data related to HNB to WTRU mapping. The LGW Aggregator may appear like a GGSN to the SGSN. During the PDP context activation procedure, the SGSN may need to determine the LGW Aggregator associated with the HNB-GW on which the WTRU is registered. Each LGW, as part of its initialization sequence, may register with a LGW Aggregator similar to how HNBs register with a HNB-GW. The HNB-GW and the LGW Aggregator combined may have the following mapping: HNB ID to LGW ID to International Mobile Subscriber Identity (IMSIs) of WTRUs latched on to given HNB.

APN names for an LGW may follow a pre-defined schema. These APNs may be configured during discovery and provisioning of the LGW. In an embodiment, the schema may be defined as: LIPA_<LGW-identifier>@<FQDN of associated LGW-Aggregator>. The SGSN may be configured to process the FQDN part of APN received in the ACTIVATE_PDP_CONTEXT request and may forward the CREATE_P-DP_CONTEXT request to the resolved IP address of the LGW Aggregator. LGW Aggregator may be configured to processes the <L-GW-identifier> part of the APN and may find out the IP address of the destination LGW.

In another embodiment regarding accessing the neighbor's network—the L-GWs may share a common APN. During a PDP context activation procedure, an SGSN may resolve this APN to a specific IP address based on certain parameters like a UE's IMSI or an HNB on which a UE is camped, etc. Using this scheme, a user may be able to connect to his home network (if an IMSI is used to resolve the IP address) or to neighbor's network (if a hosting HNB is used to resolve the IP address). A UE may be configured to not have the option to connect to both.

In another embodiment regarding accessing the neighbor's network, two "generic" APN names for LGW, e.g., "Home" and "Guest" may be defined. This may allow a user to connect to his home or other authorized networks. For "Home LGW," a user may select the Home LGW APN when the user wishes to connect to his home network. This may be used for both LIPA and ELIPA. Using IMSI, an SGSN may obtain the Home LGW from HLR. For "Guest LGW," a user may select this APN when he is latched to a neighbor's HNB and wishes to connect to neighbor's home network. In this case, the address of LGW may be known to HNB-GW from which the PDP Context Activation Request is originating (the UE is camped onto one of the HNBs registered with this HNB-GW and hence the LGW must have registered with the peer LGW Aggregator function). SGSN may forward the CREATE-PDP_CONTEXT request to the peer LGW Aggregator, using Iu connection information which was opened by HNB-GW. L-GW Aggregator may find out the corresponding L-GW and the aggregator may forward the request to that L-GW.

There may be LIPA-aware and LIPA-unaware client applications configured in the WTRU. PDN connection establishment may vary with mobile OS variants and device manufacturers. A WTRU platform may have a Connection Manager. The Connection Manager may be the bridge between the client applications and the radio layers in a WTRU. The APNs may be "owned" by the Connection Manager. The client applications may request a PDN connection from the Connection Manager and the Connection Manager may oblige by setting up the PDN connection on behalf of the client application. The behavior for setting up the PDN connection may depend on the Connection Manager type and also on service provider settings.

Some handsets may allow establishment of a power-on PDN connection with a default APN. Unless otherwise specified, the Connection Manager may route traffic on that PDN connection corresponding to traffic of all client applications. Handsets may support multiple PDN connections that may be used simultaneously.

The Connection Manager in some handsets may prompt the client application for the APN to be used (the APN may be supplied by the client application as per initial client application configuration or the user may be prompted to provide the same depending on the client application). If the APN corresponds to an already established PDN connection, the Connection Manager may multiplex the traffic on the existing connection. Alternatively, a new PDN connection may be established.

MCN, SIPTO, or LIPA may be implemented on a UE. A core network may be configured to set up an MCN connection for one WTRU, SIPTO for another WTRU, and LIPA for another WTRU, etc.

The issue of an HNB and backhaul not owned by the same operator may affect issues like QoS, lawful intercept (LI), charging, etc., but may not affect the subject disclosed herein. Note that home devices may be behind NAT. For LIPA and secure ELIPA traffic, NAT may not be an issue, but for unsecure ELIPA, NAT traversal mechanisms such as STUN and ICE may be used. In embodiments utilizing SIPTO, since the requests may have originated from a UE, NAT should not be an issue.

In some embodiments, handover may be addressed in the context of LIPA and/or SIPTO. In LIPA—MRA embodiments, a LIPA connected user may move out to a macro connection and LIPA connectivity may be retained as MRA and vice versa. In such embodiments, macro connections may be possible if the HNB allows handouts (typically HNBs allow hand-ins). As the WTRU moves out of its home network to the macro network, the WTRU's IP may not change. In such embodiments, seamless handover of running application session may not be possible so the LGW may have to remain in the path and may anchor the IP path for ongoing sessions. As a part of handout execution process, an SGSN may connect the GTP with macro-RNC with the secondary GTP established with the HNB. All other GTPs may be dismantled.

Lawful intercept (LI) support may be needed in the case of MRA (macro and inter-HNB) and SIPTO. Possible options of this may include: 1) an LGW may realize LI interfaces; 2) the traffic may flow via SGSN wherein SGSN may set up a two tunnel path or dynamically switch the direct tunnel path to two tunnel path for sessions on which LI is to be performed; 3) make the traffic flow via the SeGW and let the SeGW provide a LI interface, so that traffic overload on SGSN can be saved.

Figure 41:
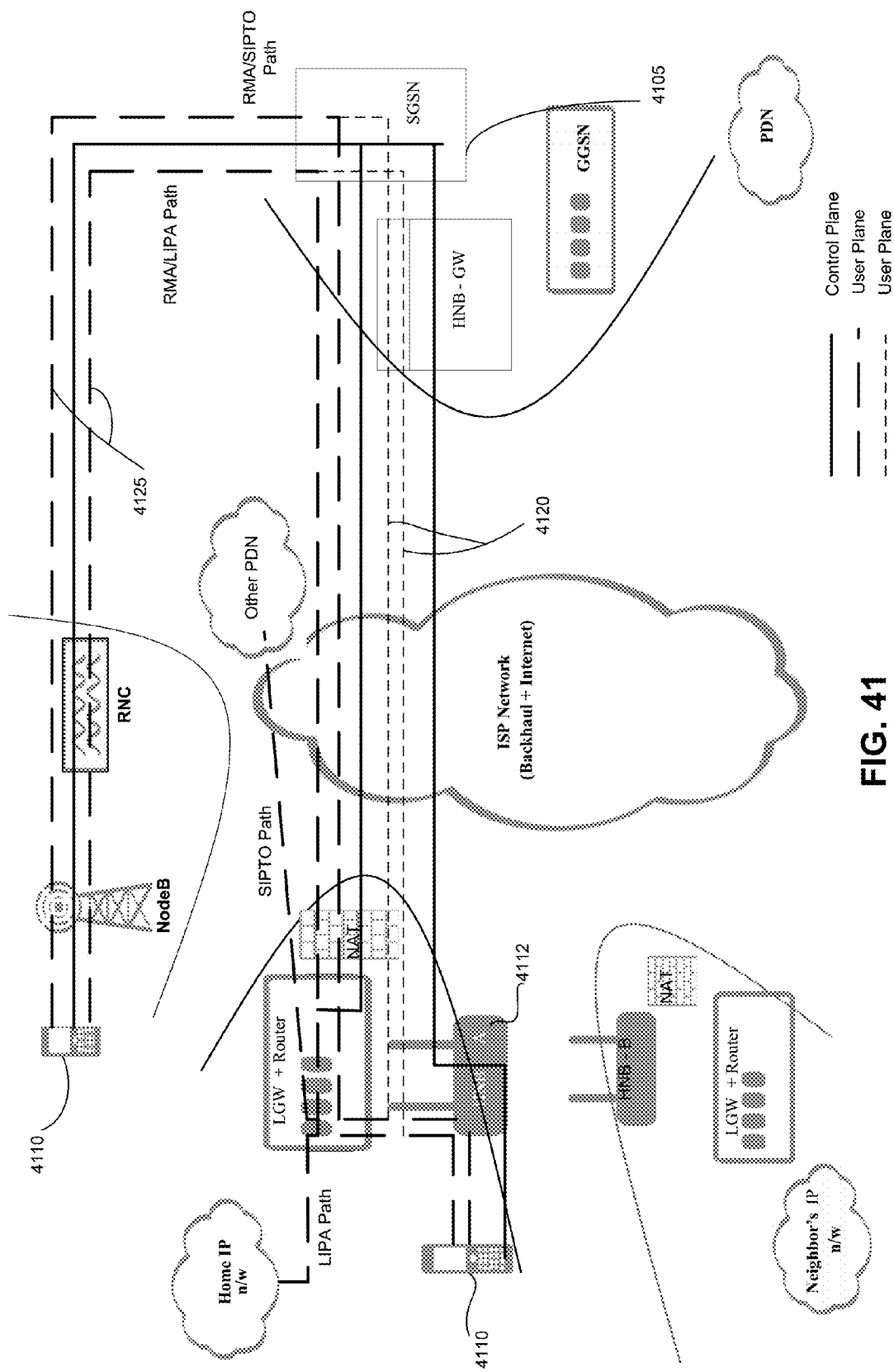
FIG. 41 is an exemplary illustration of MRA with LIPA/SIPTO Mobility.
Figure 42:
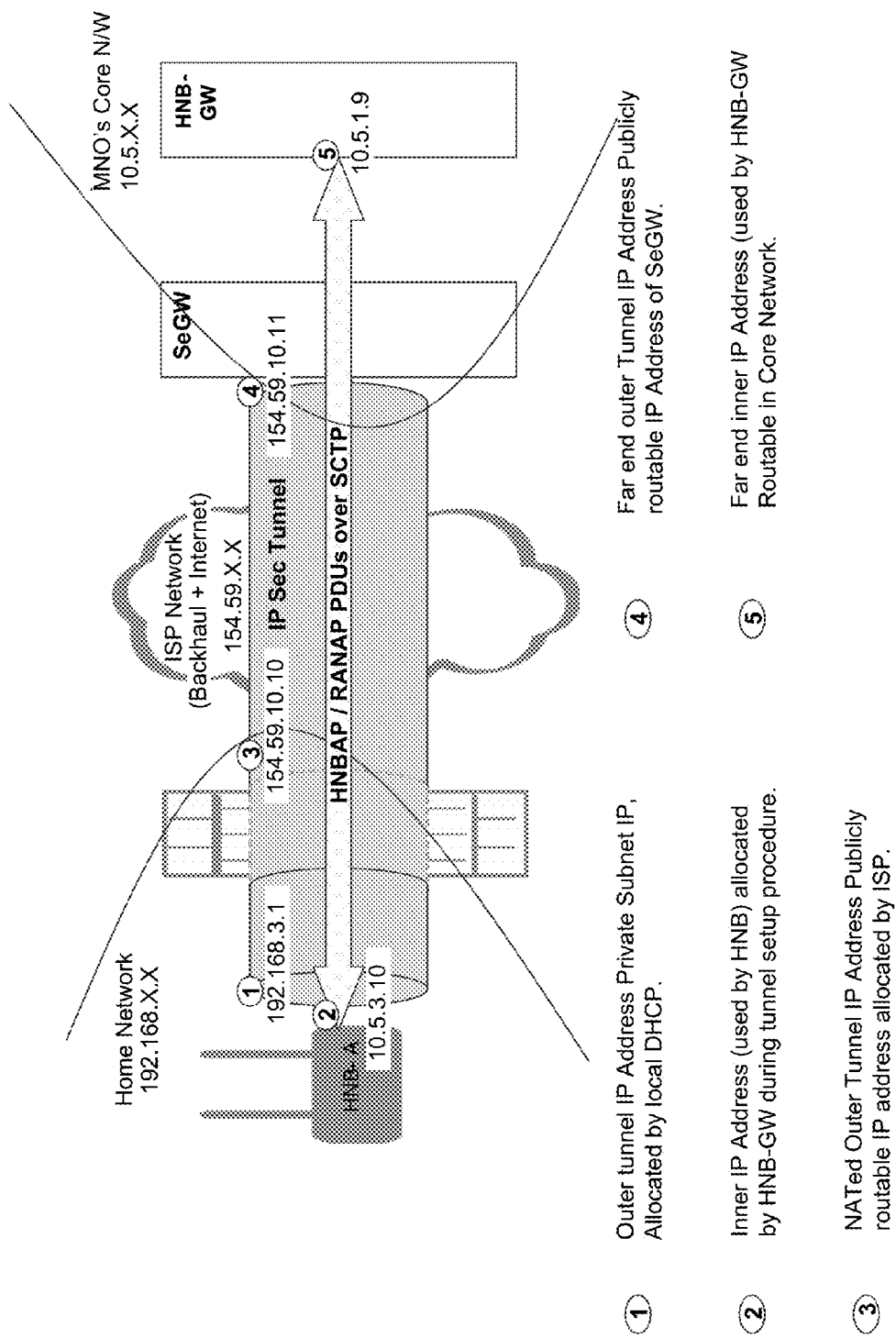
FIG. 42 is an exemplary illustration IP Addressing—HNB Registration.
Figure 43:
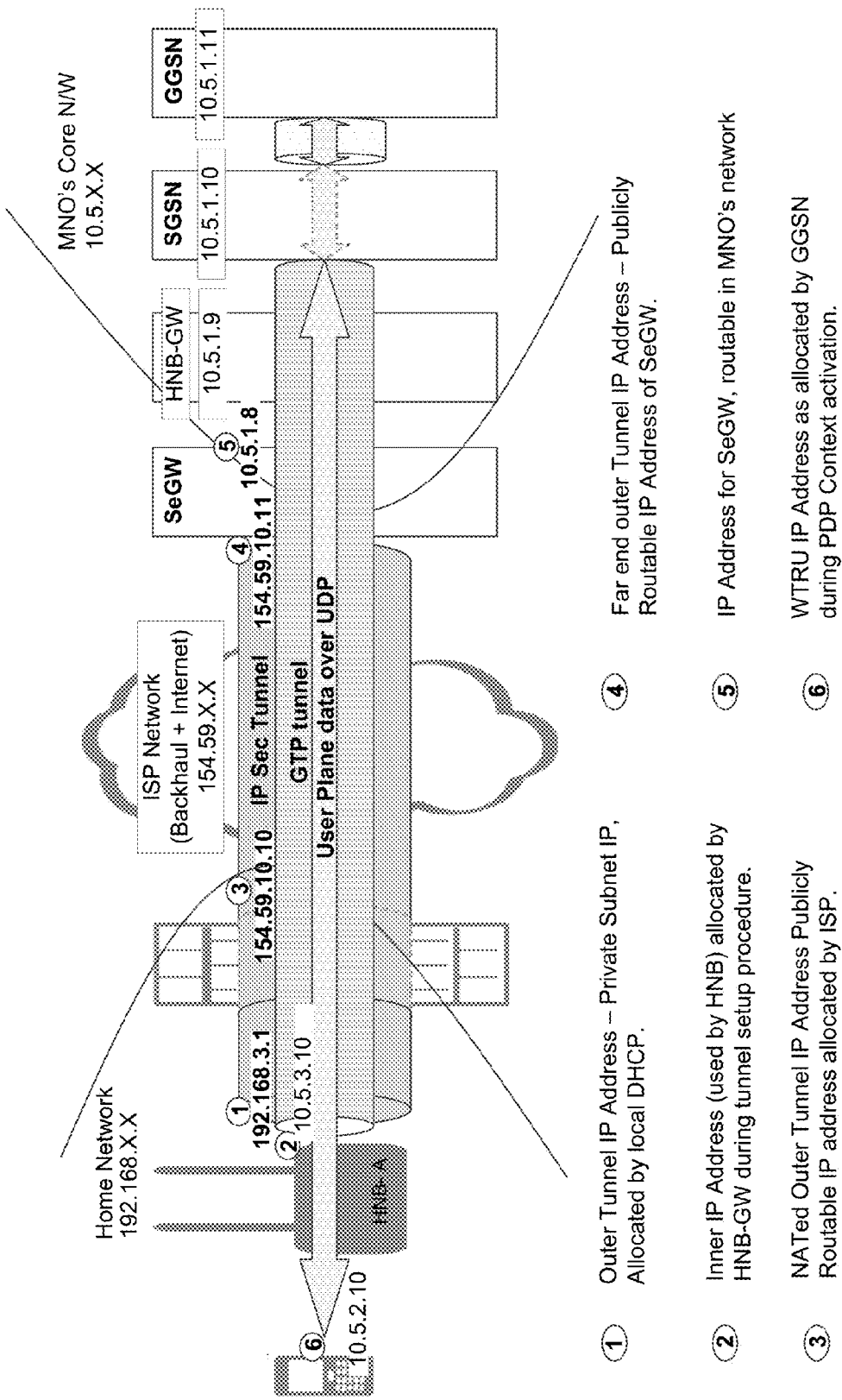
FIG. 43 is an exemplary illustration IP Addressing—Data Path (Two Tunnel)
Figure 44:
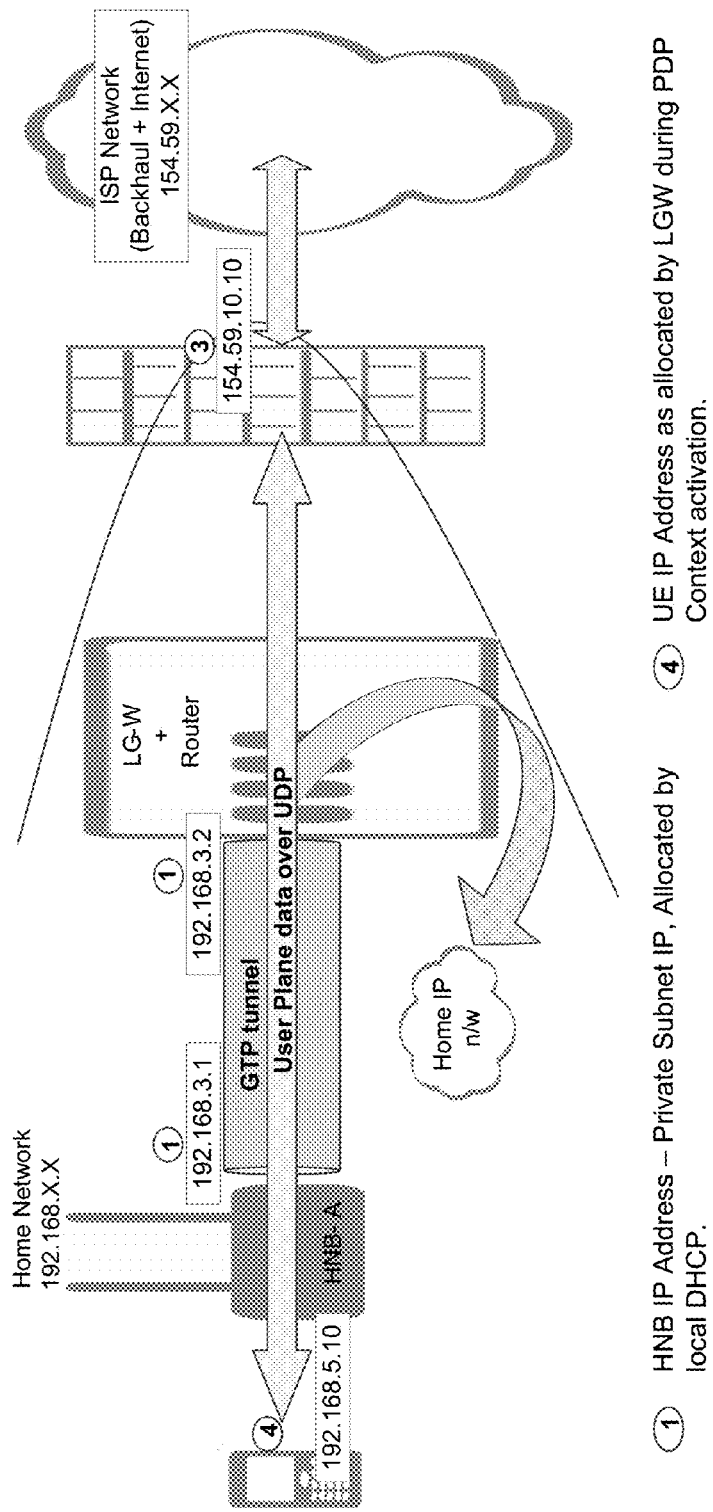
FIG. 44 is an exemplary illustration IP Addressing—Simple LIPA and SIPTO at HNB.
Figure 45:
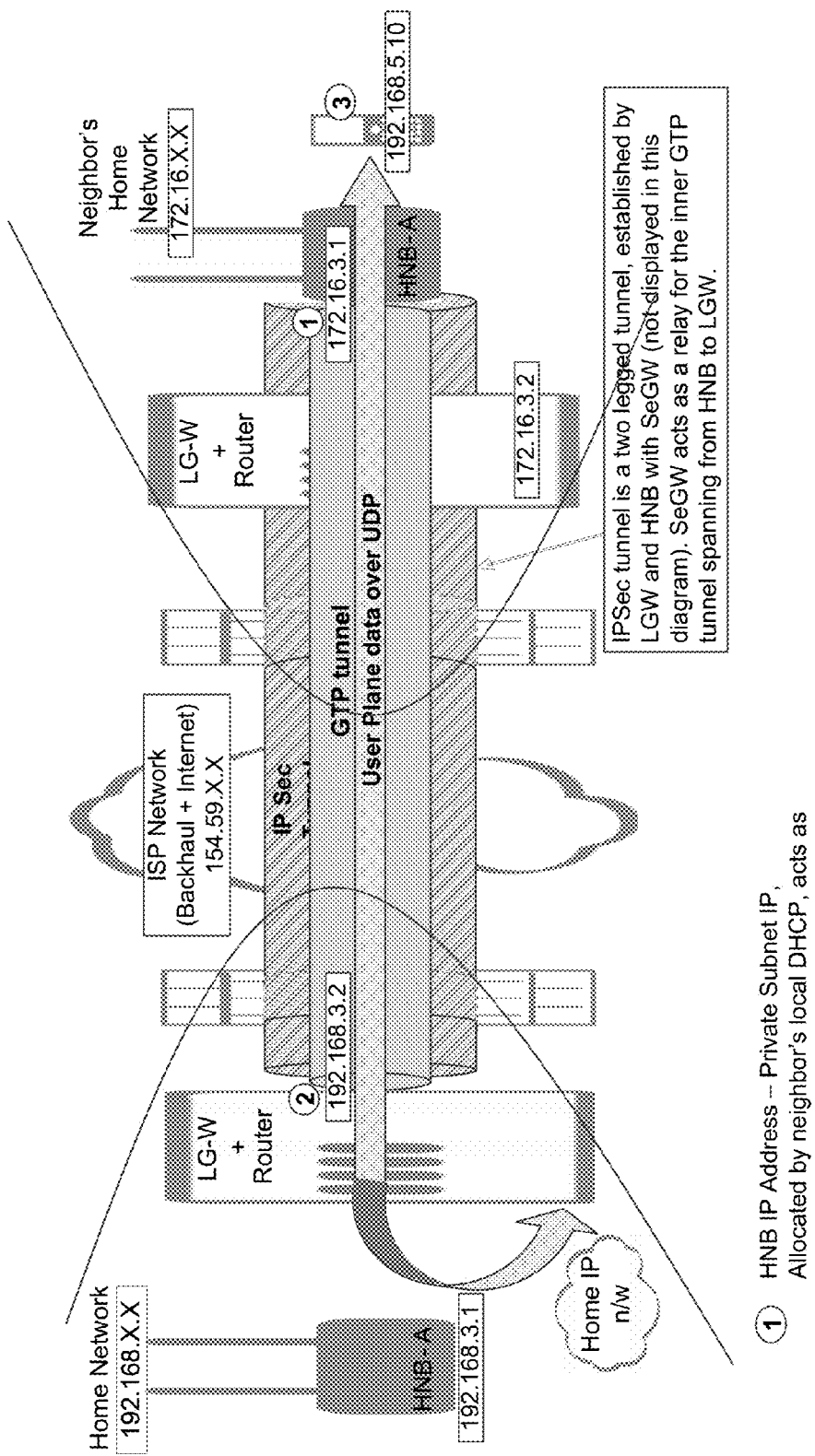
FIG. 45 is an exemplary illustration IP Addressing—ELIPA.

If LI is used for LIPA, the SGSN may force the LIPA connection through a less optimal path on a case-by-case basis as depicted in FIG. 41, for monitoring within the MCN, possibly unbeknownst to the user. For example, in FIG. 41 WTRU 4110 initially connected at the HNB-A 4112 and using the user plane path 4115 may be switched over by the SGSN 4105 to take a different user plane path (e.g., path 4125 or path 4120) that passes through the SGSN 4105 or some other device that allows for LI. This scenario may also apply to accounting, charging support, or the like.

FIG. 42 thru FIG. 45 capture IP addressing as implemented in various embodiments of the present disclosure. The IP addressing scenarios illustrated in these figures may be used by various entities during signaling and transferring of data for various scenarios of LIPA and SIPTO.

Figure 46:
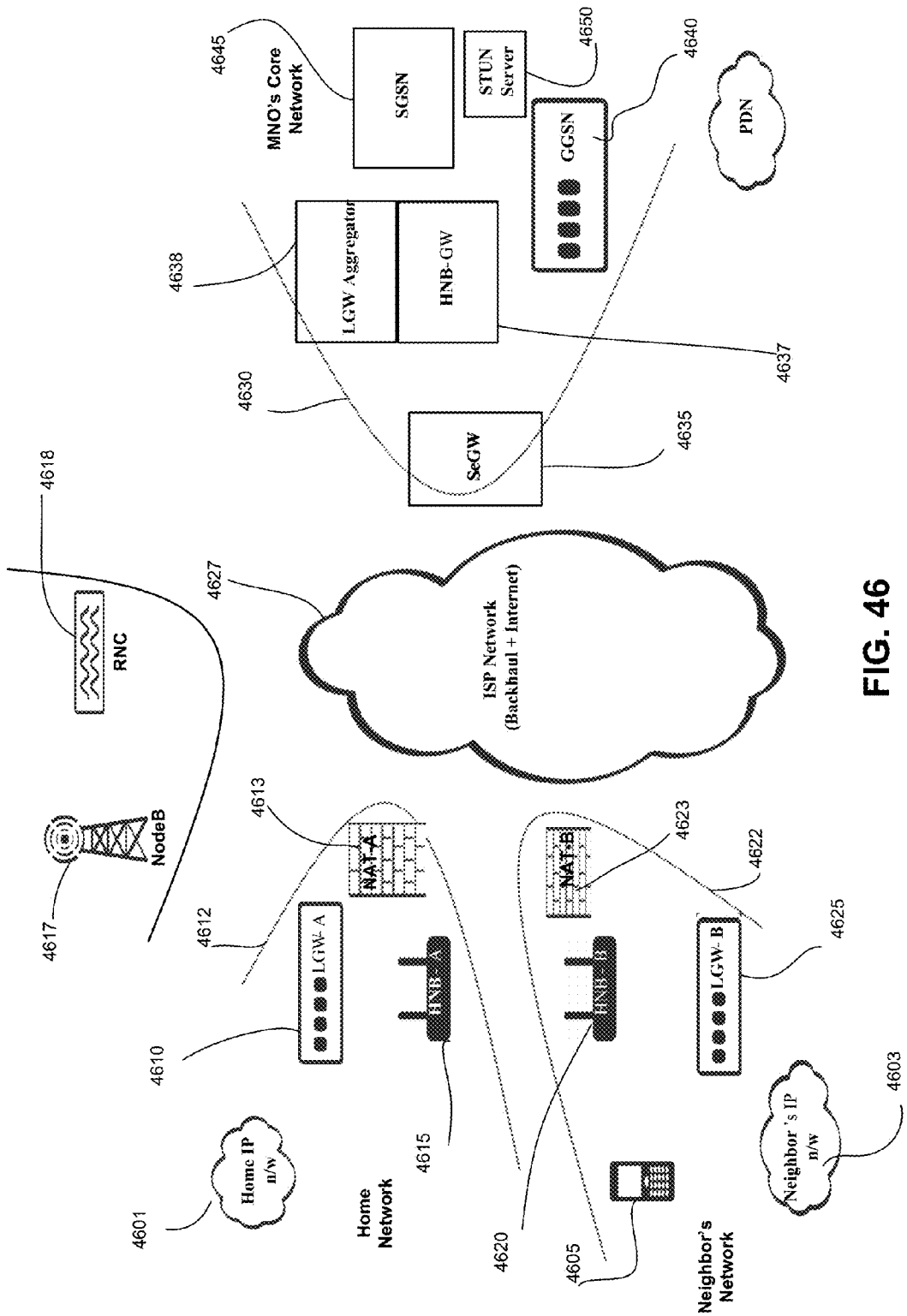
FIG. 46 is an exemplary illustration of a network that may be involved in the implementation of ELIPA or LIPA.

FIG. 46 is an illustration of a network where ELIPA or LIPA services may be performed. Herein HNB-B 4620, LGW-B 4625, inside neighbor IP network 4603, NAT-B 4623 and other devices and services ending "-B" may be CGW entities or system services related to a "neighbor" network 4622 as shown in FIG. 46. In addition, HNB-A 4615, LGW-A 4610, inside home IP network 4601, NAT-A 4613, DHCP-A, and other devices and services ending "-A" may be CGW entities or system services that relate to a "home" network 4612 as shown in FIG. 46. Also, SeGW 4635, HNB-GW 4637, LGW Aggregator 4638, GGSN 4640, SGSN 4645, and STUN server 4650 may be MCN 4630 entities as shown in FIG. 46. The RNC 4618 and node-B 4617 may be part of the macro network. The WTRU/UE 4605 has a home network 4612 and may be clamped to a variety of network elements consistent with the embodiments described herein.

Figure 47:
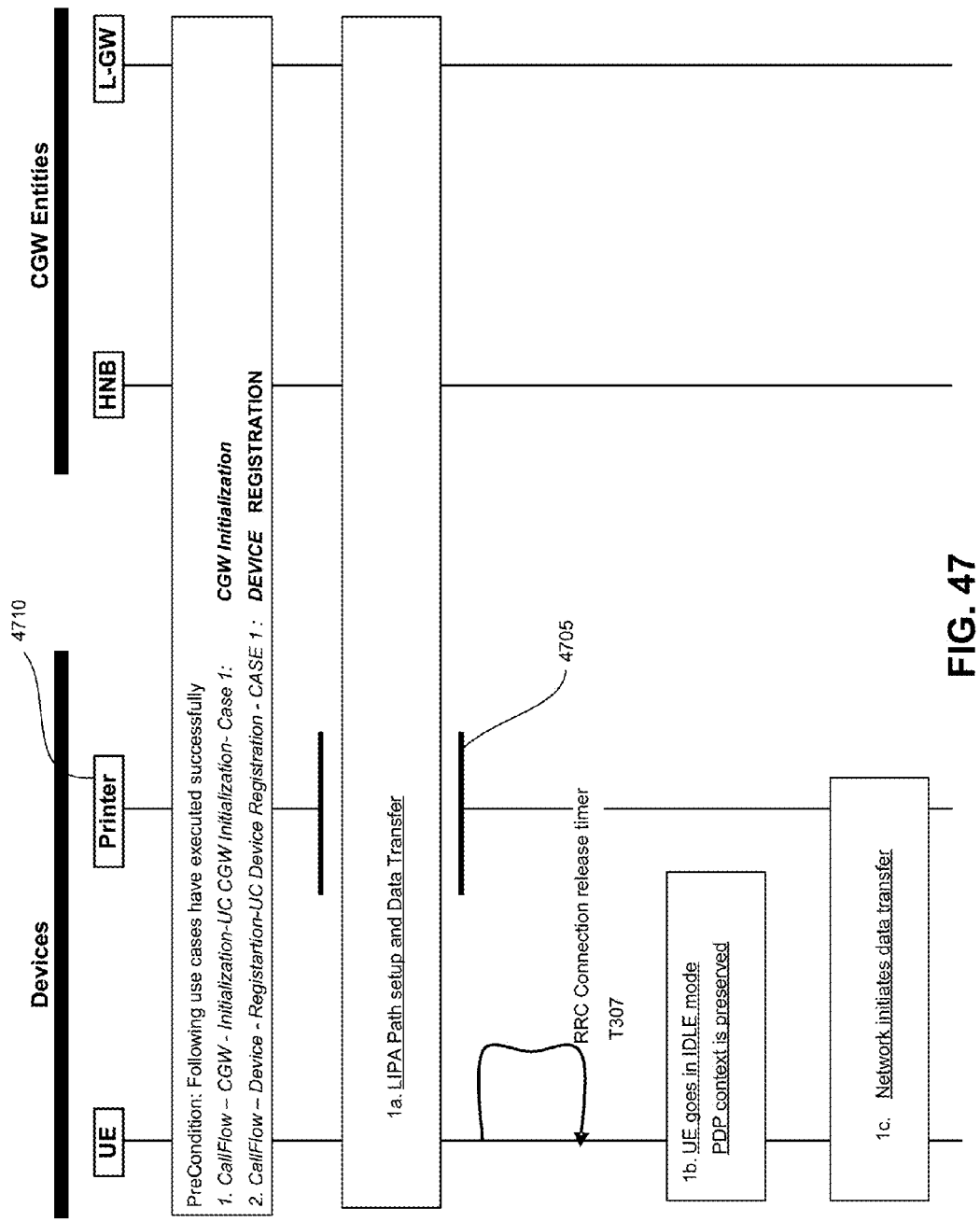
FIG. 47 is an exemplary illustration of a procedure flow for a LIPA use case.

Set forth in FIG. 47 is an exemplary procedure flow for setting up a UE LIPA path to a local IP network device (e.g., a printer) via the HNB, preservation of the LIPA PDP context as the UE transitions into idle mode (e.g., due to data inactivity), and subsequent radio bearer setup and tunnel re-establishment based on network initiated data transfer. Note, for example, that a network element may not be in the path of a message, so in FIG. 47 there is a space 4705 to indicate that, here, the printer 4710 may not be part of the particular message sequence 4715.

Figure 48:
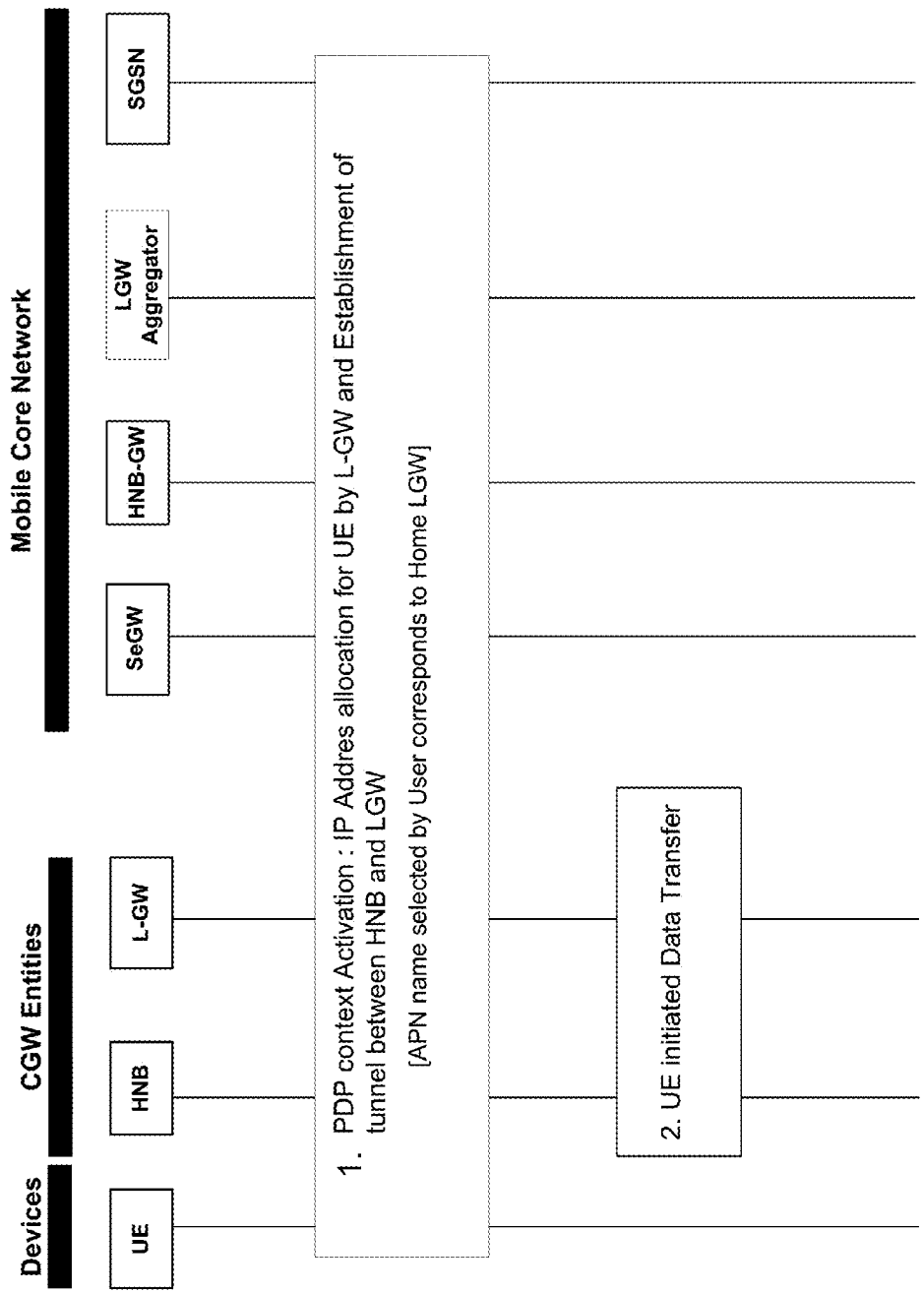
FIG. 48 is an exemplary illustration of a message sequence chart procedure flow for LIPA setup and data transfer.

In one embodiment of a LIPA use case, as shown in FIG. 48, a LIPA path for a UE may be set up so that a UE application may be able to send and receive data to/from other devices on the local IP network. This procedure may introduce an entity into the MCN, the "LGW Aggregator," which may be analogous to the HNB-GW. Recall that HNB-GW may maintain a mapping of all HNBs registered with it versus all UEs latched on to individual HNBs. The SGSN may be aware of the HNB-GW where a UE may be registered and the HNB-GW in turn may know the HNB where the UE may be latched. To deliver a packet to UE, the SGSN may resolve the address to the destination HNB-GW, and the HNB-GW subsequently may find out the HNB and may forward the packet on the resolved IP address of HNB. Extending the same architecture for LGW also, the logical function "LGW Aggregator" may be implemented as follows. The LGW Aggregator may be a logical function of the core network and may appear like a GGSN to an SGSN. During a PDP context activation procedure, an SGSN may need to determine the LGW Aggregator associated with the HNB-GW on which UE may be registered. Each LGW, as part of their initialization sequence, may register with an LGW Aggregator, similar to how HNBs may register with an HNB-GW. This way the HNB-GW and LGW Aggregator combined may have the following mapping: HNB ID—LGW ID—IMSIs of UEs latched onto given HNB. So with the mapping, the SGSN may take advantage of information from both the HNB-GW and LGW Aggregator to correlate HNB and LGW for a particular UE.

Figure 49:
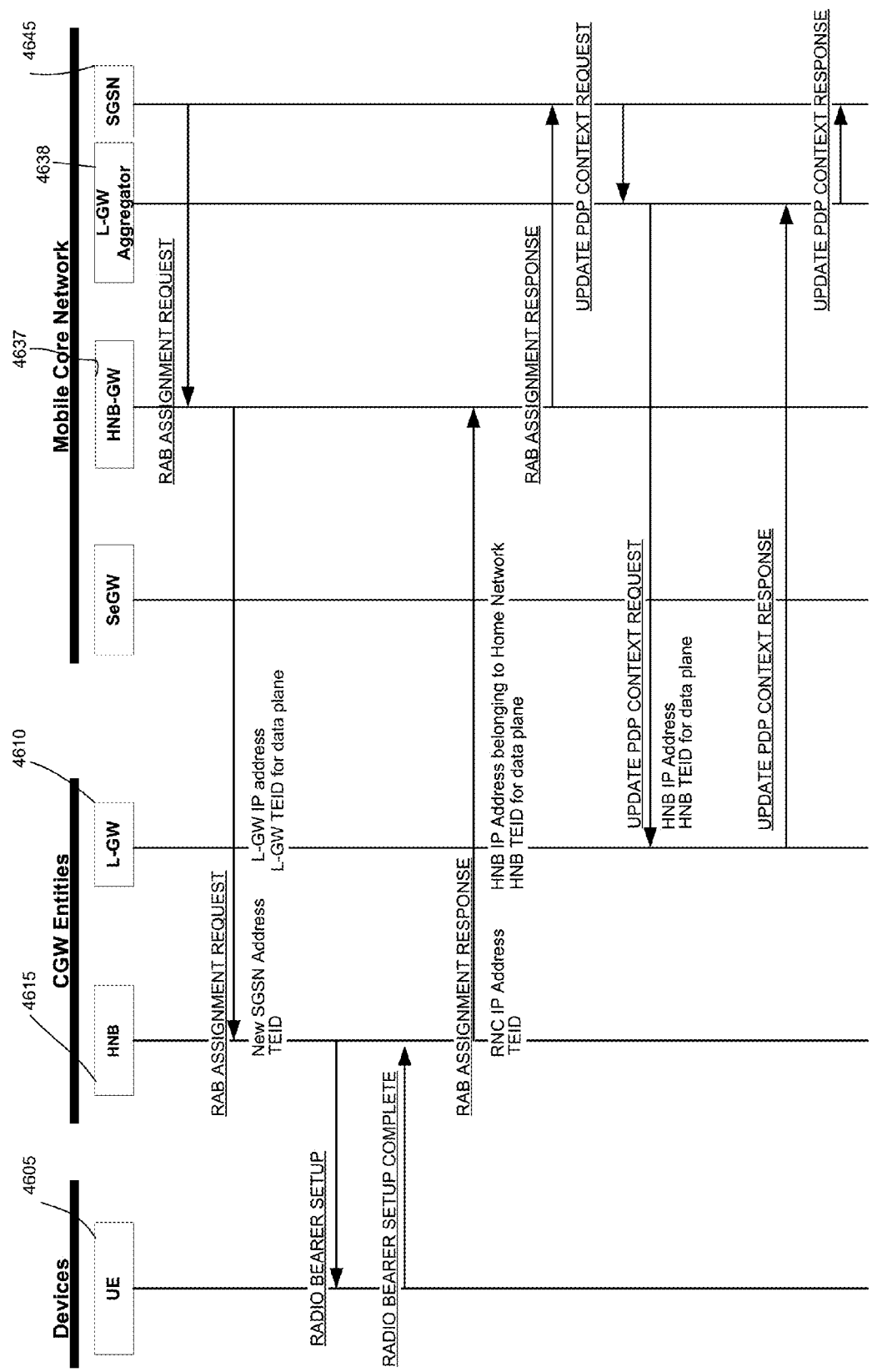
FIG. 49 is an exemplary illustration of a message sequence chart for RAB Setup using direct tunnel.

FIG. 49 illustrates an exemplary message sequence regarding the LIPA use case in FIG. 48 for RAB setup and direct tunnel user plane establishment (preferred path). In FIG. 49, it is assumed that PDP context creation between a LGW and an SGSN was successful. For example, in FIG. 49, upon the successful execution of the message sequences, the radio bearer for the data session and a direct tunnel between an HNB 4615 and an LGW 4610 may be established. For example, the SGSN 4645 may send a RAB assignment request to the HNB-GW 4637. In response to the RAB assignment request, HNB-GW 4637 may send a RAB assignment request comprising a new SGSN 4645 address (i.e., assigned LGW 4610 IP address) and an assigned tunnel endpoint ID (TEID) for the user data plane to a HNB 4615. The HNB 4615 may then setup a radio bearer with a UE 4605. A RAB assignment response may be sent from the HNB 4615 to the HNB-GW 4637.

Figure 50:
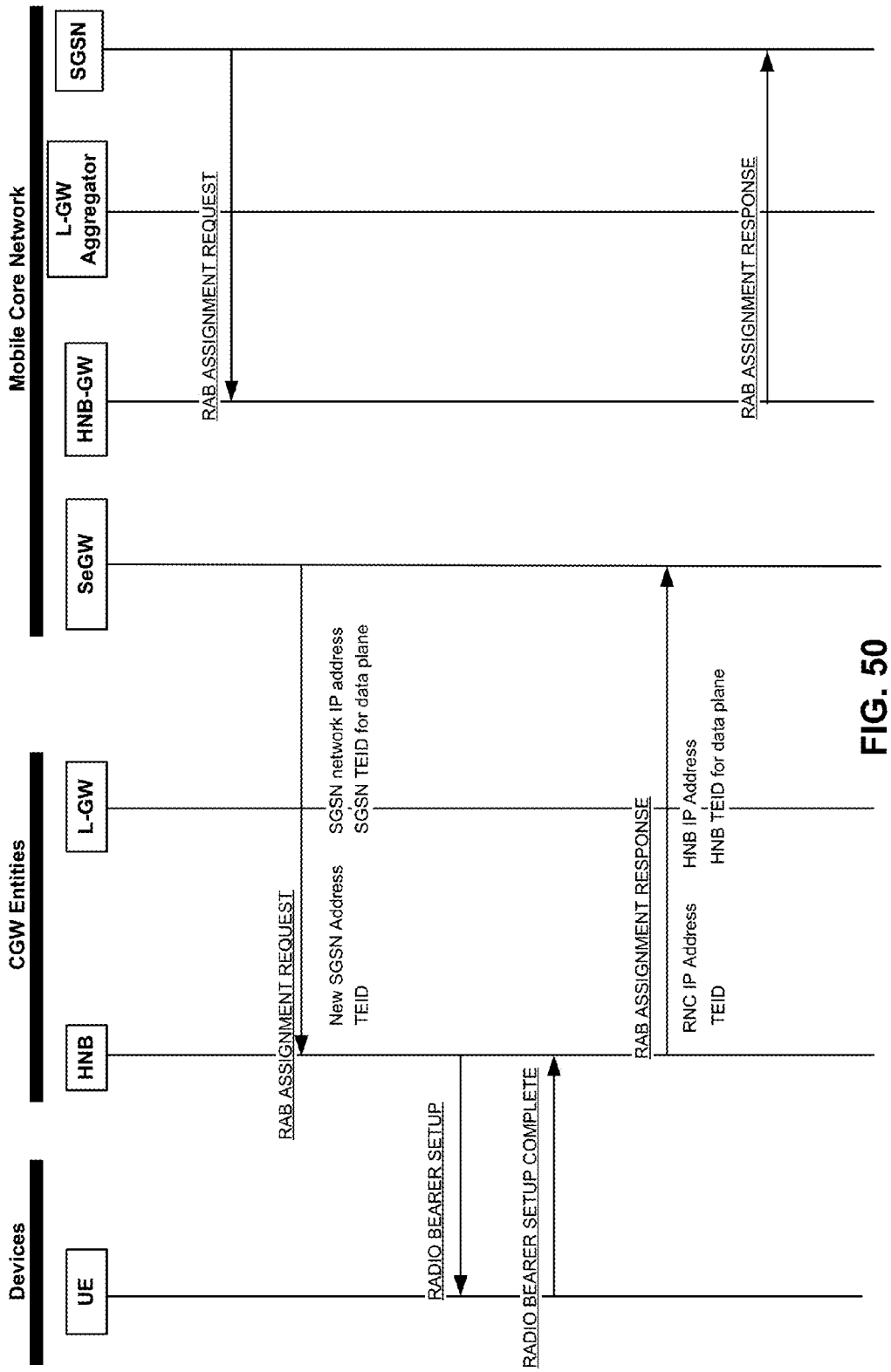
FIG. 50 is an exemplary illustration of a message sequence chart for RAB Setup using two-tunnel approach.

The RAB assignment response, as shown in FIG. 49, may comprise an assigned HNB IP address belonging to HNB's home network (i.e., RNC IP address) and an HNB TEID for user data plane. Note the user data plane (user plane) disclosed herein may be considered the data (usually not control data) sourced from a UE or similar device. The RAB assignment response may be forwarded from the HNB-GW 4637 to the SGSN 4645. SGSN 4645 may then send an update PDP context request to the LGW aggregator and the LGW aggregator may send an update PDP context request to the LGW 4610, which may comprise the HNB IP address and the HNB TEID for the user data plane. The LGW 4610 may send a acknowledgment of the update PDP context request to the LGW aggregator 4638. The LGW aggregator 4638 may send the updated context to the SGSN 4645. Note that the procedures herein may not necessarily happen in the order presented. Alternatively to the embodiment of FIG. 49, FIG. 50 illustrates an exemplary message sequence for RAB Setup and two tunnel user plane establishment.

Figure 51:
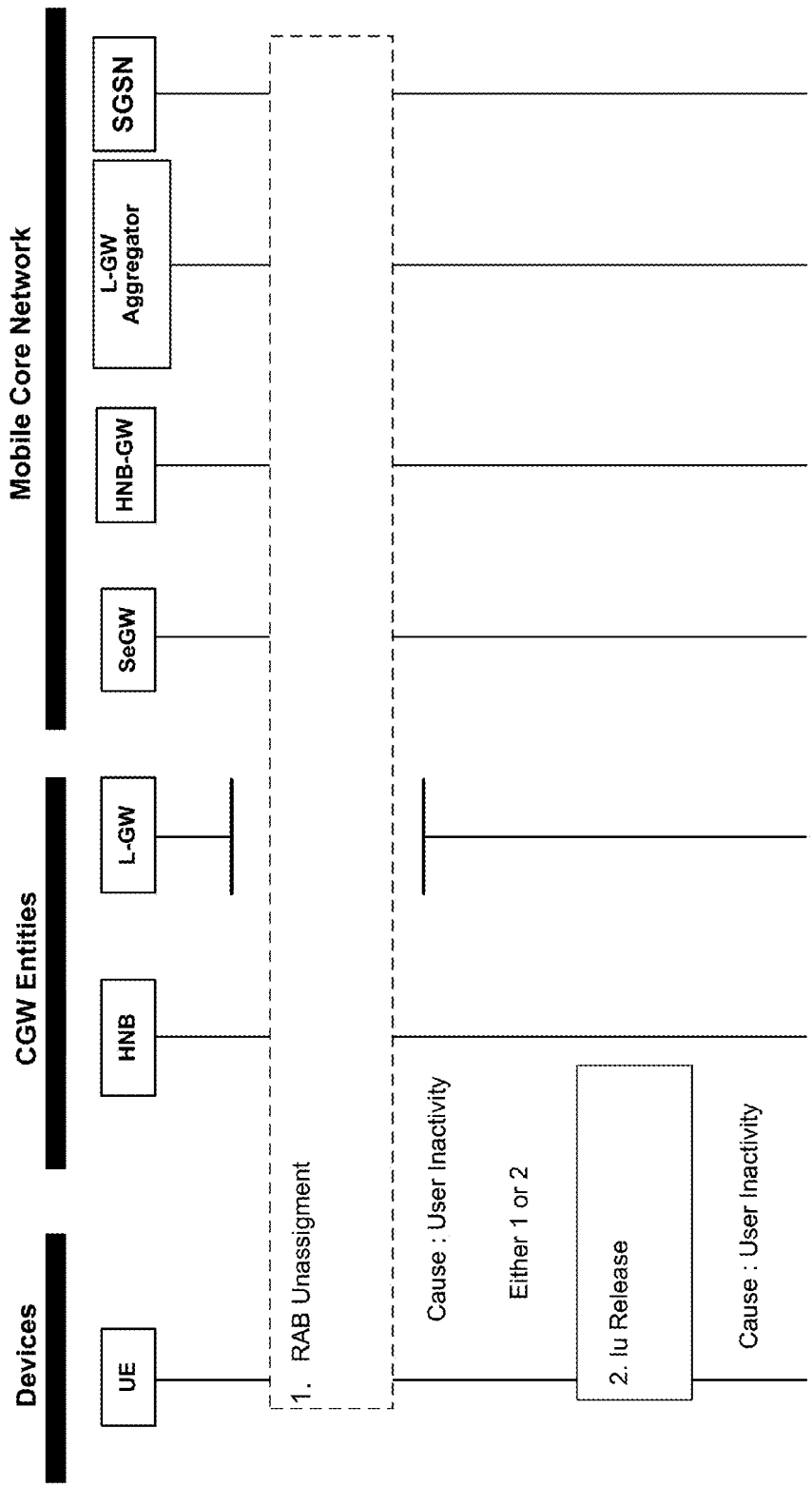
FIG. 51 is an exemplary illustration of a procedure flow for UE transition to Idle mode with PDP context preserved.
Figure 52:
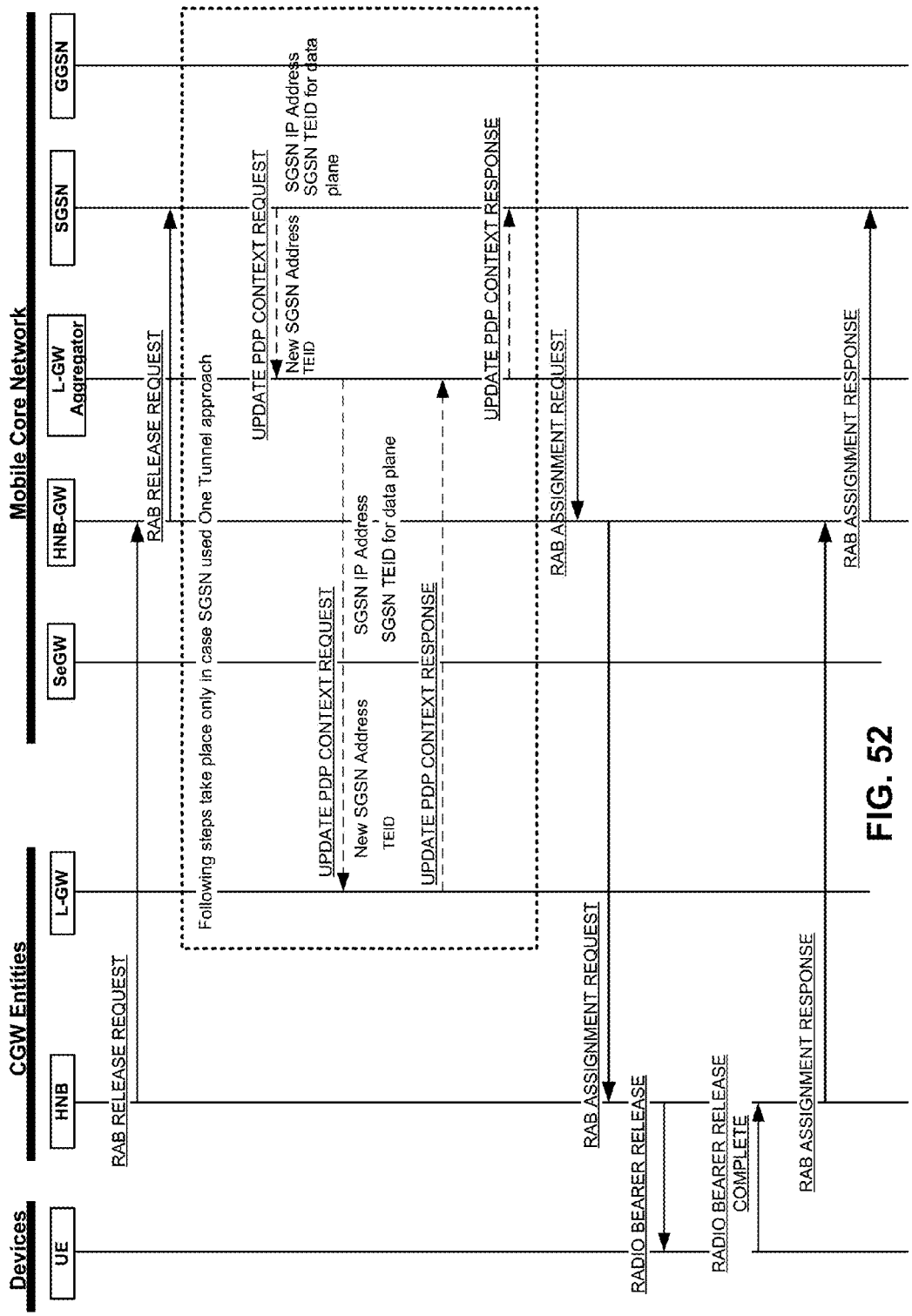
FIG. 52 is an exemplary illustration of a message sequence chart for RAB Release with PDP Context Preservation.

In an embodiment of a LIPA use case, as show in FIG. 51, an attached UE may go into IDLE mode while the PDP context may be preserved. The previously allocated RAB for this data session may be released while the PDP context is preserved. The direct tunnel between the LGW and the HNB may be released and a tunnel between the LGW and the SGSN may be established. If no data exchange takes place on the RAB assigned for the session for the duration of RRC timer T307, the radio bearer may be released, but the PDP context and hence the IP address allocated to UE is preserved. FIG. 52 illustrates a more detailed exemplary message sequence for RAB Release and PDP Context Preservation LIPA use case as discussed in FIG. 51.

Figure 53:
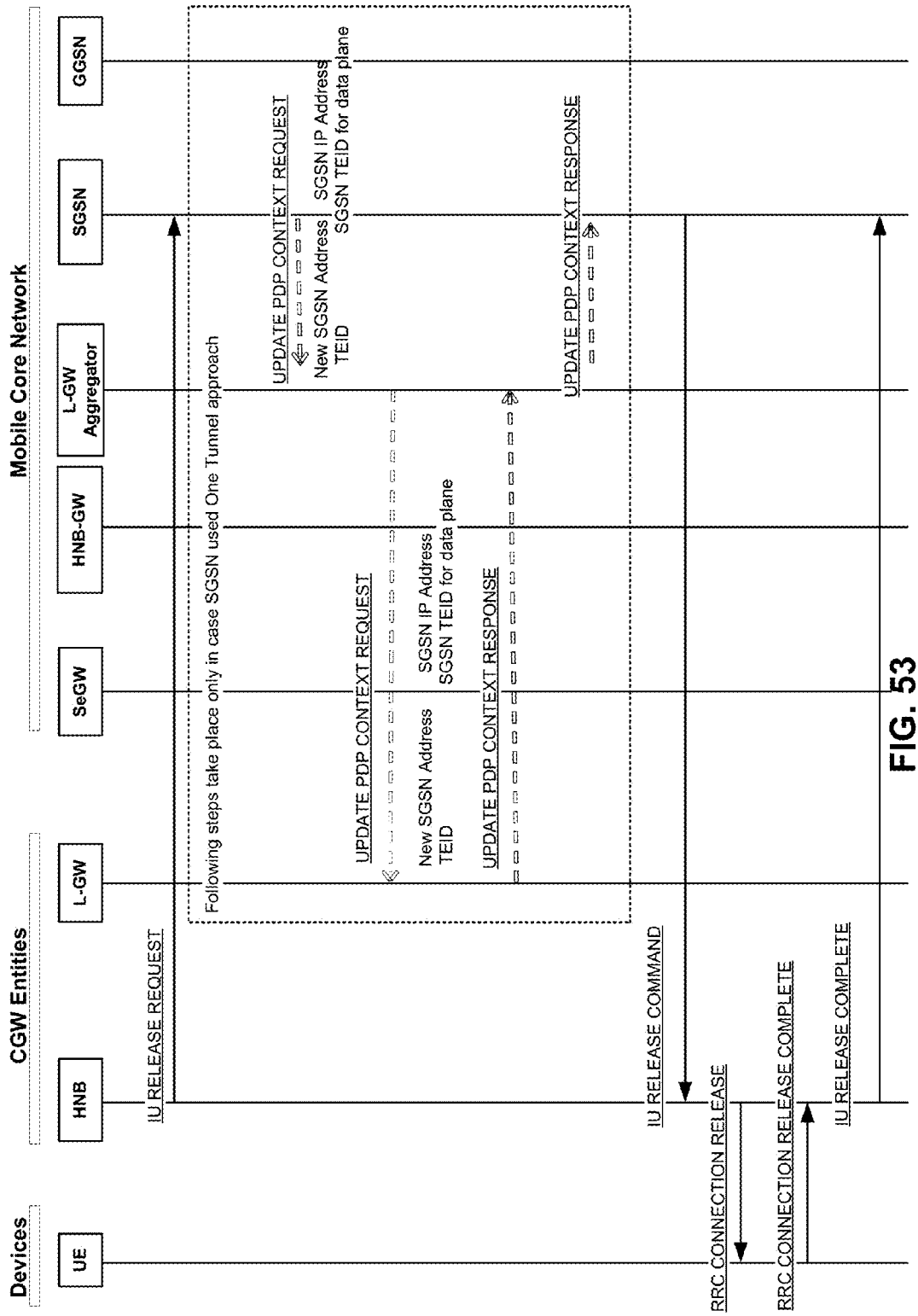
FIG. 53 is an exemplary illustration of a message sequence chart for Iu Release with PDP Context Preservation.

Alternatively, as shown in FIG. 51, if there is no activity on any of the RABs, then the Iu release procedure may take place. FIG. 53 illustrates a more detailed exemplary message sequence for Iu Release and PDP Context Preservation LIPA use case as discussed in FIG. 51. In this embodiment, a User Plane GTP tunnel end point at an LGW may be modified to point to an SGSN instead of an HNB.

Figure 54:
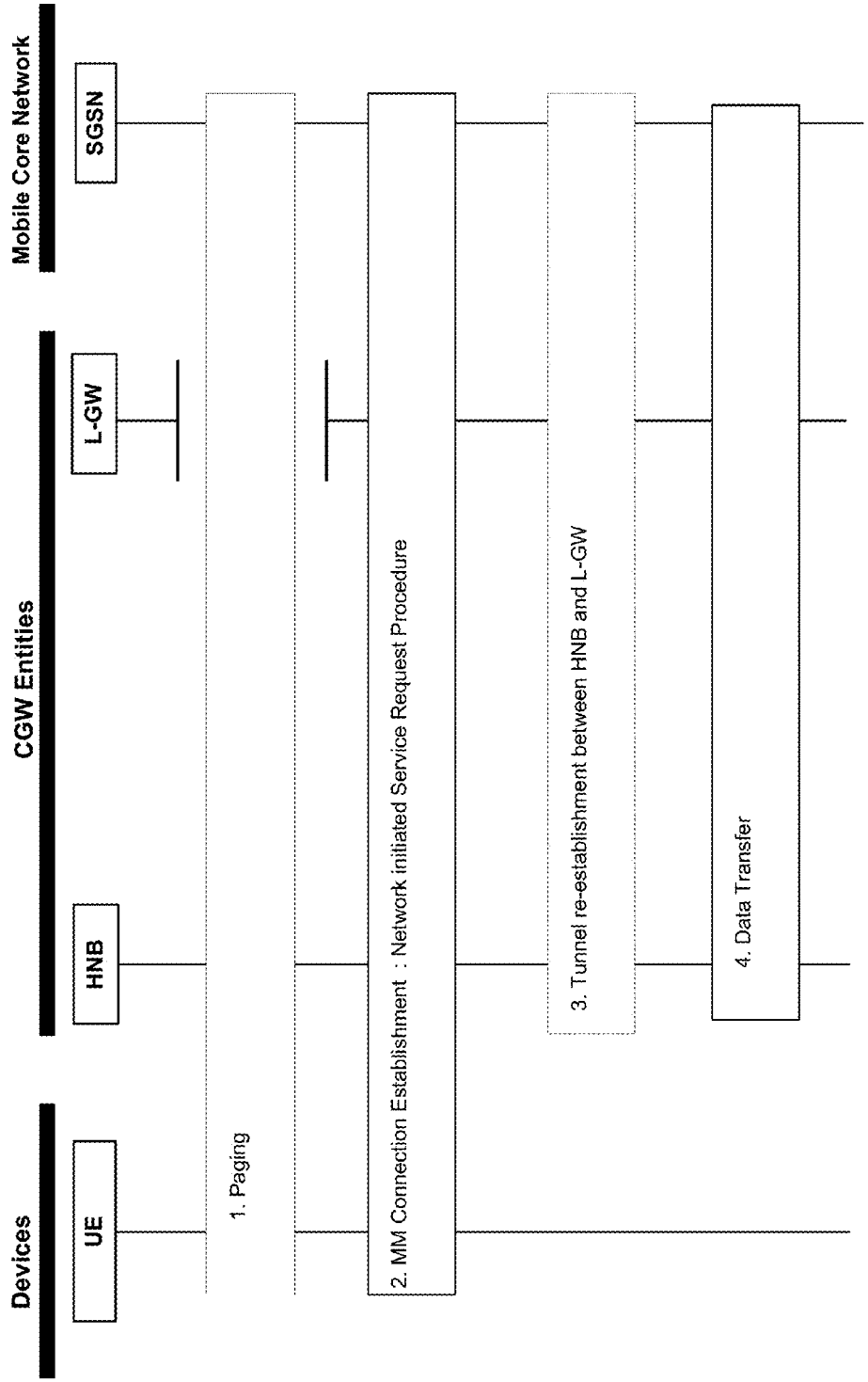
FIG. 54 is an exemplary illustration an Idle UE previously attached to HNB Network/home device initiates data transfer.

FIG. 54 shows an embodiment of a LIPA use case. In FIG. 54 a network or home device may initiate a data transfer for an idle UE that was previously attached to an HNB. For example, on receiving data for a preserved PDP context, the SGSN may initiate a paging procedure.

Figure 55:
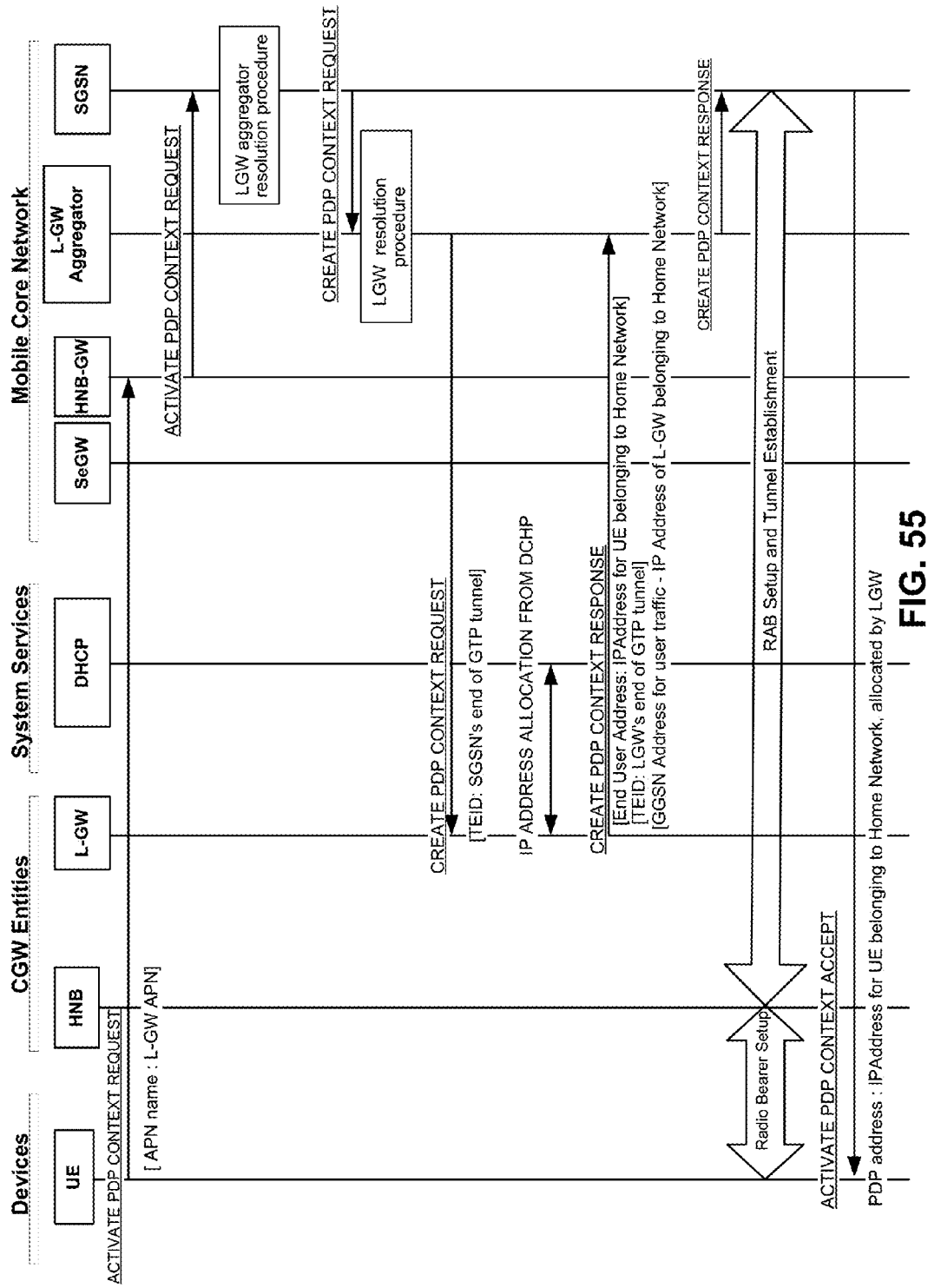
FIG. 55 is an exemplary illustration of a message sequence chart of PDP Context Activation for LIPA.

An exemplary embodiment of PDP Context Activation for LIPA is illustrated in FIG. 55. In such an embodiment, a UE may send the APN name corresponding to the LGW to which it wants to connect. The APN name may be assigned to a LGW by using two generic APN names defined for the LGW. A UE may select the 'Home LGW' APN to connect to the UE's designated home network. This may be applicable for both LIPA and ELIPA. A UE may select the 'Guest LGW' APN when the user is latched on to a neighbor's HNB and wishes to connect to a neighbor's home network. A LGW may have a uniquely resolvable APN name. In one embodiment, the schema of the name may be <LGW-identifier>@<FQDN of associated LGW Aggregator>.

Figure 56:
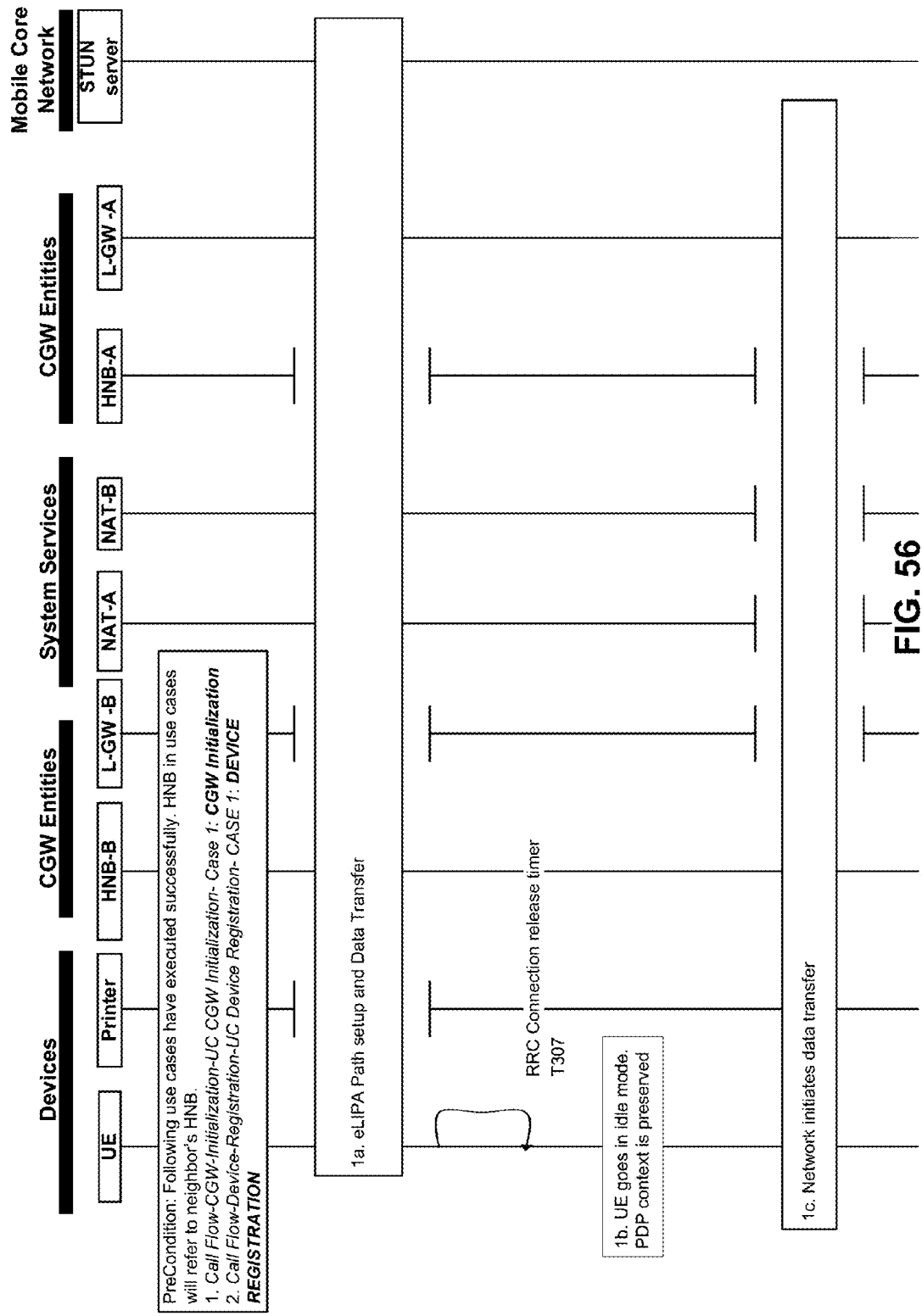
FIG. 56 is an exemplary illustration of a procedure for an ELIPA use case.

FIG. 56 illustrates an exemplary procedure flow for the following: 1) setting up a UE ELIPA path to the UE home IP network device via a remote HNB; 2) preservation of the ELIPA PDP context as the UE transitions into idle mode (e.g., due to data inactivity); and 3) subsequent radio bearer setup and tunnel re-establishment based on network initiated data transfer.

Figure 57:
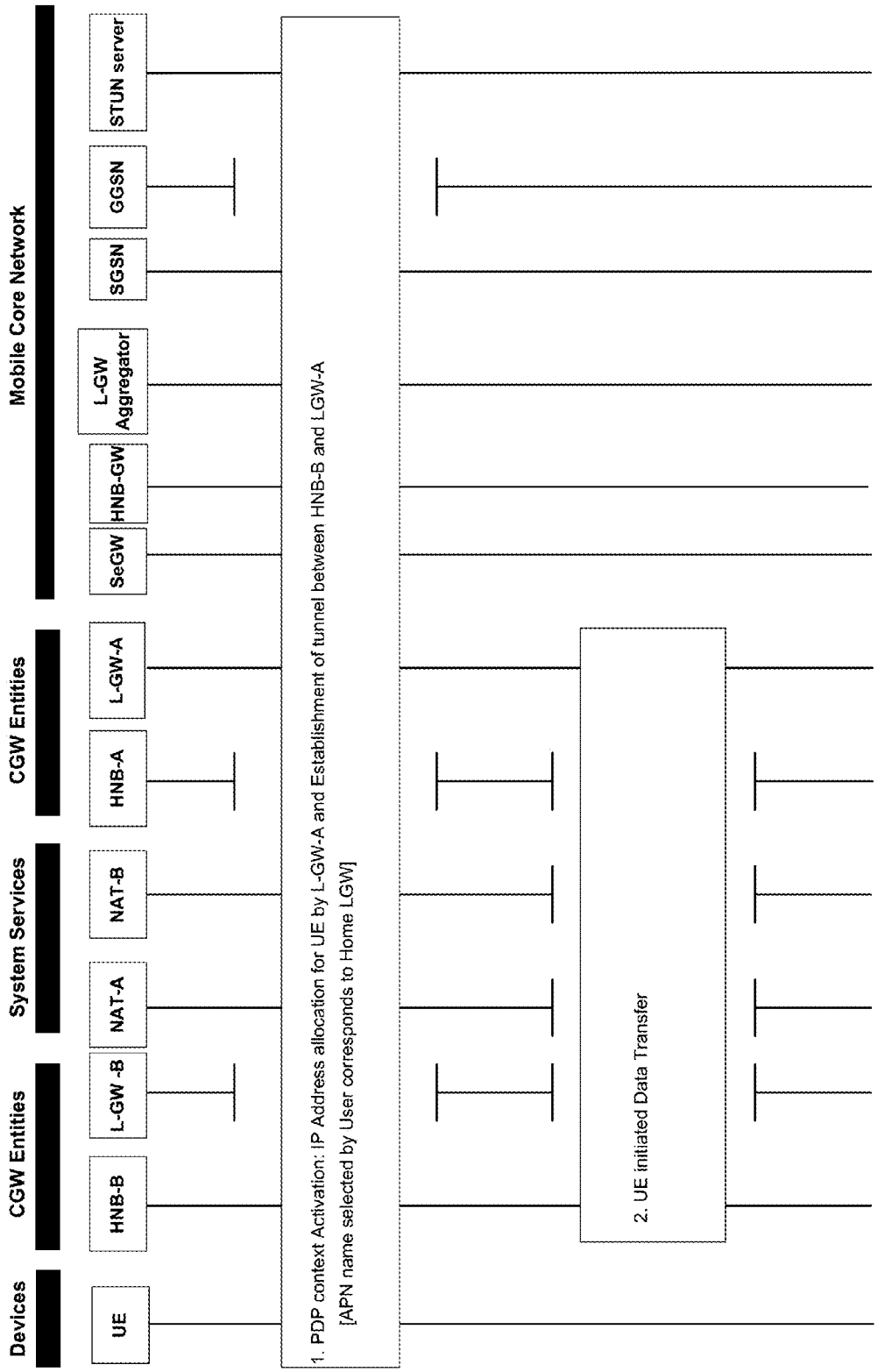
FIG. 57 is an exemplary illustration of a procedure flow for ELIPA setup and data transfer.

An exemplary embodiment of an ELIPA path setup and data transfer high-level procedure flow is illustrated in FIG. 57. On successful execution of this procedure flow, the data path for the UE is set up and an application residing on UE may be able to send and receive data to/from other devices on the home network. In this embodiment, session traversal utilities for NAT (STUN) clients and servers may be used as mechanisms for retrieving a NATed device's public IP address. STUN clients and servers (and devices with similar capabilities) may also be used to support ELIPA capabilities in the procedures described herein. A publicly hosted STUN server may be used, and/or the core network may host a STUN server. A STUN server may be needed to establish a Direct Tunnel between an LGW and a remote HNB, bypassing the core network altogether. In embodiments where traffic is routed via a core network's SeGW, a STUN like server may not be needed.

Figure 58:
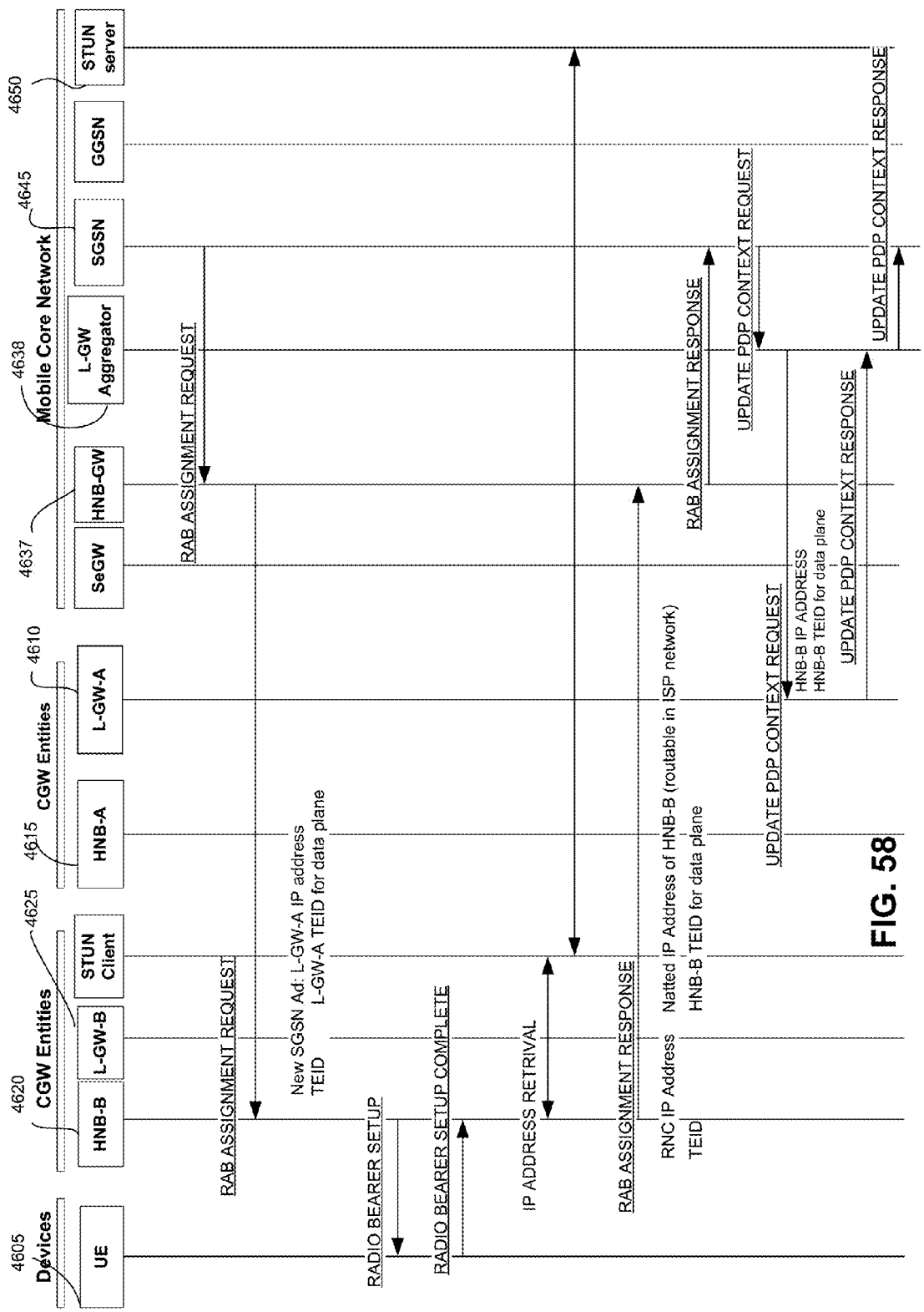
FIG. 58 is an exemplary illustration of a message sequence chart for RAB Setup using direct tunnel.

FIG. 58 illustrates an exemplary message sequence regarding the ELIPA use case in FIG. 57 for RAB setup and Direct Tunnel user plane establishment (preferred path), bypassing the MCN. For the embodiment in FIG. 58, upon successful execution of the message sequences, the radio bearer for a data session may be established and a direct tunnel between HNB-B 4620 and LGW-A 4610 may be established, which creates a path for the UE 4605 to a UE home IP network device 4601 via the remote HNB-B 4620. For example, the SGSN 4645 may send a RAB assignment request to the HNB-GW 4637. In response to the RAB assignment request, HNB-GW 4637 may send a RAB assignment request comprising a new SGSN address (i.e., an assigned LGW-A 4610 IP address) and an assigned LGW-A 4610 tunnel endpoint ID (TEID) for the user data plane to a HNB-B 4620. The HNB-B 4620 may then setup a radio bearer with a UE 4605. The HNB-B 4620 may retrieve IP addresses routable in the ISP network from the STUN server 4650 via the STUN client 4651. The STUN client may be a separate entity in the CGW. The double arrows regarding IP address retrieval, as shown FIG. 58 and other figures herein, are meant to show execution of basic procedures as opposed to individual messages.

A RAB assignment response, as shown in FIG. 58, may be sent from the HNB-B 4620 to the HNB-GW 4637. The RAB assignment response may comprise an assigned Natted IP address of HNB-B which routable in ISP network (RNC IP address) and an HNB TEID for user data plane. Again, note the user data plane (user plane) disclosed herein may be considered the data (usually not control data) sourced from a UE or similar device. The RAB assignment response may be forwarded from the HNB-GW 4637 to the SGSN 4645. SGSN 4645 may then send an update PDP context request to the LGW aggregator 4638 and the LGW aggregator 4638 may send an update PDP context request to the LGW-A 4610, which may comprise the HNB IP address and the HNB TEID for the user data plane. The LGW-A 4610 may send a acknowledgment of the update PDP context request to the LGW aggregator 4638. The LGW aggregator 4638 may send the updated context to the SGSN 4645. Note that the procedures herein may not necessarily happen in the order presented.

Figure 59:
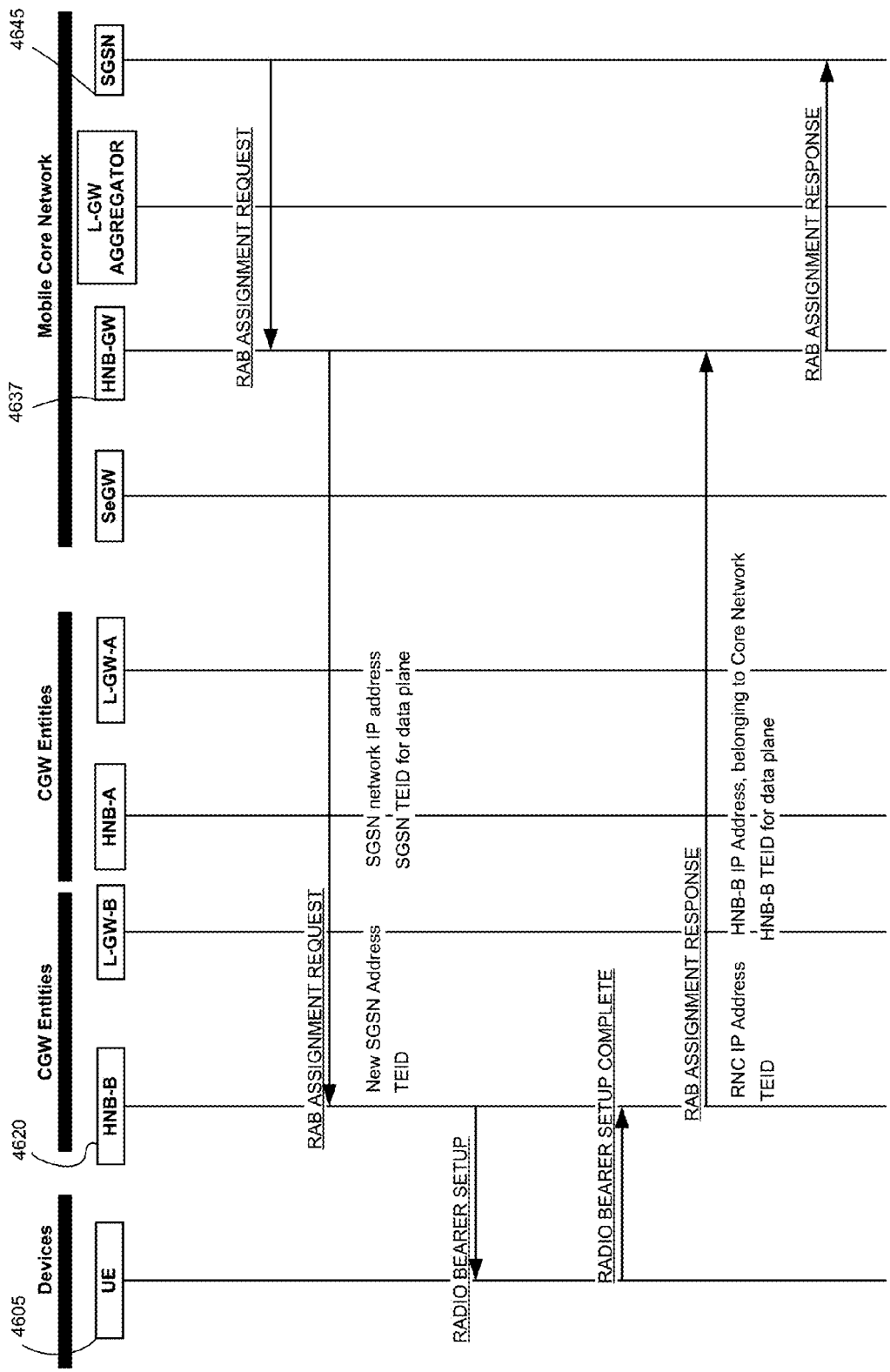
FIG. 59 is an exemplary illustration of a message sequence chart for RAB Setup using two-tunnel approach.

Alternative to the embodiment of FIG. 58, FIG. 59 illustrates an exemplary message sequence for RAB Setup and Two Tunnel user plane establishment. For example, the SGSN 4645 may send a RAB assignment request to the HNB-GW 4637. In response to the RAB assignment request, HNB-GW 4637 may send a RAB assignment request comprising a new SGSN address (an assigned SGSN 4645 network IP address) and an assigned SGSN 4645 TEID for the user data plane to a HNB-B 4620. The HNB-B 4620 may then setup a RAB with a UE 4605. A RAB assignment response may be sent from the HNB-B 4620 to the HNB-GW 4637. The RAB assignment response may comprise an assigned HNB-B 4620 IP address belonging to the core network (RNC IP address) and an HNB TEID for user data plane. The RAB assignment response may be forwarded from the HNB-GW 4637 to the SGSN 4645.

Figure 60:
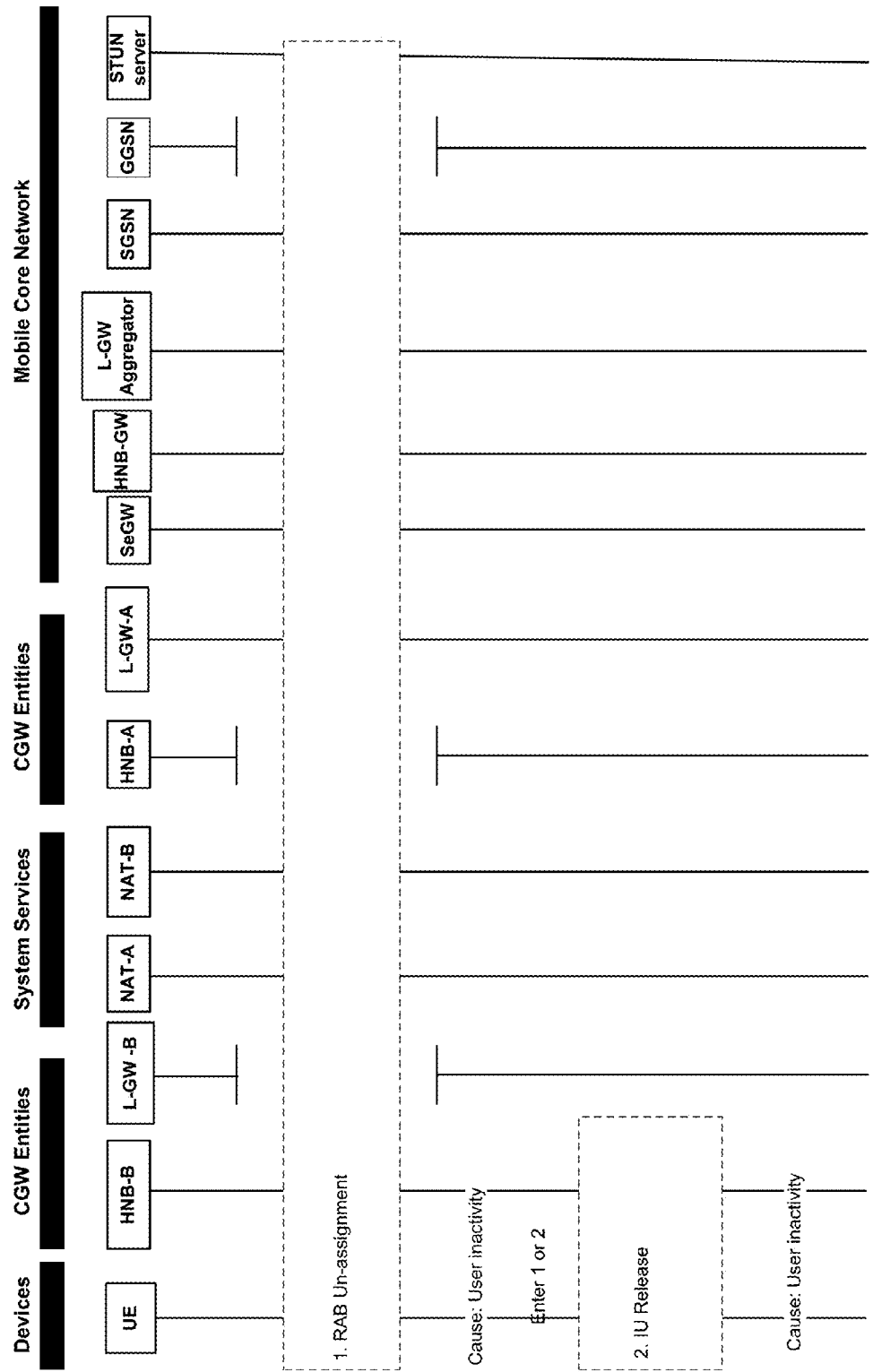
FIG. 60 is an exemplary illustration of a procedure flow for UE transition to Idle mode with PDP context preserved.

FIG. 60 illustrates an exemplary embodiment of a high-level procedure flow used to preserve PDP context when a user transitions into IDLE state may be preserved. The previously allocated RAB for this data session may be released while the PDP context is preserved. The tunnel between HNB-B and LGW-A may be released and a tunnel between LGW-A and an SGSN may be established.

Figure 61:
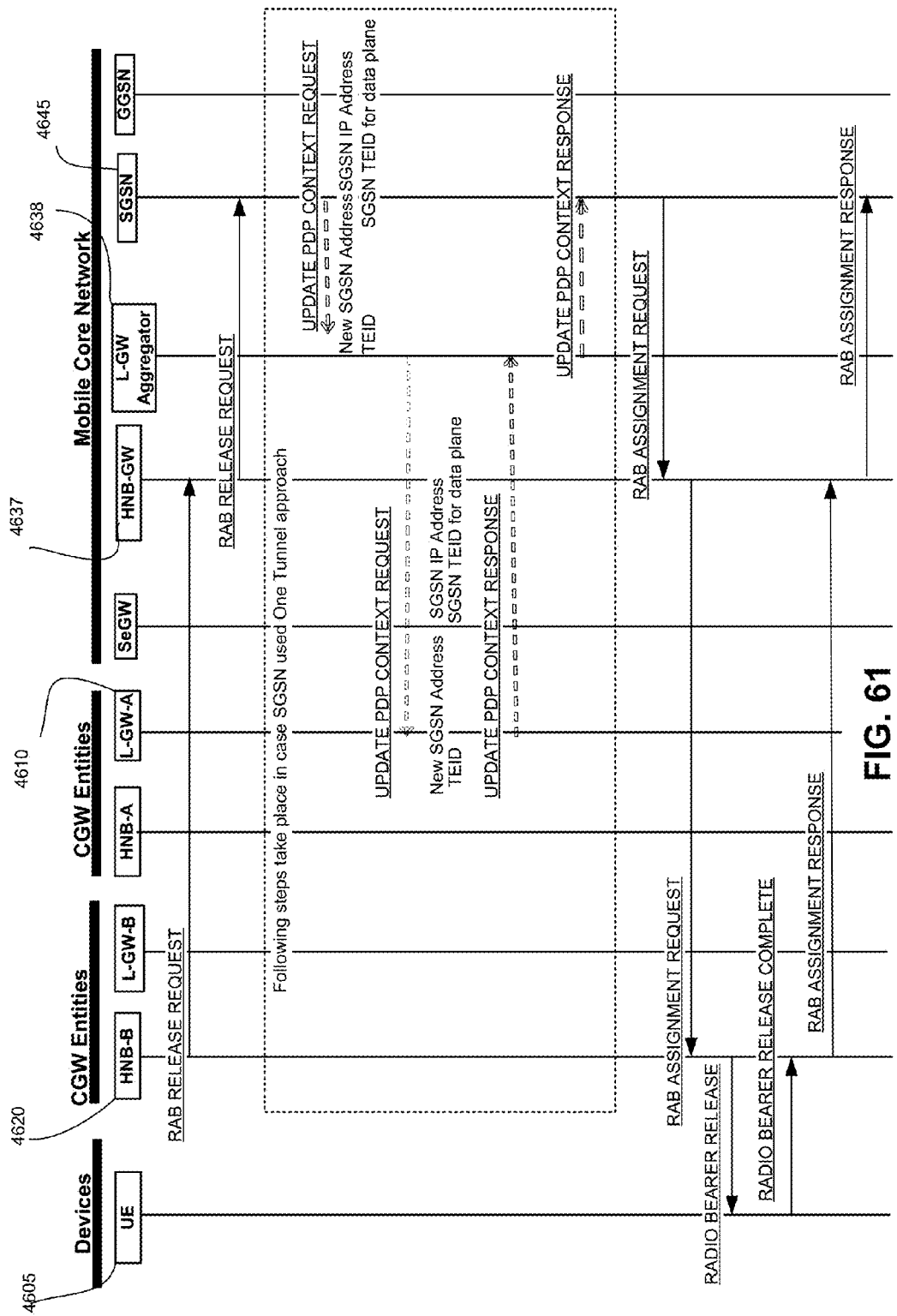
FIG. 61 is an exemplary illustration of a message sequence chart for RAB Release with PDP Context Preservation.

FIG. 61 illustrates an exemplary message sequence regarding the ELIPA use case in FIG. 60 for RAB release and PDP context preservation. In this embodiment, the user plane GTP tunnel end point at the LGW-A 4610 may be modified to point to SGSN 4645 instead of HNB-B 4620. For example, the HNB-B 4620 may send a release request to HNB-GW 4637 and the HNB-GW 4637 may forward this request to the SGSN 4645. A RAB assignment request may be sent to the HNB-GW 4637 from the SGSN 4645. The HNB-GW may send the RAB assignment request to the HBN-B 4620. The HNB-B 4620 may then negotiate a radio bearer release with the UE 4605. The HNB-B then may send a RAB assignment response to the HNB-GW 4637 wherein the HNB-GW 4637 then forwards the response to the SGSN 4645 informing of the completed radio bearer release. As shown in FIG. 61, if the SGSN 4645 used a one tunnel approach then the following may occur. The SGSN 4645 may send an update PDP context request to the LGW aggregator 4638, wherein the PDP context request may comprise an SGSN 4645 IP address (new SGSN address) and an SGSN 4645 TEID for the user data plane. The LGW Aggregator 4638 may send the update PDP context request to a LGW-A 4610. The LGW-A 4610 may send an update PDP context response to the LGW aggregator 4638 which may forward the update PDP context response to the SGSN 4645.

Figure 62:
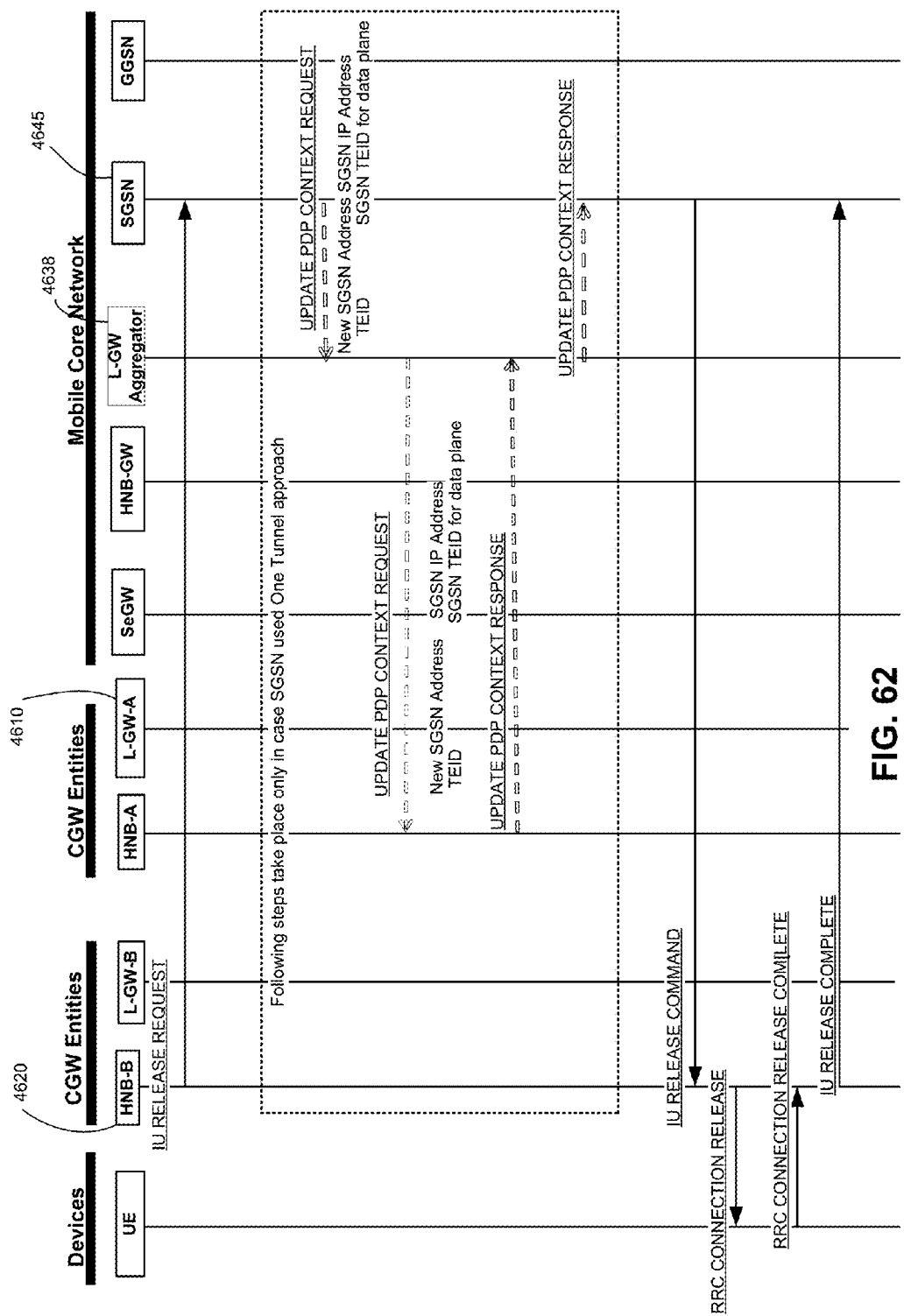
FIG. 62 is an exemplary illustration of a message sequence chart for Iu Release with PDP Context Preservation.

FIG. 62 illustrates an exemplary message sequence regarding the ELIPA use case in FIG. 60 for Iu release and PDP context preservation. In this embodiment, the user plane GTP tunnel end point at a L-GW may be modified to point to an SGSN instead of an HNB. For example, the HNB-B 4620 may send an Iu release request to the SGSN 4645. The SGSN 4645 may then send a Iu release command to the HNB-B 4620. The HNB-B 4620 then may negotiate an RRC release connection with a UE 4605. The HNB-B may send an Iu release complete message to the SGSN 4645. As shown in FIG. 62, if the SGSN 4645 used a one tunnel approach then the following may occur. The SGSN 4645 may send an update PDP context request to the LGW aggregator 4638, wherein the PDP context request may comprise an SGSN 4645 IP address (new SGSN address) and an SGSN 4645 TEID for the user data plane. The LGW Aggregator 4638 may send the update PDP context request to a LGW-A 4610. The LGW-A 4610 may send an update PDP context response to the LGW aggregator 4638 which may forward the update PDP context response to the SGSN 4645.

Figure 63:
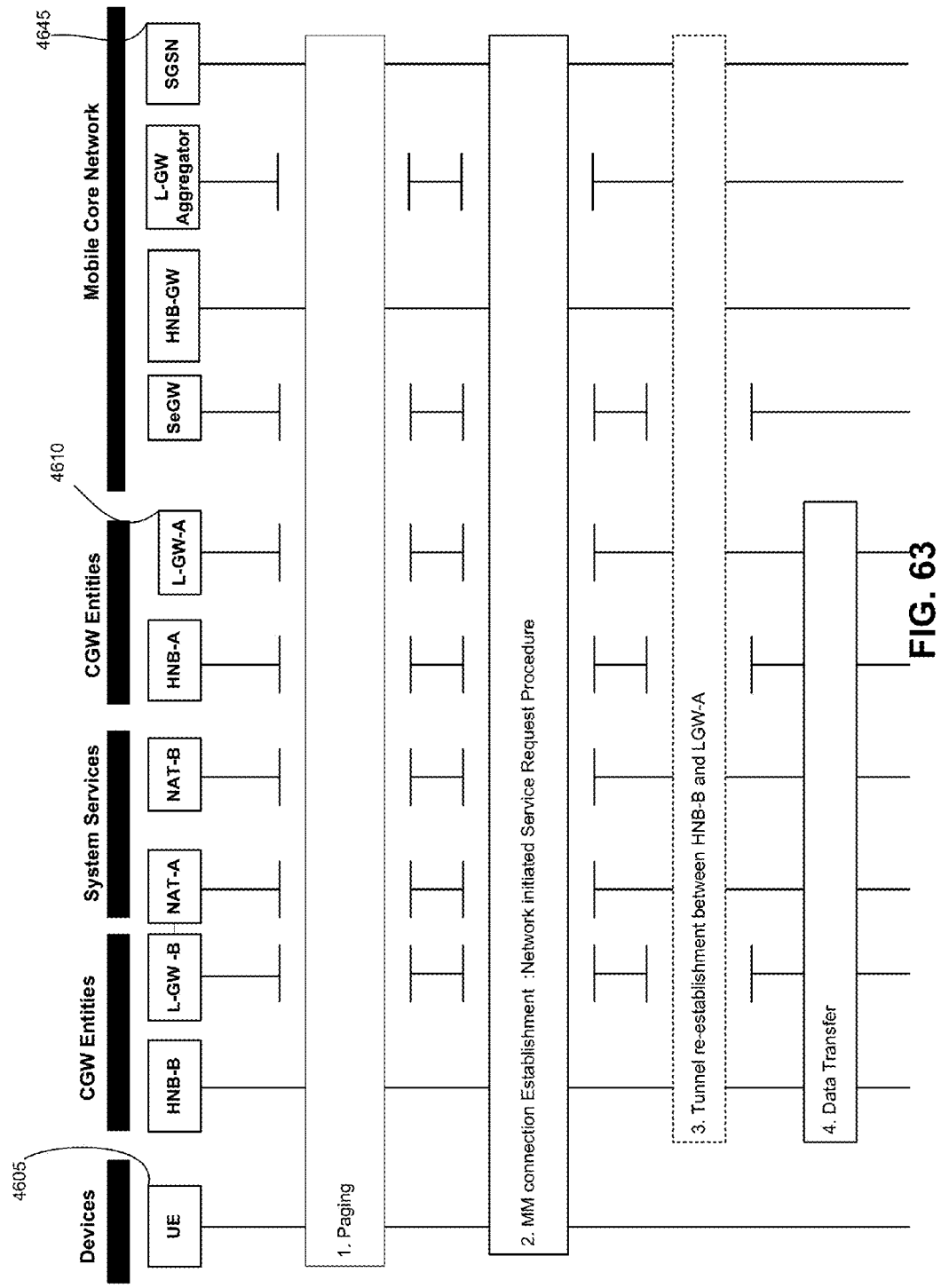
FIG. 63 is an exemplary illustration of message sequence chart of an idle UE, in which an IDLE UE previously attached to HNB Network/home device initiates data transfer.

Note herein, a reason a tunnel endpoint may be moved from HNB to SGSN may be in case where one of the local devices in the home local area network (LAN) wants to reach a UE after the connection is released. Although the UE connection may be released as mentioned above regarding FIG. 34 and FIG. 35, for example, the PDP context may be preserved so the UE may still be reachable by a home LAN device, but the initiation of the data transfer from the local device through a LGW to a SGSN may trigger the SGSN to page the UE which may wake it up and re-establish the connection using either a one-tunnel or two-tunnel approach FIG. 63 illustrates an exemplary high-level procedure flow used in an embodiment where a network initiates a data transfer to a UE 4605 that was attached to its home LGW (LGW-A 4610) previously. On receiving data for a preserved PDP context, the SGSN 4645 may initiate a paging procedure. In this embodiment, upon execution of the procedure flow of FIG. 63, a radio bearer may be allocated for a data session, a tunnel between LGW-A 4610 and an SGSN 4645 may be released, and a new tunnel between LGW-A 4610 and HNB-B 4620 may be established.

Figure 64:
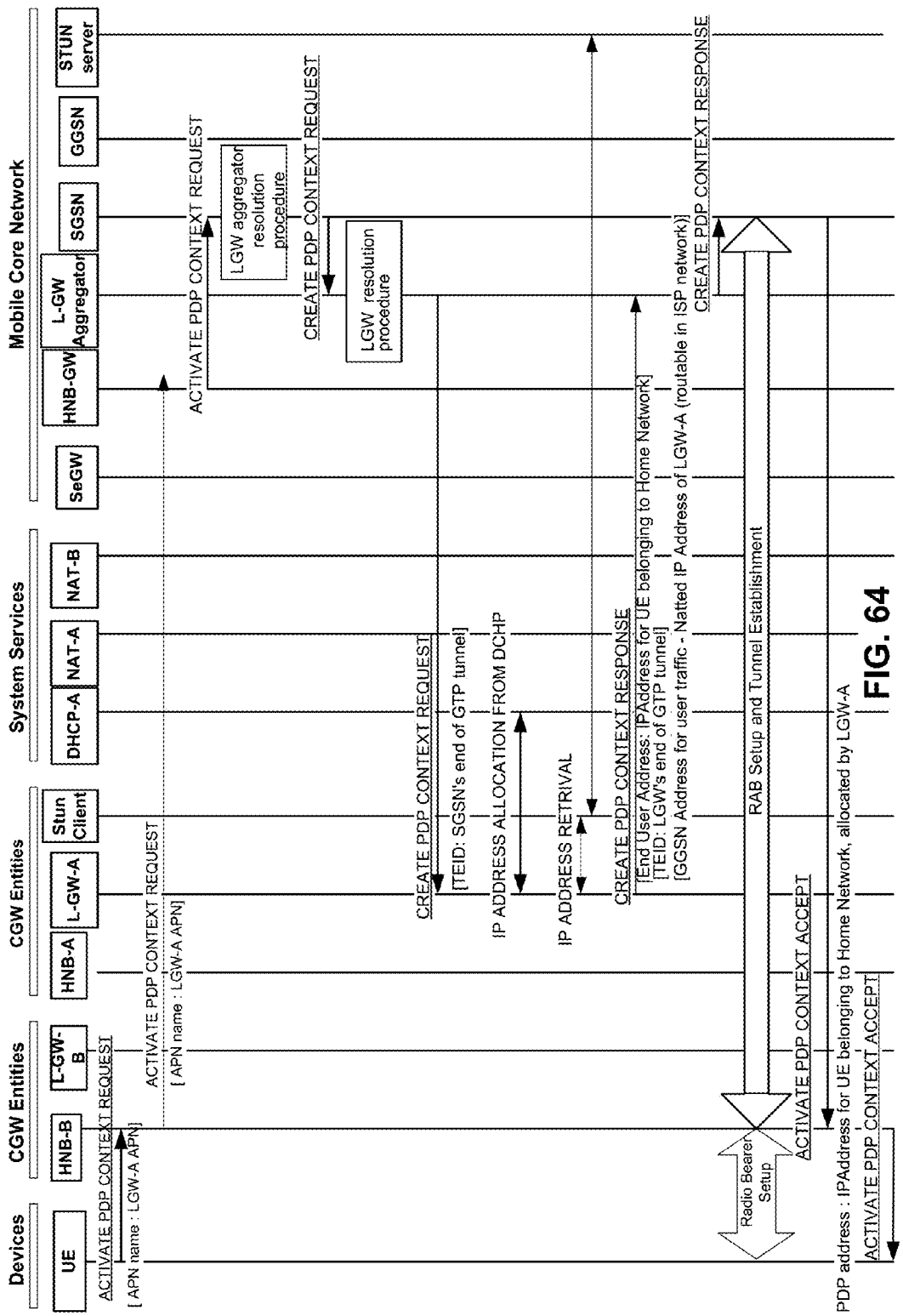
FIG. 64 is an exemplary illustration of a message sequence chart for a PDP Context Activation for ELIPA.

FIG. 64 illustrates an exemplary message sequence for PDP context creation for ELIPA. In this embodiment, a UE may transmit the APN name corresponding to a home L-GW. The APN name may be assigned to the L-GW by using generic APN names. For example, a user may select a 'Home LGW' APN when it wishes to connect to the user's home network. This may be applicable for both, LIPA and ELIPA.

A user also may select a 'Guest LGW' APN when the user is latched on to a neighbor's HNB and wishes to connect to the neighbor's home network. Each LGW may have a uniquely resolvable APN name. The APN name may be constructed using the following schema: <LGW-identifier>@<FQDN of associated LGW Aggregator>.

In the embodiment illustrated in FIG. 64, a local IP address for the UE may be allocated by LGW-A from a Local DHCP. L-GW-A may also retrieve its own user plane IP address as seen by the external STUN server. The CGW application may initiate a request towards the STUN server to retrieve the IP address. This IP address may be used to set up a tunnel between HNB-B and L-GW-A.

Figure 65:
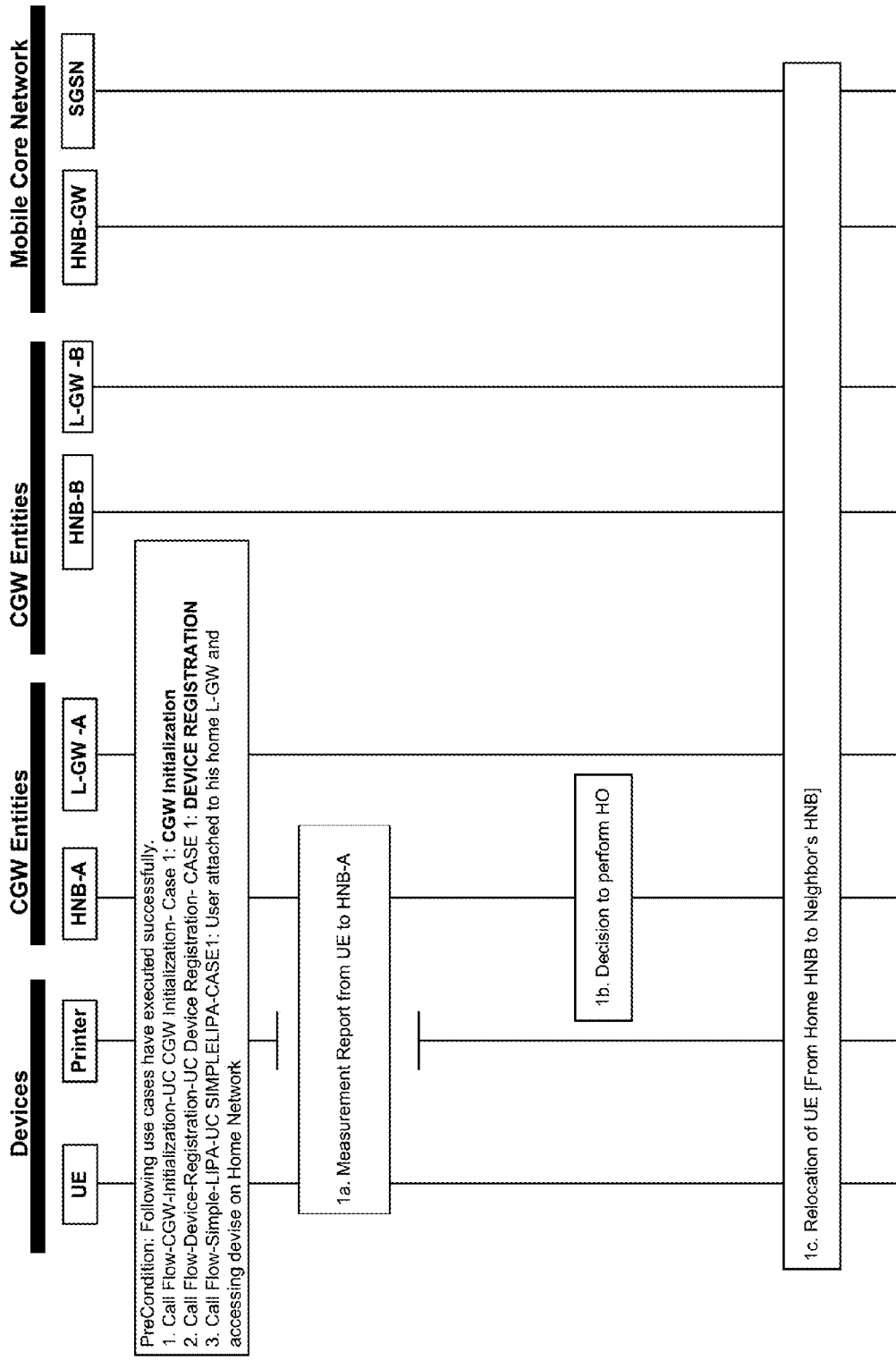
FIG. 65 is an exemplary illustration of a procedure for LIPA to ELIPA mobility.

FIG. 65 illustrates an exemplary, a high-level procedure flow for relocation of a UE session from the UE home HNB to a neighbor's HNB, with both HNBs under the same HNB-GW. FIG. 65 illustrates a non-limiting exemplary high-level procedure fore LIPA to ELIPA mobility.

Figure 66A:
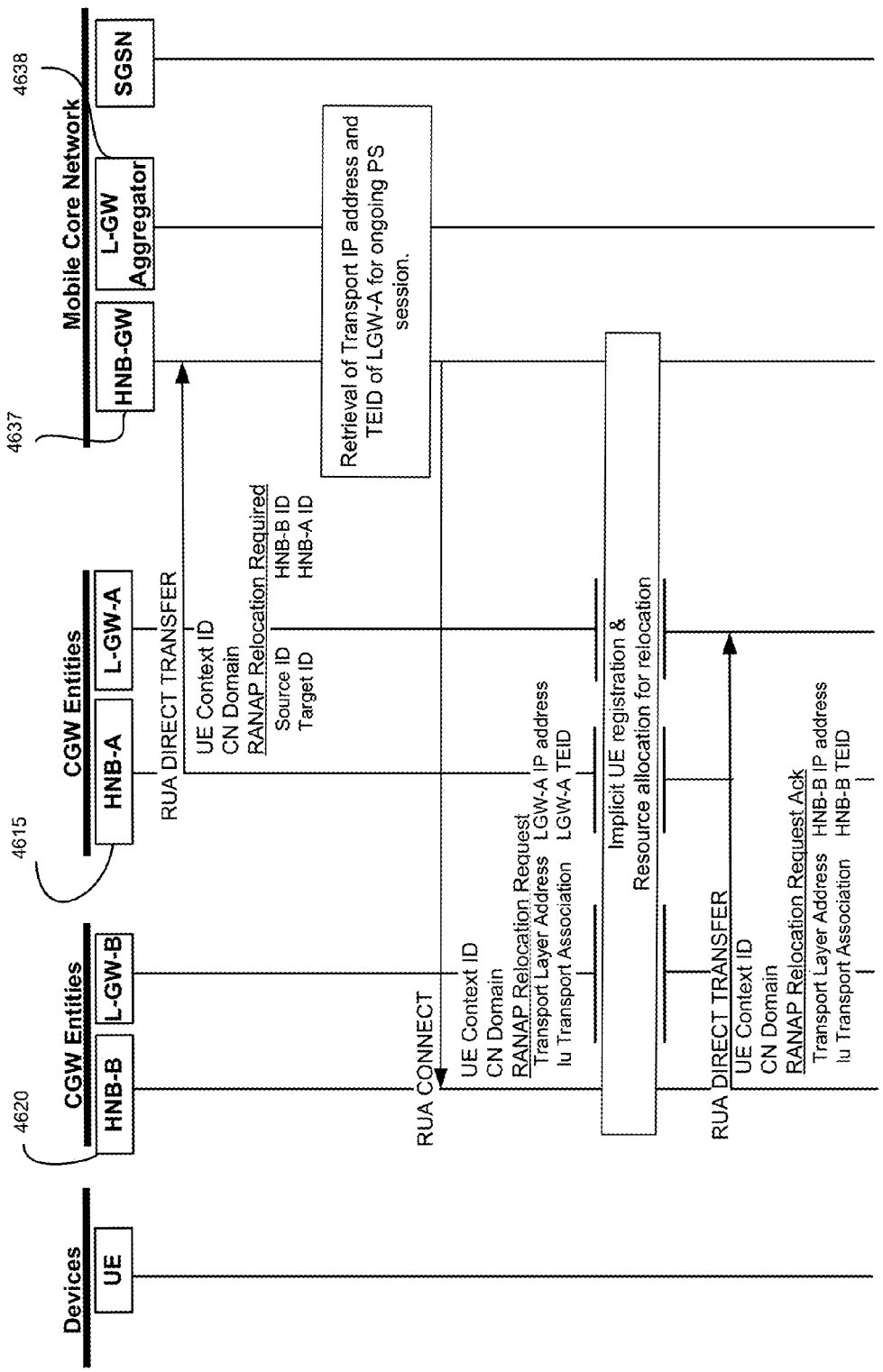
FIG. 66A is an exemplary illustration of a message sequence chart for Intra-HNB-GW Mobility—LIPA to ELIPA.
Figure 66B:
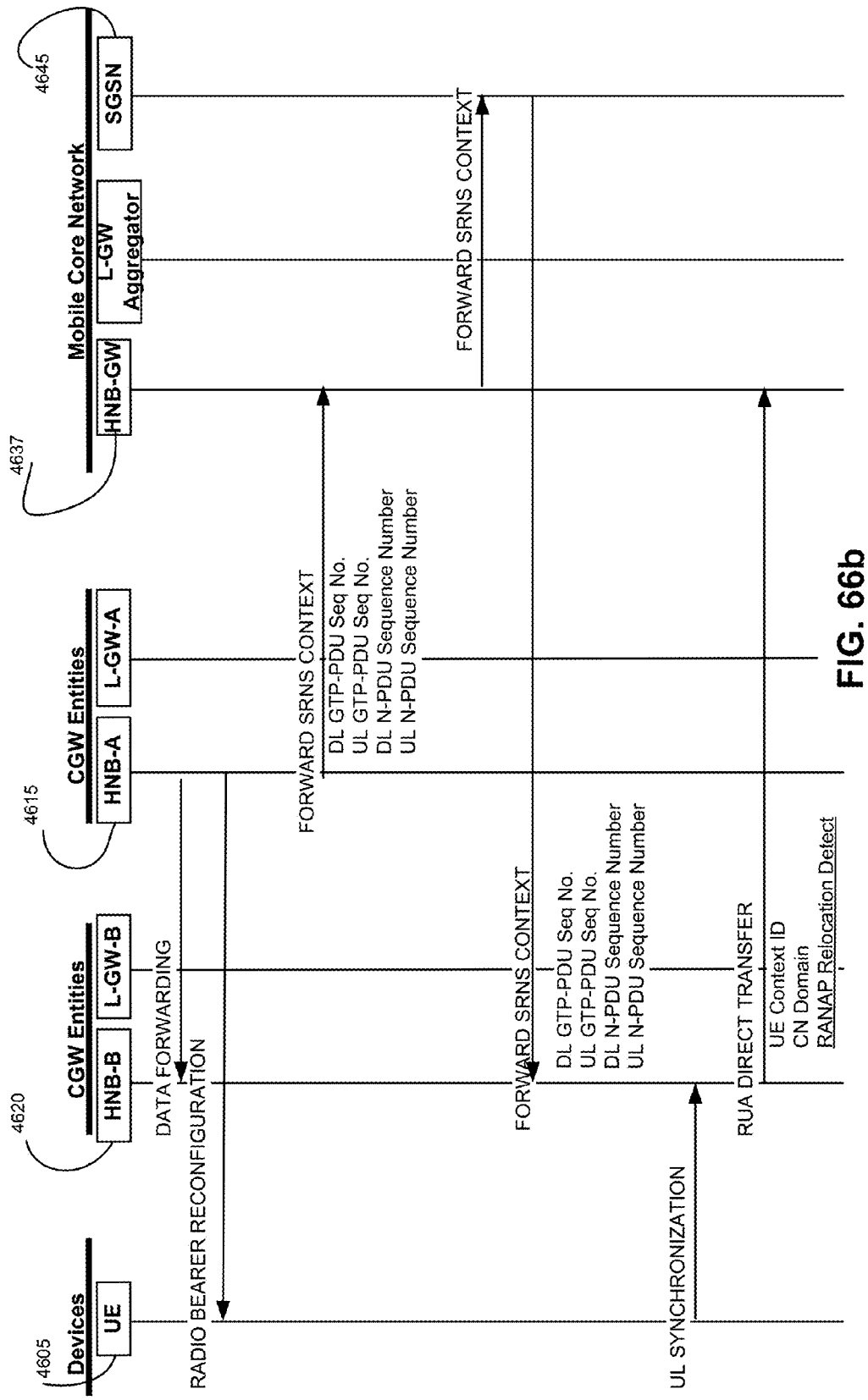
FIG. 66B is an exemplary illustration of a message sequence chart for Intra-HNB-GW Mobility—LIPA to ELIPA, wherein FIG. 66B continues 66A.
Figure 66C:
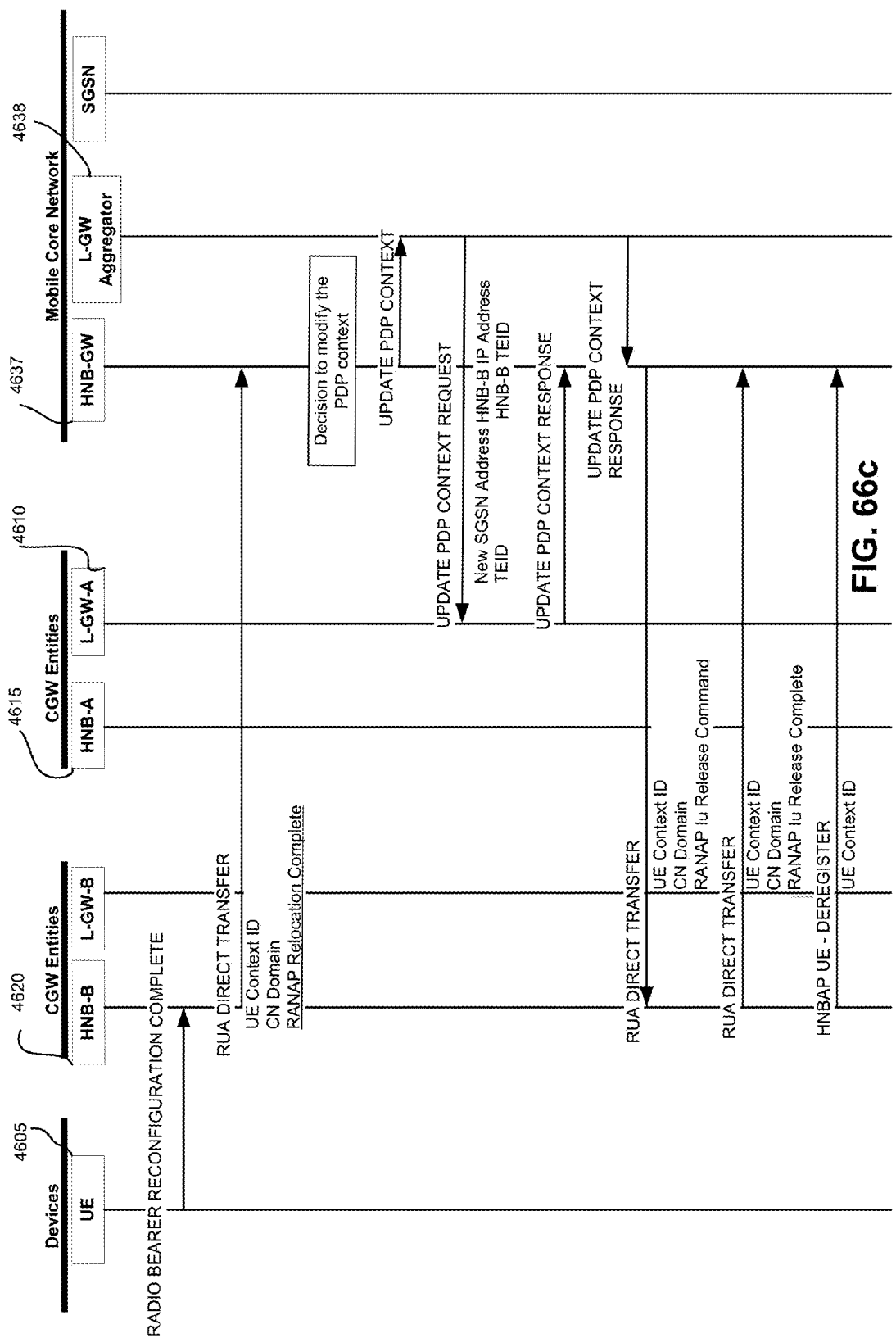
FIG. 66C is an exemplary illustration of a message sequence chart for Intra-HNB-GW Mobility—LIPA to ELIPA, wherein FIG. 66C continues 66B.

FIG. 66A-FIG. 66C illustrates an exemplary message sequence regarding relocation of a UE session from the UE home HNB to a neighbor's HNB case in FIG. 65 for intra HNB-GW mobility in LIPA to ELIPA embodiments. For example, in FIG. 66A-FIG. 66C an HNB-A 4615 may initiate the procedure by sending a relocation required message to a HNB-GW 4637. The relocation required message may indicate the source HNB-ID, here HNB-A 4615 ID, and target HNB-ID, here HNB-B 4620 ID. Then there may be the retrieval of transport IP address and TEID of the LGW-A 4610 for ongoing PS session. The HNB-GW 4637 may send a relocation request message to HNB-B 4620. For the direct tunnel to be established the LGW-A 4610 and HNB-B 4620 a TEID and transport IP address of LGW-A is sent to HNB-B 4620 corresponding to each RAB which are selected for data forwarding. An entry in the HNB-GW 4637 may be created for a UE 4605 with the HNB-B ID 4620 (UE registration and resource allocation for relocation occurs). In response to the relocation request message the HNB-B 4620 may indicate its transport IP address and TEID. The HNB-A 4615 may be provided by the HNB-GW 4638 HNB-B's transport IP address and TEID to establish the direct tunnel Data forwarding between HNB-A 4615 and HNB-B 4620 may occur and radio bearer reconfiguration between HNB-A 4615 and the UE 4605 may occur.

As shown in FIG. 66A-FIG. 66C, the HNB-A 4615 may send forward SRNS context to the HNB-GW 4637 which may send it to the SGSN 4645. The forward SRNS context may comprise DL and UL GTP-PDU sequence number as well as DL and UL N-PDU sequence number. The SGSN 4645 may then send the forward SRNS context to the HNB-B 4620. The HNB-B 4620 may get notified of the new UE 4605 after it receives the UL synchronization message from the UE 4605. The HNB-B 4620 may then notify the HNB-GW 4637 via a relocation detect message. After the radio bearer reconfiguration is complete between the UE 4605 and the HNB-B 4620, as well as the completion of relocation message sent to the HNB-GW 4637 and the HNB-B 4620, the HNB-GW 4637 may modify the PDP context. The message update PDP context request may be sent from the HNB-GW 4637 to the LGW aggregator to update the PDP context created in LGW-A 4610 with new transport level IP addresses and TEID. After update in the PDP context request to the DL data may start reaching the UE via new tunnel established between HNB-B 4620 and LGW-A 4610. The Iu connection between the UE 4605 and HNB-A 4615 may be released and the UE 4605 association in HNB-GW 4637 with the HNB-A 4615 (i.e., the old HNB) may be released.

Figure 67:
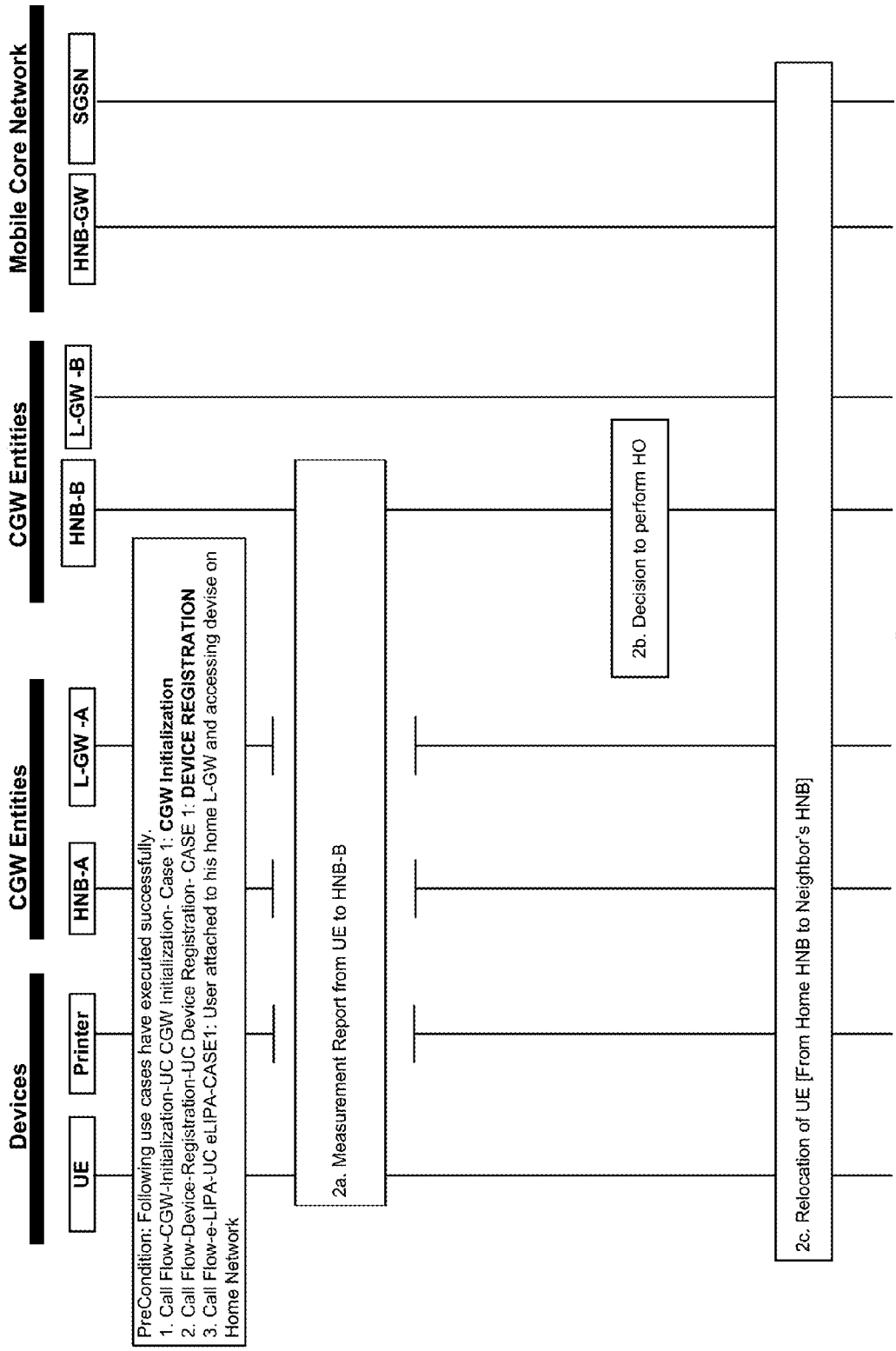
FIG. 67 is an exemplary illustration of a procedure for ELIPA to LIPA mobility.
Figure 68A:
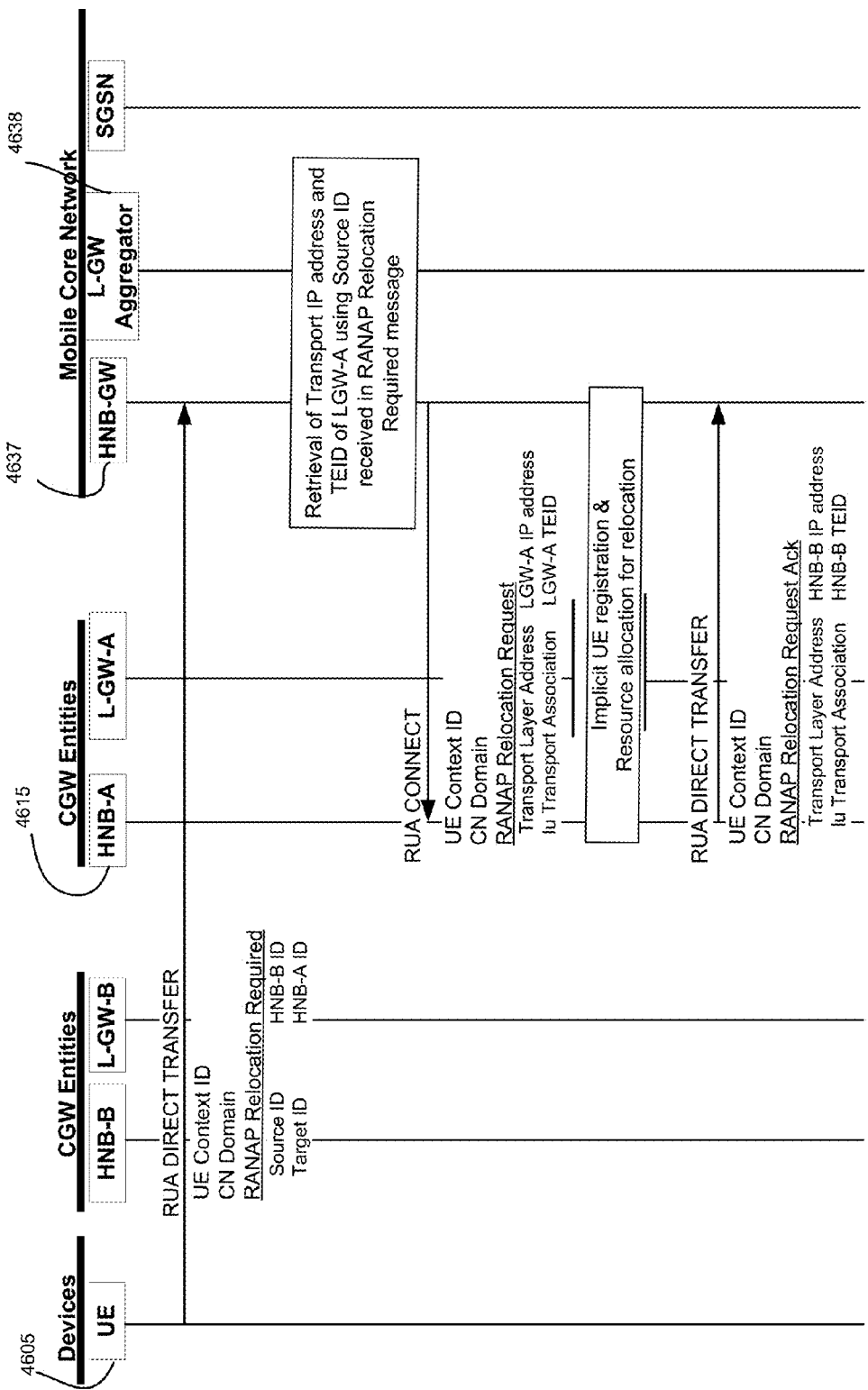
FIG. 68A is an exemplary illustration of a message sequence chart for Intra-HNB-GW Mobility—ELIPA to LIPA.

FIG. 67 illustrates an exemplary procedure flow for relocation of the UE from a neighbor's HNB to the UE's home HNB. FIG. 68A-68C illustrate a non-limiting exemplary message sequence for intra HNB-GW Mobility in ELIPA to LIPA embodiments. For example, FIG. 67 and FIG. 68A-68C may relate to an instance where a UE 4605 may be attached to his neighbor's HNB 4620 and accessing a device on the UE's home network 4601, wherein the UE 4605 is moved to the UE's home HNB 4615.

For example, in FIG. 68A-68C, an HNB-B 4620 may initiate the procedure by sending a relocation required message to a HNB-GW 4637. The relocation required message may indicate the source HNB-ID, here HNB-B 4620 ID, and target HNB-ID, here HNB-A 4615 ID. Then there may be the retrieval of transport IP address and TEID of the LGW-A 4610 using source ID received in RANAP relocation required message. The HNB-GW 4637 may send a relocation request message to HNB-A 4615. For the direct tunnel to be established the LGW-A 4610 and HNB-A 4615 a TEID and transport IP address of LGW-A is sent to HNB-A 4615 corresponding to each RAB which are selected for data forwarding. An entry in the HNB-GW 4637 may be created for a UE 4605 with the HNB-A ID 4615 (UE registration and resource allocation for relocation occurs). In response to the relocation request message the HNB-A 4615 may indicate its transport IP address and TEID. The HNB-B 4620 may be provided by the HNB-GW 4637 HNB-A's transport IP address and TEID to establish the direct tunnel Data forwarding between HNB-B 4620 and HNB-A 4615 may occur and radio bearer reconfiguration between HNB-B 4620 and the UE 4605 may occur.

As shown in FIG. 68A-68C, the HNB-B 4620 may send forward SRNS context to the HNB-GW 4637 which may send it to the SGSN 4645. The forward SRNS context may comprise DL and UL GTP-PDU sequence number as well as DL and UL N-PDU sequence number. The SGSN 4645 may then send the forward SRNS context to the HNB-A 4615. The HNB-A 4615 may be notified of the new UE 4605 after it receives the UL synchronization message from the UE 4605. The HNB-A 4615 may then notify the HNB-GW 4637 via a relocation detect message. After the radio bearer reconfiguration is complete between the UE 4605 and the HNB-a 4615, as well as the completion of relocation message sent to the HNB-GW 4637 and the HNB-A 4615, the HNB-GW 4637 may modify the PDP context. The message update PDP context request may be sent from the HNB-GW 4637 to the LGW aggregator to update the PDP context created in LGW-A 4610 with new transport level IP addresses and TEID. After update in the PDP context request to the DL data may start reaching the UE 4605 via new tunnel established between HNB-A 4615 and LGW-A 4610. The Iu connection between the UE 4605 and HNB-B 4620 may be released and the UE 4605 association in HNB-GW 4637 with the HNB-B 4620 (i.e., the old HNB) may be released.

Figure 69:
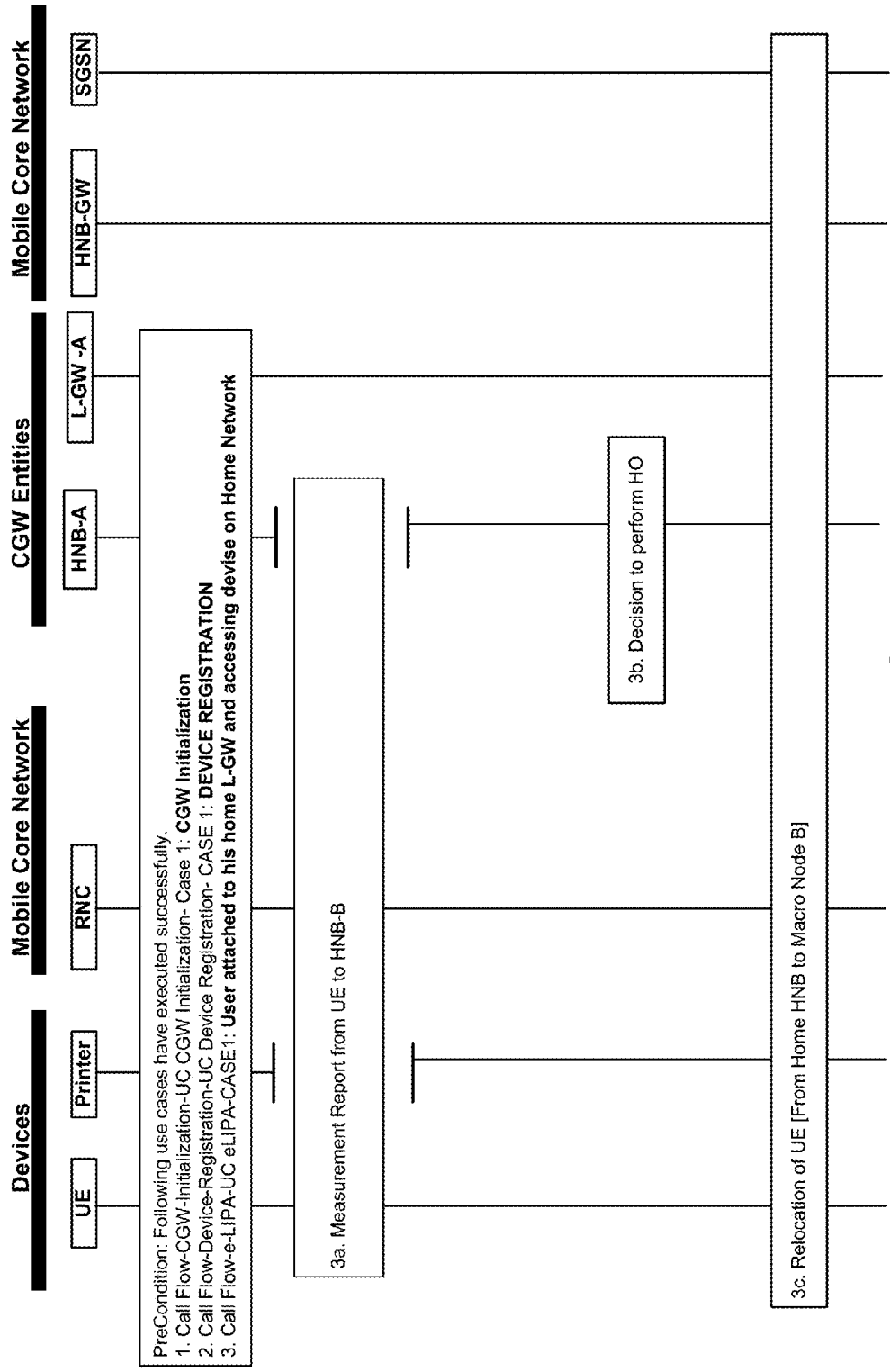
FIG. 69 is an exemplary illustration of a procedure for LIPA to remote managed access (RMA) Mobility.
Figure 70A:
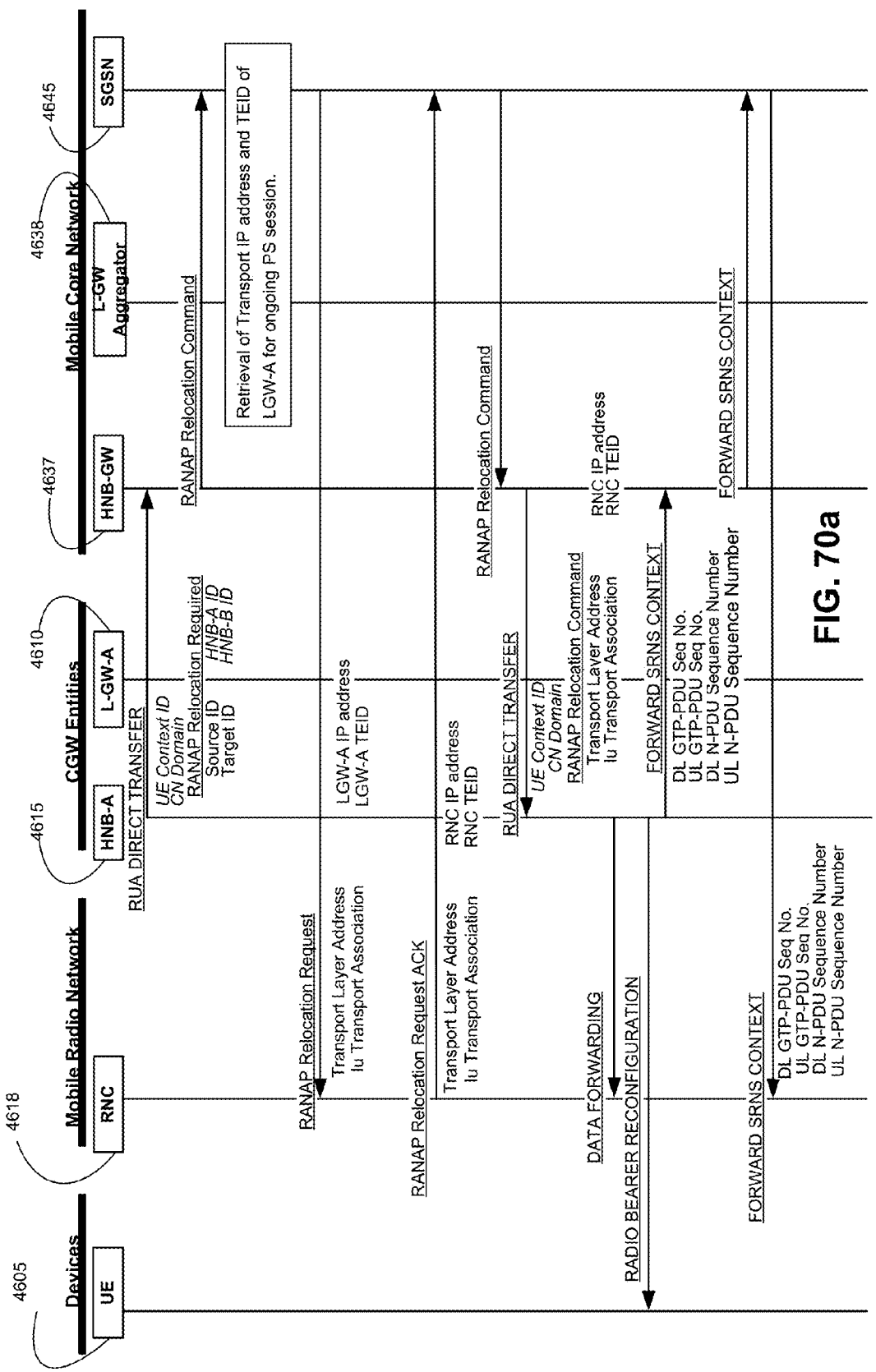
FIG. 70 is an exemplary illustration of an message sequence chart for LIPA to RMA Mobility.
Figure 70B:
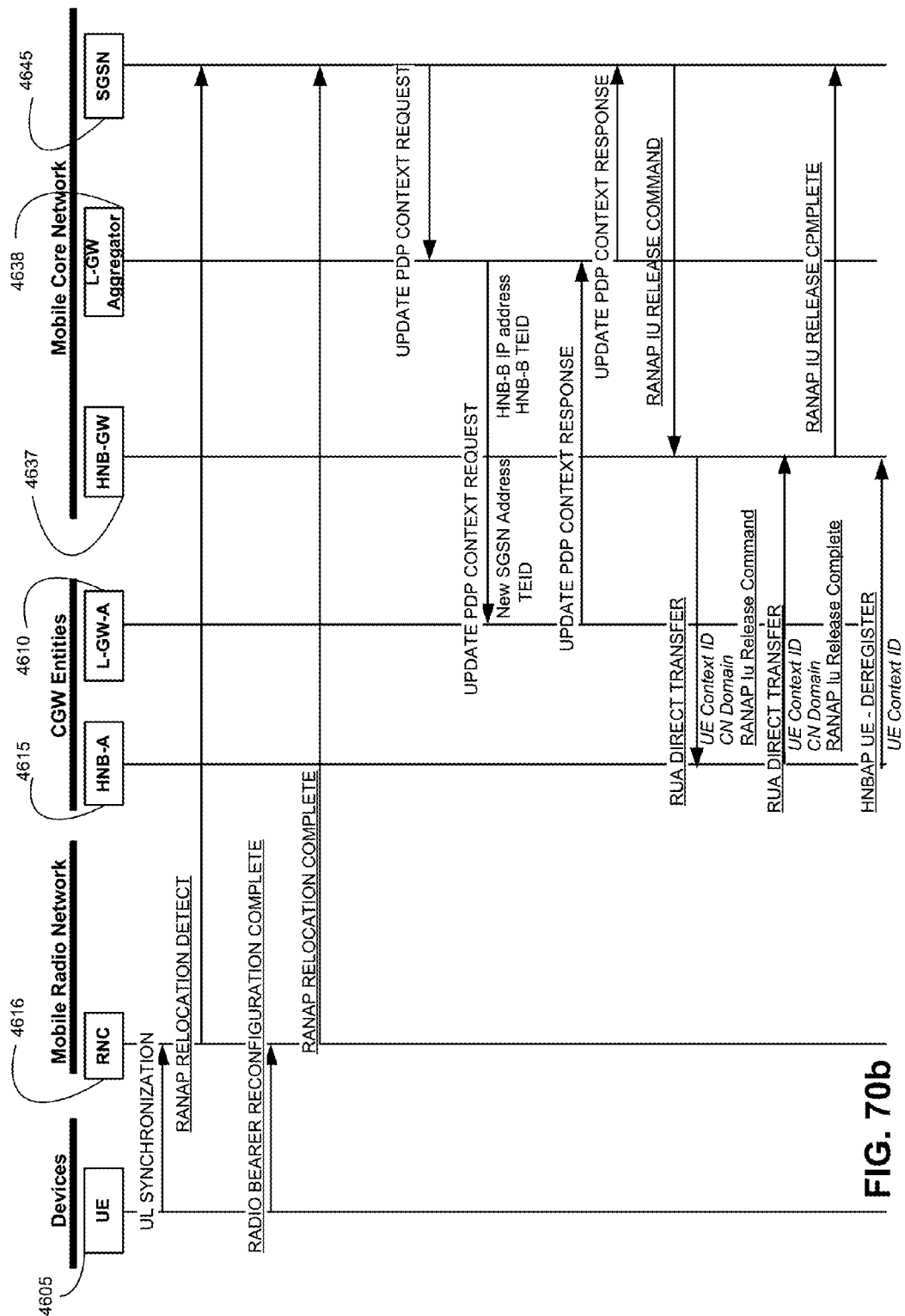

FIG. 69 illustrates a high-level procedure flow for relocation of UE from his HNB to the macro network (LIPA to MRA mobility). FIG. 69 and FIG. 70 illustrate an exemplary message sequence for an embodiment where a UE initially attached to the UE's home HNB while accessing a device on the UE's home network, is moved to a macro network.

FIG. 70 illustrates an exemplary message sequence for LIPA to RMA mobility. For example, in FIG. 70, an HNB-A 4615 may initiate the relocation procedure by sending a relocation required message to a HNB-GW 4637. The relocation required message may indicate the source HNB-ID, here HNB-A 4615 ID, and target HNB-ID, here RNC 4618 ID. Then there may be the retrieval of transport IP address and TEID of the LGW-A 4610 for ongoing PS session. The SGSN 4645 may send a relocation request message to the RNC 4618. For the direct tunnel to be established the LGW-A 4610 and RNC 4618 a TEID and transport IP address of LGW-A is sent to RNC 4618 corresponding to each RAB, which are selected for data forwarding. In response to the relocation request message the RNC 4618 may indicate its transport IP address and TEID in an relocation request ACK message to the SGSN 4645. The HNB-A 4615 may be provided by the HNB-GW 4638, the RNC's transport IP address and TEID to establish the direct tunnel IP address and TEID of RNC may be used for data forwarding. Until the tunnel is established data may be duplicated and sent to the RNC 4618. Data forwarding between HNB-A 4615 and RNC 4618 may occur and radio bearer reconfiguration between HNB-A 4615 and the UE 4605 may occur.

As shown in FIG. 70, the HNB-A 4615 may send forward SRNS context to the HNB-GW 4637 which may send it to the SGSN 4645. The forward SRNS context may comprise DL and UL GTP-PDU sequence number as well as DL and UL N-PDU sequence number. The SGSN 4645 may then send the forward SRNS context to the RNC 4618. The RNC 4618 may be notified of the new UE 4605 after it receives the UL synchronization message from the UE 4605. The RNC 4618 may then notify the SGSN 4645 via a relocation detect message. After the radio bearer reconfiguration is complete between the UE 4605 and the RNC 4618, as well as the completion of relocation message sent to the SGSN 4645 and the RNC 4618, the SGSN 4645 may modify the PDP context. The message update PDP context request may be sent from the SGSN 4645 to the LGW aggregator to update the PDP context created in LGW-A 4610 with new SGSN 4645 address and TEID. After update in the PDP context request to the DL data may start reaching the UE via new tunnel established between RNC 4618 and LGW-A 4610. The Iu connection between the UE 4605 and HNB-A 4615 may be released and the UE 4605 association in HNB-GW 4637 with the HNB-A 4615 (i.e., the old HNB) may be released. A result may be that the UE has relocated to a node-B of the macro network.

Figure 71:
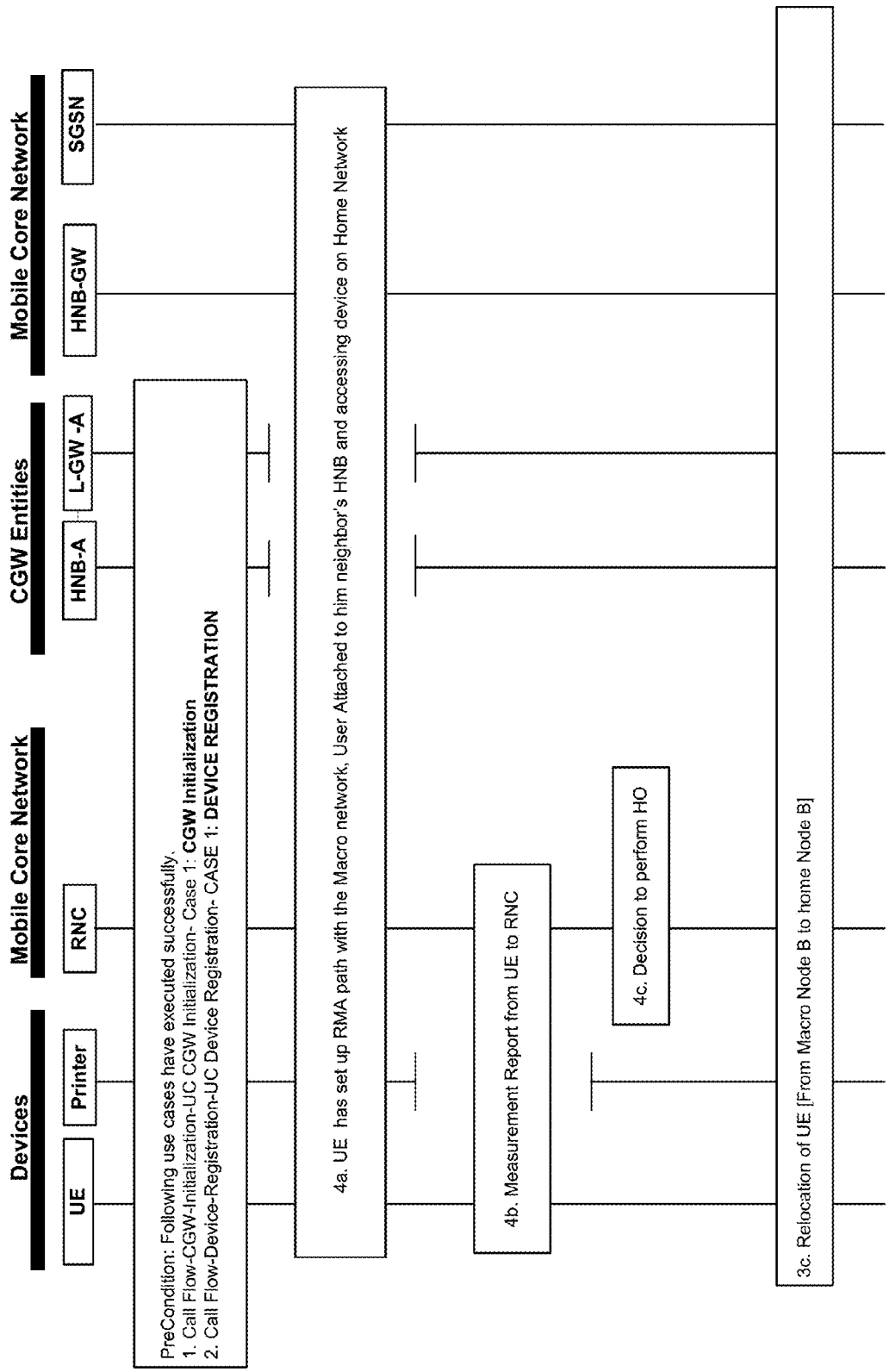
FIG. 71 is an exemplary illustration of a procedure for RMA to LIPA Mobility.
Figure 72A:
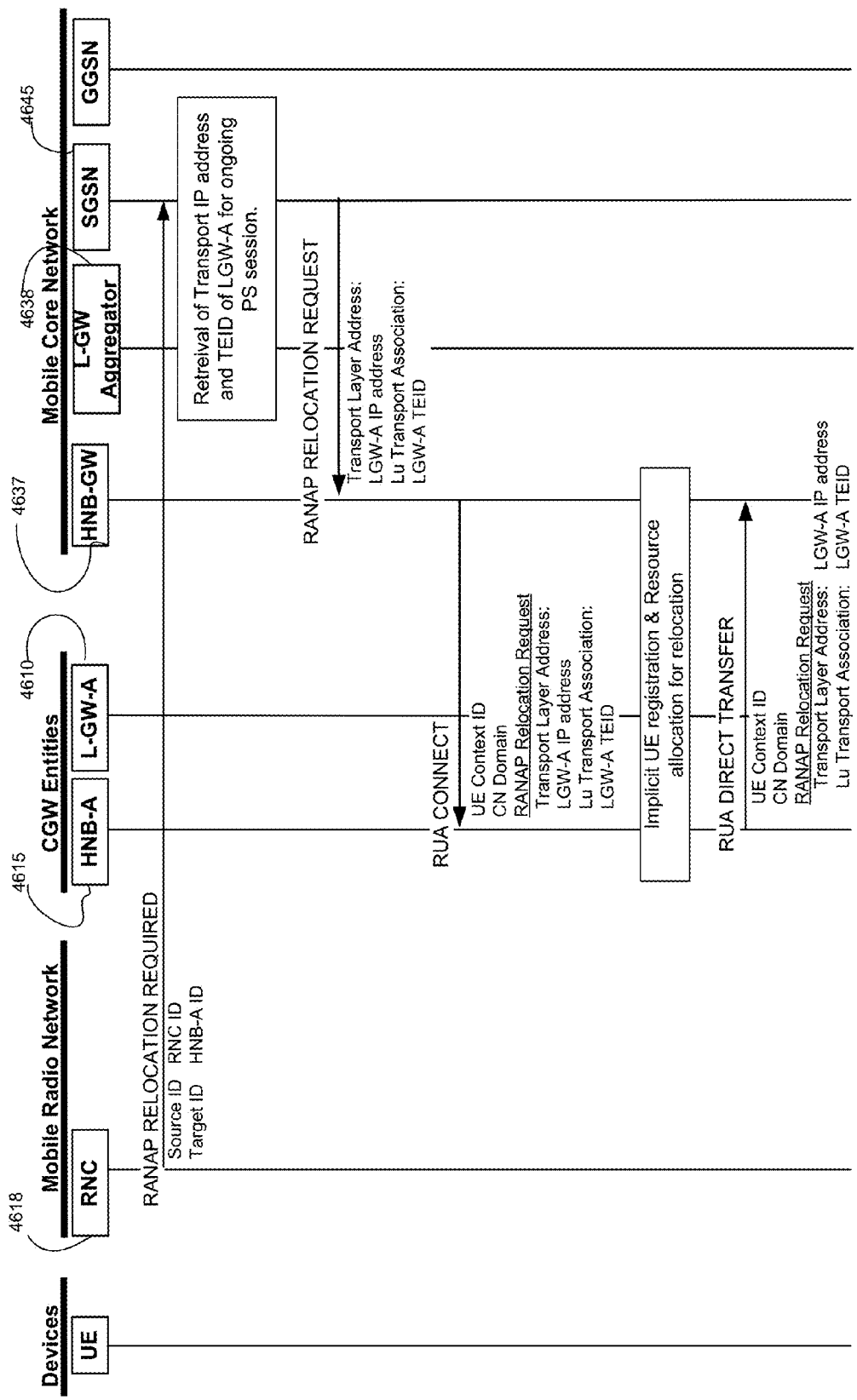
FIG. 72A is an exemplary illustration of a message sequence chart for RMA to LIPA Mobility.
Figure 72B:
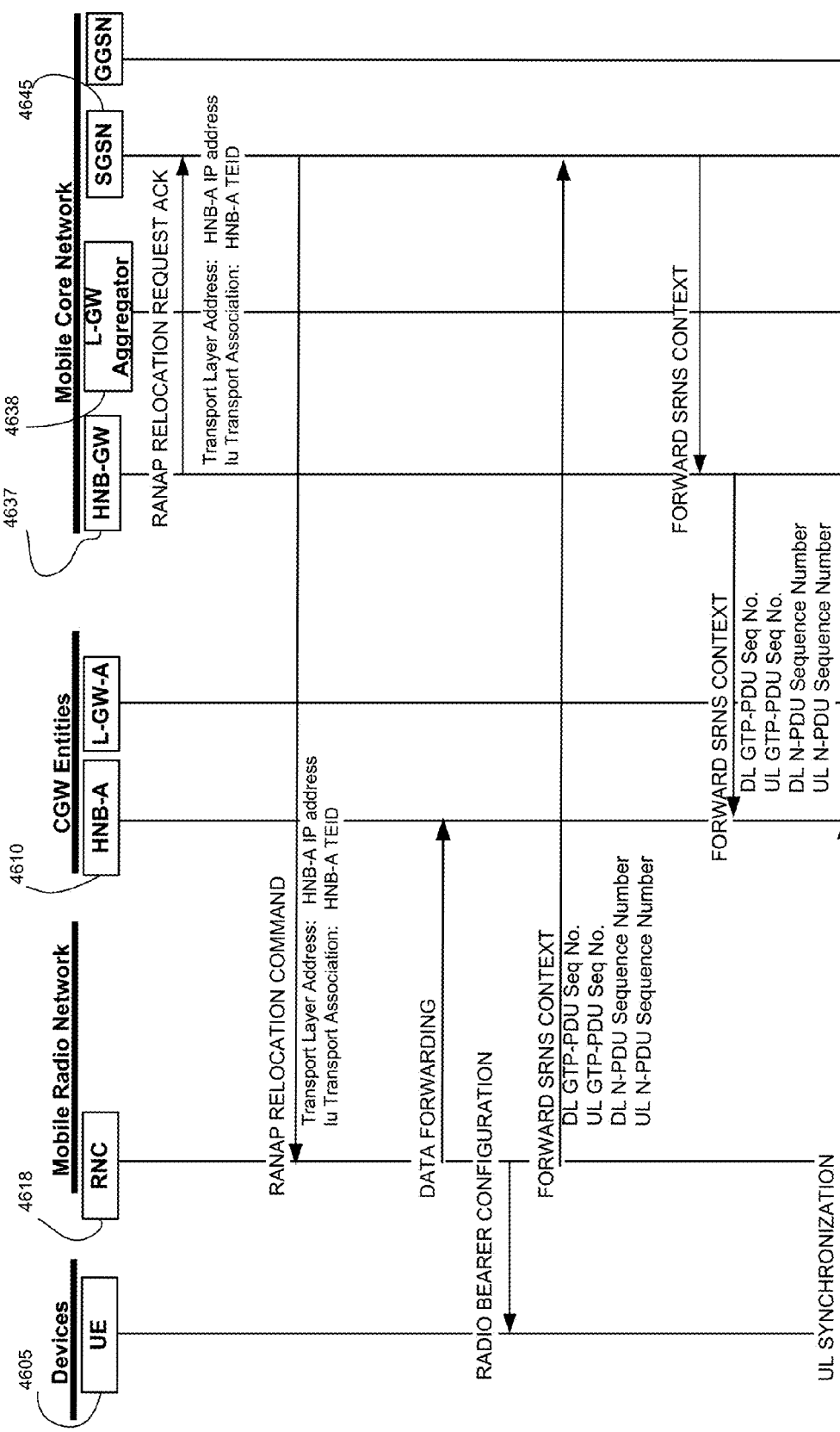
FIG. 72B is an exemplary illustration of a message sequence chart for RMA to LIPA Mobility, wherein 72B continues 72A.
Figure 72C:
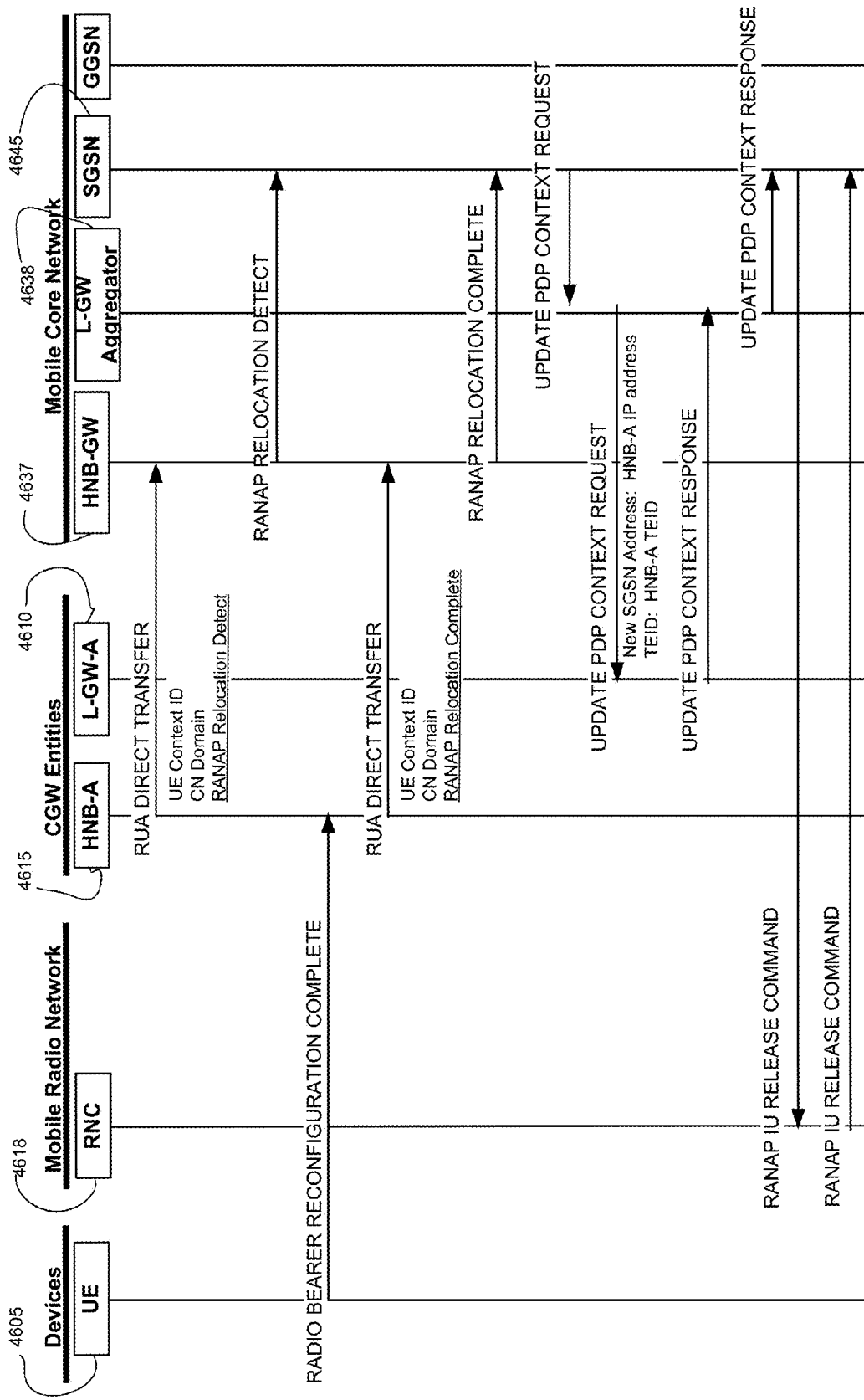
FIG. 72C is an exemplary illustration of a message sequence chart for RMA to LIPA Mobility, wherein 72C continues 72B.

FIG. 71 illustrates a high-level procedure flow for relocation of a UE from the macro network to the UE's HNB (RMA to LIPA mobility). FIG. 72A-72C illustrate a non-limiting exemplary message sequence for RMA to LIPA mobility. FIG. 71 and FIG. 72A-72C illustrate an exemplary message sequence for an embodiment where a UE attached to a macro network and accessing a device on the UE's home network is moved to the UE's home network.

For example, in FIG. 72A-72C, an RNC 4618 may initiate the procedure by sending a relocation required message to a SGSN 4645. The relocation required message may indicate the source HNB-ID, here RNC 4618 ID, and target HNB-ID, here HNB-A 4615 ID. Then there may be the retrieval of transport IP address and TEID of the LGW-A 4610 for ongoing PS session. The relocation request comprising of a transport layer address, here LGW-A IP address and a Iu transport association, here LGW-A TEID, may be sent from the SGSN 4645 to the HNB-GW 4637. The HNB-GW 4637 may send a relocation request message to HNB-A 4615. For the direct tunnel to be established the LGW-A 4610 and HNB-A 4615 a TEID and transport IP address of LGW-A is sent to HNB-A 4615 corresponding to each RAB which are selected for data forwarding. An entry in the HNB-GW 4637 may be created for a UE 4605 with the HNB-A ID 4615 (UE registration and resource allocation for relocation occurs). In response to the relocation request message the HNB-A 4615 may indicate its transport IP address and TEID to the HNB-GW 1337. The transport IP address may have belonged to a private subnet of the home network. The HNB-GW 1337 may keep the private IP provided in the previous step with itself and may send an HNB IP address belonging to the MCN. The RNC 4618 may be provided by the SGSN 4645, HNB-A's transport IP address and TEID for data forwarding. Until the tunnel is established data may be duplicated and sent to HNB-A 4615. Data forwarding between RNC 4618 and HNB-A 4615 may occur and radio bearer reconfiguration between RNC 4618 and the UE 4605 also may occur.

As shown in FIG. 72A-72C, the RNC 4618 may send forward SRNS context to the SGSN 4645. The forward SRNS context may comprise DL and UL GTP-PDU sequence number as well as DL and UL N-PDU sequence number. The SGSN 4645 may then send the forward SRNS context to the HNB-GW 4637. The HNB may forward the SRNC context to HNB-A. The HNB-A 4615 may be notified of the new UE 4605 after it receives the UL synchronization message from the UE 4605. The HNB-A 4615 may then notify the HNB-GW 4637 via a relocation detect message. The HNB-GW 4637 may send the relocation detect message to the SGSN 4645. The UE may send a radio bearer reconfiguration complete message to the HNB-A 4615 and the HNB-A may send the message to the HNB-GW 4637. HNB-GW may send the message to the SGSN 4645. The SGSN 4645 may modify the PDP context. The message update PDP context request may be sent from the SGSN 4645 to the LGW aggregator to update the PDP context created in LGW-A 4610 with new transport level IP addresses and TEID. After update in the PDP context request to the DL data may start reaching the UE 4605 via new tunnel established between HNB-A 4615 and LGW-A 4610. The Iu connection between the UE 4605 and RNC 4618 may be released.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A communication system, comprising:
    a first home network having a first local gateway and a first home network gateway; and
    a second home network having a second local gateway and a second home network gateway,
        wherein the first and second home network gateways are associated with a mobile core network,
        wherein the first local gateway is configured to establish a user data plane communication between a wireless transmit receive unit (WTRU) on the second home network and a device on the first home network that bypasses a packet data network egress of the mobile core network, wherein the user data plane communication is established via at least a direct tunnel between the first and second local gateways or the first local gateway and the second home network gateway such that the user data plane communication uses a backhaul through which the direct tunnel is routed to bypass the packet data network egress of the mobile core network, wherein the packet data network egress of the mobile core network bypassed comprises at least one of a general packet radio service support node (GGSN) or a packet data network gateway (P-GW) of the mobile core network, and wherein the first local gateway is configured to perform a subset of functions provided by the GGSN or the P-GW bypassed including WTRU policy based packet filtering, rate policing or shaping, WTRU IP address assignment, and direct tunneling between the first local gateway and at least one of the first and second home network gateways.

2. The system of claim 1, wherein the first and second home network gateways are femto access points.

3. The system of claim 1, wherein the network egress of the mobile core network provides communication to the Internet.

4. A method to enable communication between a wireless transmit receive unit (WTRU) on a first home network and a user device on a second home network, wherein the first home network has a first local gateway and a first home network gateway, the second home network has a second local gateway and a second home network gateway, and the first and second home network gateways are each associated with a mobile core network, the method comprising
    establishing user data plane communication between a WTRU on the first home network and the user device on the second home network via at least a direct tunnel between the first and second local gateways or the first home network gateway and the second local gateway such that the user data plane communication uses a backhaul through which the direct tunnel is routed to bypasses the packet data network egress of the mobile core network, wherein the packet data network egress of the mobile core network bypassed comprises at least one of a general packet radio service support node (GGSN) or a packet data network gateway (P-GW) of the mobile core network, and wherein the first local gateway is configured to perform a subset of functions provided by the GGSN or the P-GW bypassed including WTRU policy based packet filtering, rate policing or shaping, WTRU IP address assignment, and direct tunneling between the first local gateway and at least one of the first and second home network gateways;
    receiving user data from a WTRU at a first logical interface, the user data intended for the user device on the second home network;
    signaling the mobile core network to indicate that data being sent is to bypass a packet data network egress of the mobile core network; and
    sending the user data to the user device on the second home network using the established user data plane commination via the direct tunnel through the backhaul.

5. The method of claim 4, wherein the first and second home network gateways are femto access points.

6. A device to enable communication between a wireless transmit receive unit (WTRU) on a first home network and a user device on a second home network, wherein the first home network has a first local gateway and a first home network gateway, the second home network has a second local gateway and a second home network gateway, and the first and second home network gateways are each associated with a mobile core network, the device comprising:

a first logical interface to the WTRU, a second logical interface to the mobile core network; and a processor configured to:

signal to the mobile core network via the second logical interface that user data plane communications received at the first logical interface intended for the second home network are to bypass the packet data network egress of the mobile core network, wherein the packet data network egress of the mobile core network bypassed comprises at least one of a general packet radio service support node (GGSN) or a packet data network gateway (P-GW) of the mobile core network, and wherein the device is configured to perform a subset of functions provided by the GGSN or the P-G bypassed including WTRU policy based packet filtering, rate policing or shaping, WTRU IP address assignment, and tunneling between the first local gateway and at least one of the first and second home network gateways.

7. The device of claim 6, wherein the first and second home network gateways are femto access points.

8. The device of claim 6, wherein the network egress of the mobile core network provides communication to the Internet.

9. The device of claim 6, wherein the packet data network egress of the mobile core network is a general packet radio service support node (GGSN).

10. The device of claim 6, wherein the packet data network egress of the mobile core network is a packet data network gateway (P-GW).

11. The device of claim 6, wherein the first and second home network gateways are H(e)NBs.

12. The device of claim 6, wherein the processor is further configured to:
establish a path for the user data plane communications so that the path route reflects the user data plane communications at a first mobile core network entity.

13. The device of claim 6, wherein the tunnel comprises an internet protocol based tunnel, and wherein the processor is further configured to:
establish the internet protocol based tunnel with the first home network gateway, wherein the tunnel setup is configured by a device of the mobile core network.

14. The device of claim 6, wherein the tunnel comprises an internet protocol based tunnel, and wherein the processor is further configured to:
establish the internet protocol based tunnel with the first or second local gateway, wherein the tunnel setup is configured by a device of the mobile core network.

15. The device of claim 13, wherein the device of the mobile core network is a serving general packet radio service support node (SGSN).

16. The device of claim 13, wherein the processor is further configured to:
register with a local gateway (LGW) aggregator.

17. The device of claim 16, wherein the LGW aggregator has a mapping of a LGW access point name (APN) and an internet protocol (IP) address.

18. The device of claim 12, wherein the first mobile core network entity is a security gateway.

19. The device of claim 13, wherein the processor is further configured to:
signal to the mobile core network via the second logical interface such that the user data plane communications are routed via the Internet and bypass the mobile core network.

* * * * *